United States Patent [19]
Baker et al.

[11] Patent Number: 4,706,274
[45] Date of Patent: Nov. 10, 1987

[54] CORDLESS TELEPHONE SYSTEM

[75] Inventors: William Baker, Indianapolis; Michael K. Pedigo, Southport; Noel Atkinson; Henry P. Shelton, both of Indianapolis, all of Ind.

[73] Assignee: Southwestern Bell Telecommunications, Inc., St. Louis, Mo.

[21] Appl. No.: 609,557

[22] Filed: May 11, 1984

[51] Int. Cl.$^4$ .............................................. H04Q 7/04
[52] U.S. Cl. ........................................ 379/61; 379/62; 379/160
[58] Field of Search ............... 179/2 E, 2 EA, 2 EB, 179/2 EC, 103, 14 T, 81 R, 100 C; 379/61, 62, 159, 160, 364

[56] References Cited

U.S. PATENT DOCUMENTS

| | | | |
|---|---|---|---|
| 3,586,787 | 6/1971 | Vogelman et al. | 379/62 |
| 3,979,657 | 9/1976 | Yorksie | 320/13 |
| 4,082,919 | 4/1978 | Day et al. | 379/62 |
| 4,087,636 | 5/1978 | Akiyama et al. | 179/2 EA |
| 4,241,236 | 12/1980 | Nash | 179/2 EA |
| 4,450,319 | 5/1984 | Lucey | 179/2 EA |
| 4,467,140 | 8/1984 | Fathauer et al. | 179/2 EA |
| 4,468,540 | 8/1984 | Cripps | 179/2 EA |
| 4,469,918 | 9/1984 | Cripps | 179/2 EA |
| 4,481,382 | 11/1984 | Villa-Real | 179/2 EA |
| 4,507,524 | 3/1985 | Yun | 179/81 B |
| 4,508,935 | 4/1985 | Mastromoro | 379/62 |
| 4,523,058 | 6/1985 | Stevens et al. | 179/847 |
| 4,535,200 | 8/1985 | Himmelbauer et al. | 179/2 EA |
| 4,543,451 | 9/1985 | Schoen | 179/2 EA |
| 4,558,178 | 12/1985 | Yasuda et al. | 179/2 E |
| 4,560,832 | 12/1985 | Bond et al. | 179/2 EA |
| 4,560,840 | 12/1985 | Hansen | 179/81 B |
| 4,578,540 | 3/1986 | Borg et al. | 379/40 |
| 4,654,481 | 3/1987 | Corris et al. | 379/62 |

Primary Examiner—Robert Lev
Attorney, Agent, or Firm—Neuman, Williams, Anderson & Olson

[57] ABSTRACT

A cordless telephone system includes a control unit having a speaker, a microphone and control circuitry for selective operation in a "normal" mode for communications between the handset and an outside party, a "local answer" mode for communications between a party at the control unit and an outside party, an "intercom" mode for communications between parties at the control unit and the handset and a "3-way" mode for communications between parties at the control unit and handset and an outside party. A microprocessor so responds to ring detect, control and switch-generated interrupt signals as to obtain the desired communications.

11 Claims, 46 Drawing Figures

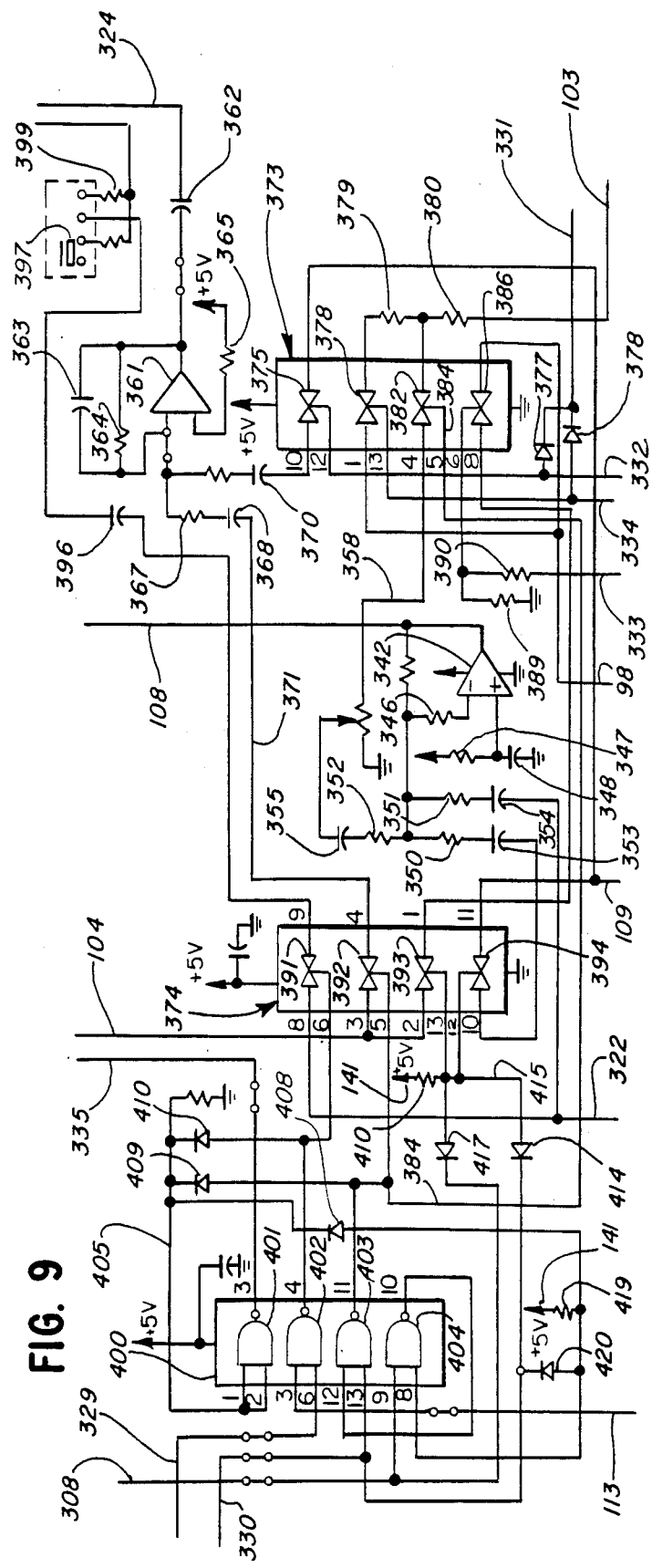
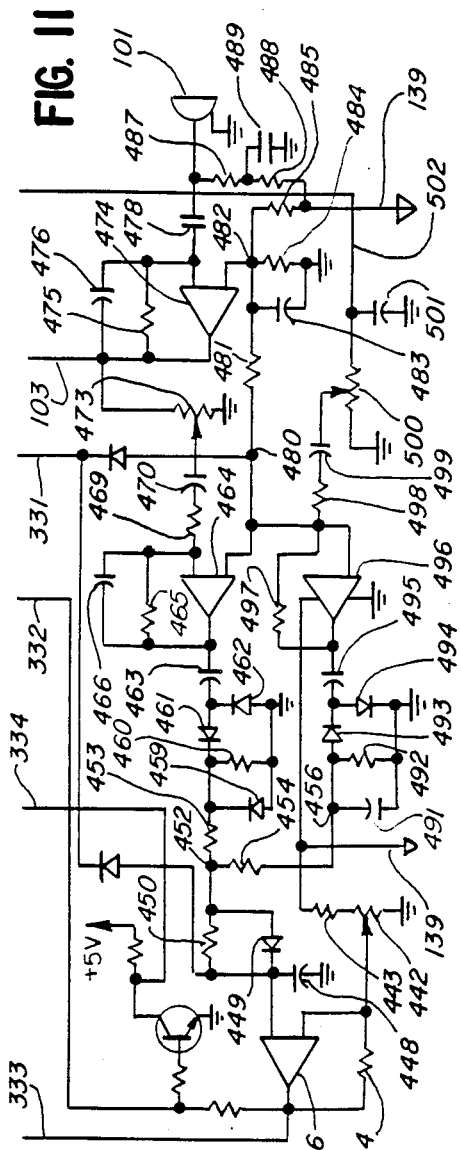
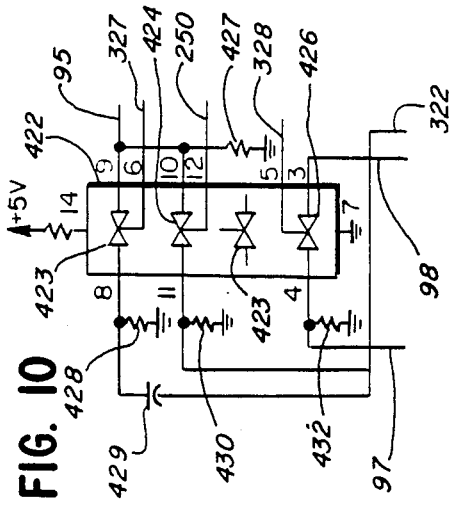
FIG. 9
FIG. 10
FIG. 11

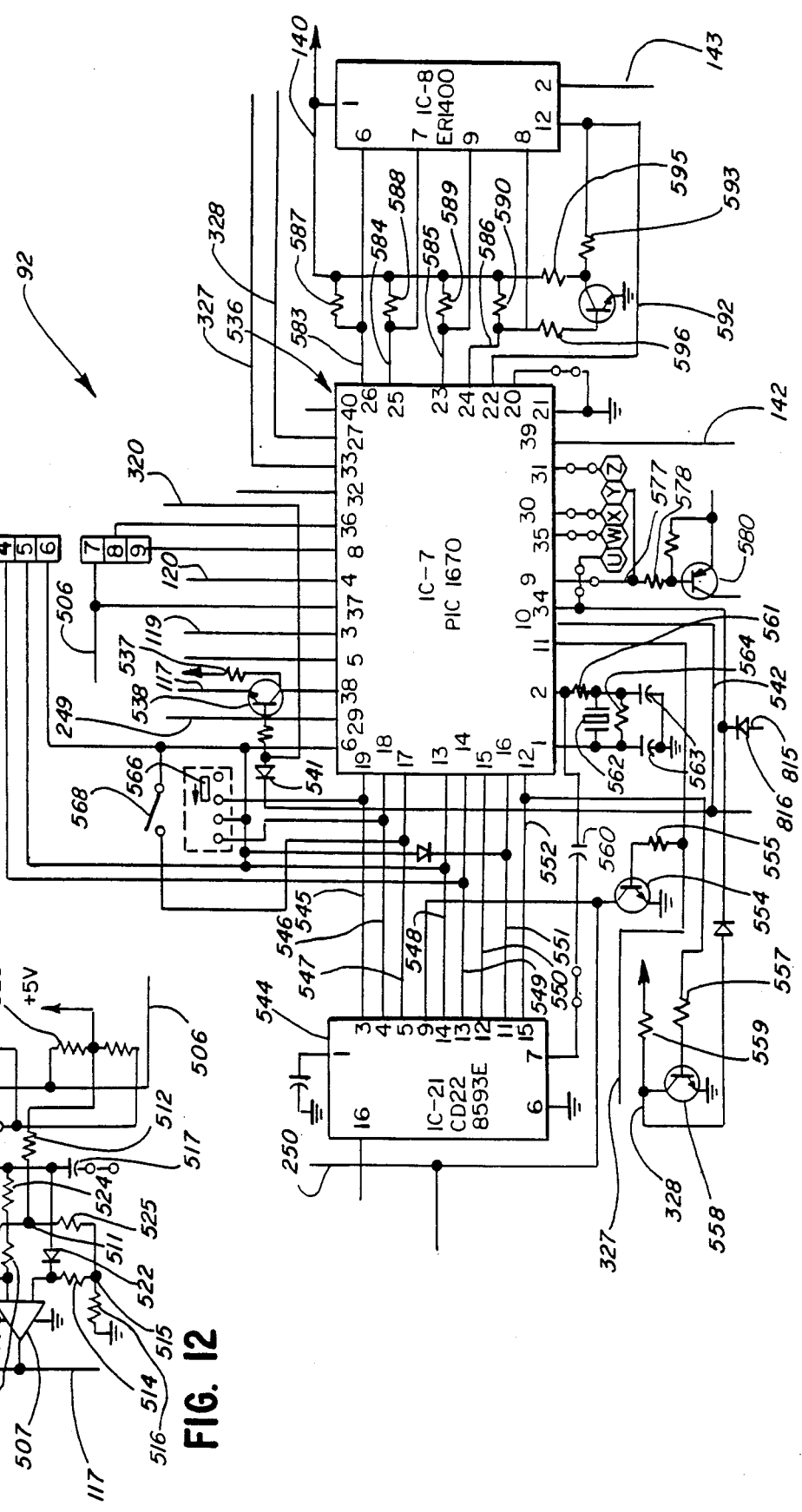

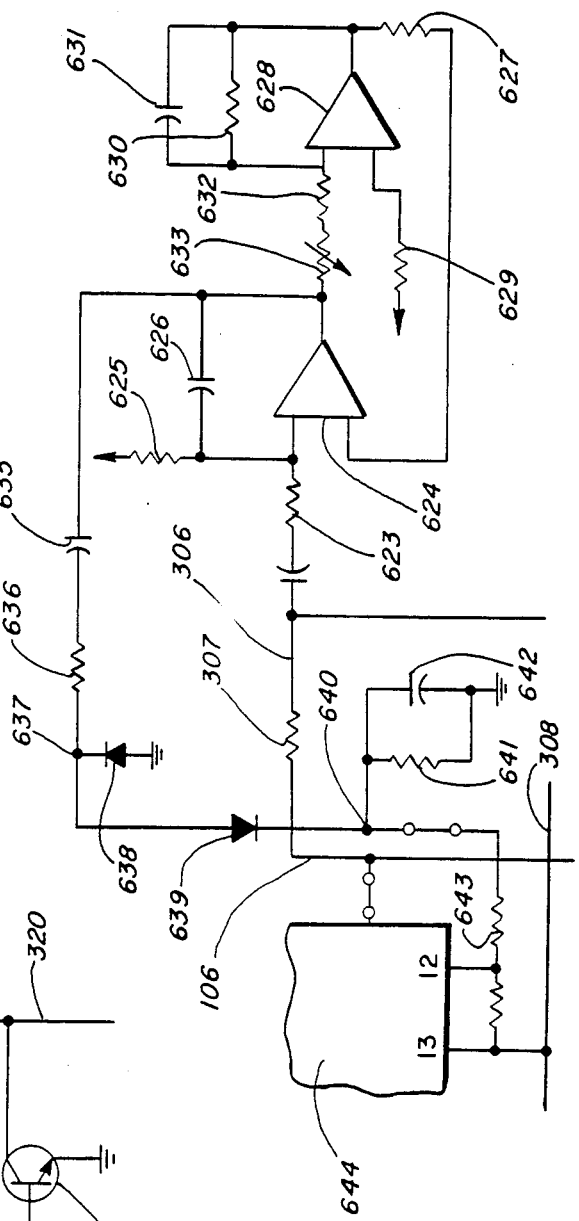
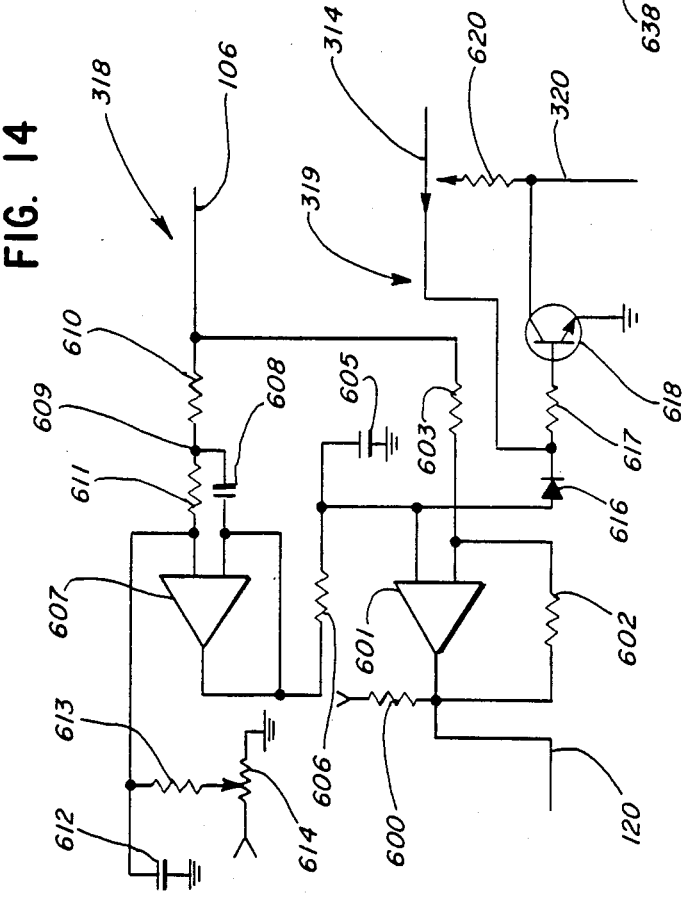
FIG. 14
FIG. 15

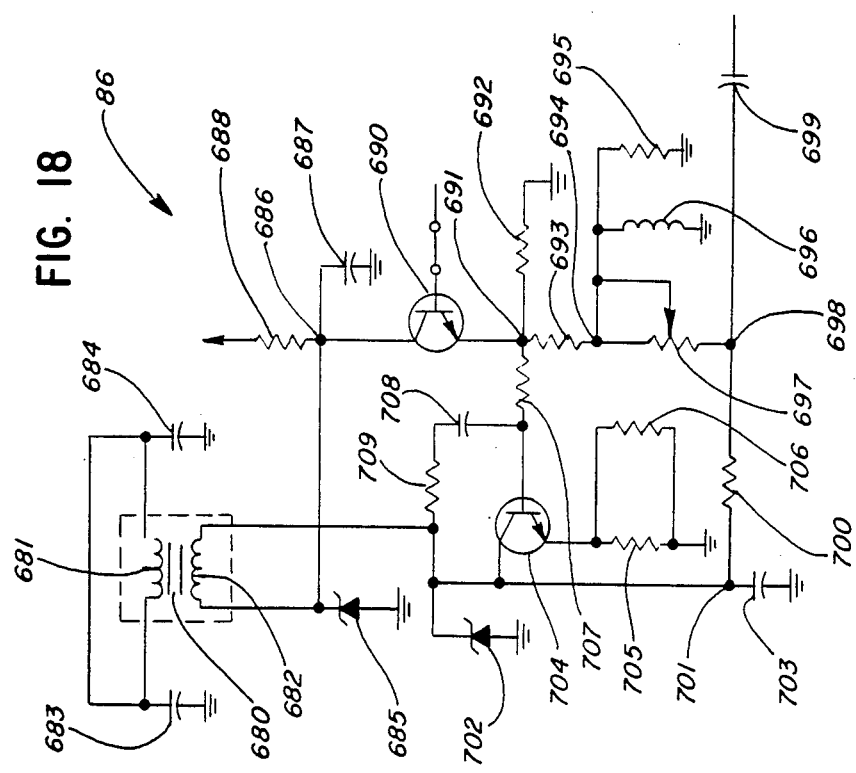
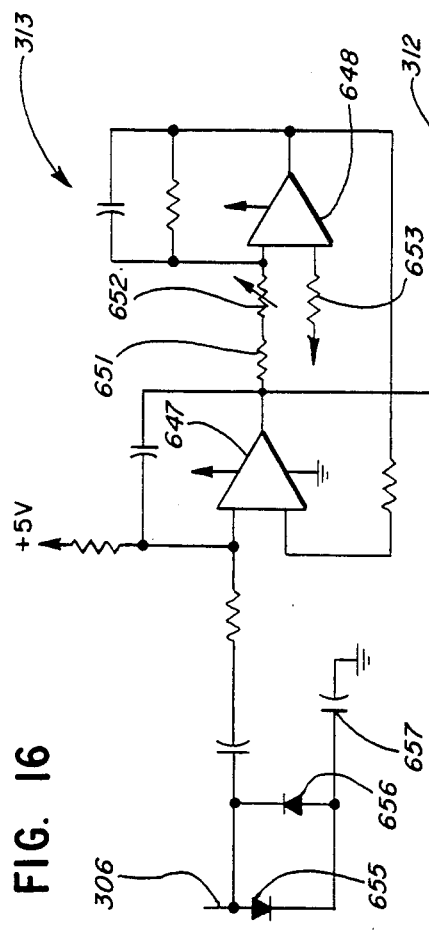
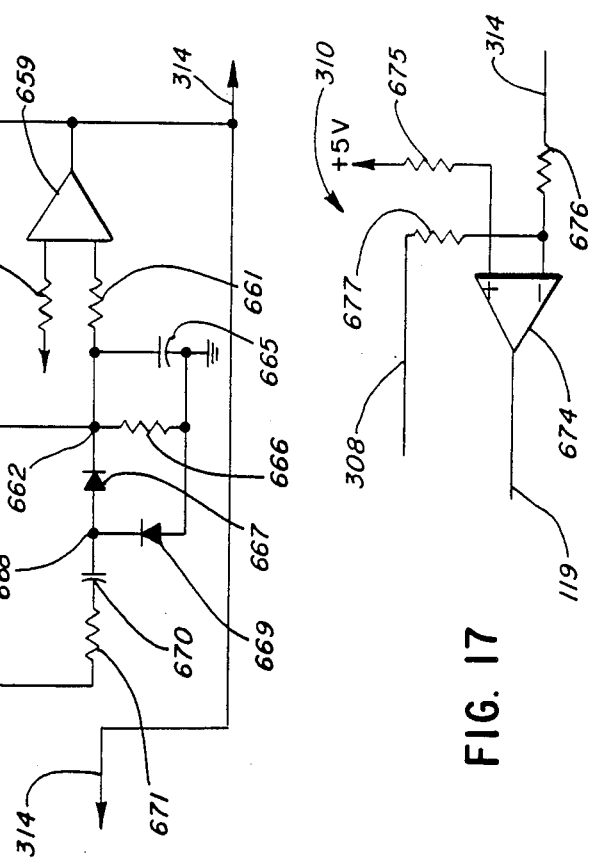

FIG. 22

RAM MAP
F0-7 INTERNAL REGISTERS
F10-17: I/0 REGISTERS

| 20 | 0 | 1 | 2 LOAD ↑ | 3 | 4 | 5 | 6 | 7 |
|---|---|---|---|---|---|---|---|---|
| | SCRATCH TIMER | BEEP SHIFT CNTR. | KEY CUE POINTER | ESCAPE VECTOR | TIMER 2 | RAW KEY | LDS CNTR. | LDS SHIFT REGIS. |

| 30 | 0 | 1 FLAGS | 2 TLKJMP POINTER | 3 | 4 | 5 | 6 | 7 |
|---|---|---|---|---|---|---|---|---|
| | SCRATCH SHIFT CNTR. TEMP. KEY STOR. AUTO AUTO DIAL KEY STORE BASRING CTR. | 0 VFY. SEC. CNTR. 1 2 DIAL 3 Q BIT 4 TALK 5 PROG. SEC. 6 VFY. SEC. 7 ESCAPE | | TALK MODE 2 SEC. TIMER | INTERRUPT TIMER CYCLE COUNTER | PROG. SEC. KEY EROM KEY COUNTER | 3 | 2 1 SECURITY CODE |

| 40 | 40 i10 K10 | 41 i11 K11 | 42 i12 K12 | 43 | 44 FLAGS | 45 | 46 KEY COUNT | 47 KEY TEST FLGS. |
|---|---|---|---|---|---|---|---|---|
| | KEY TEST BUCKETS | | | DIAL VECTOR FOR INT. TIMER (DILXIT) | 0 REDIAL CNTR. 1 2 KEY REJ. 3 REJ. VFY. SEC. 4 EROM BIT 5 REDIAL FLAG 6 7 LDS | SIG HI-LOW HIT CNTR. | | 0 m: 1 "BUCKET" 2 COUNTER 3 4 HI/LO BIT 5 GF8 6 PGF8 7 REDUNDANT |

| 50 | 50 | 51 | 52 | 53 | 54 | 55 | 56 | 57 |
|---|---|---|---|---|---|---|---|---|
| | 0 1 2 3 INTCOM 4 5 20 PPS F 6 INTCOM 7 CNTR. | MAIN JUMP VECTOR | TEMP KEY AUTO DIAL | EROM WORKING | | EROM ADDRESS | EROM DATA SOFTWARE INTERFACE | |

| 60 | | | | | | | | |
|---|---|---|---|---|---|---|---|---|

UNLOAD (KEYQ) POINTER DURING MANUAL DIALING
◄────────────── KEY Q ──────────────►
ONE KEY PER BYTE DURING MANUAL DIALING
2 KEYS PER BYTE WHEN STORING FOR XPER TO AUTO DIAL MEMORY IN EROM

| 70 | | | | | | | | |
|---|---|---|---|---|---|---|---|---|

◄────────────── KEY Q CONTINUED ──────────────►

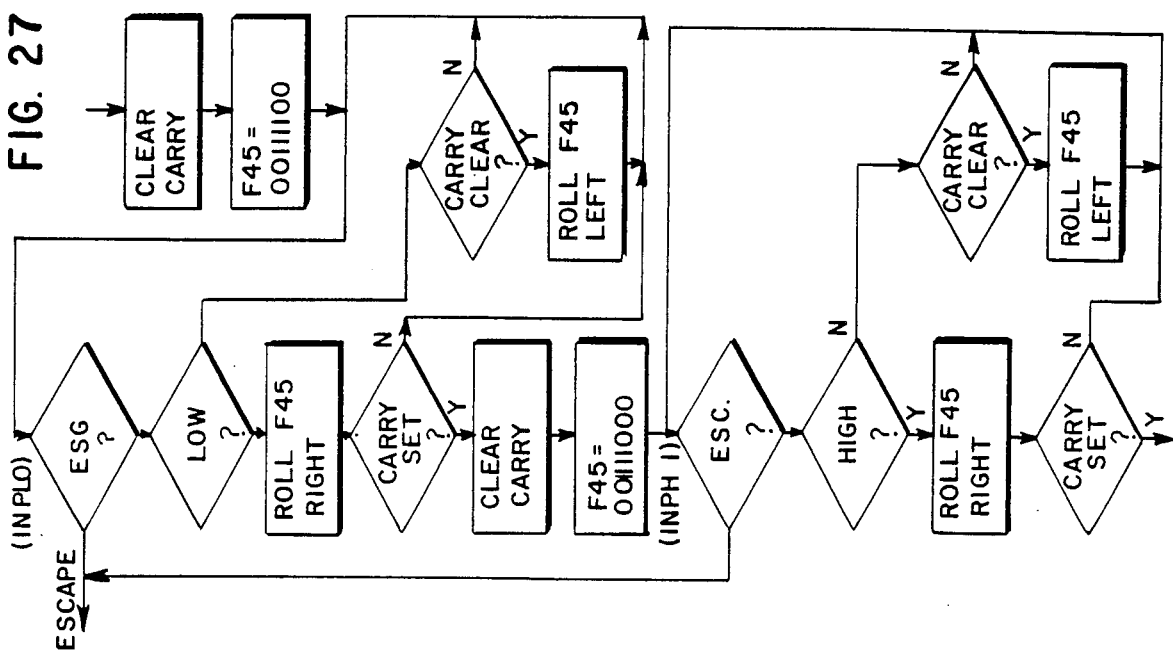
FIG. 27
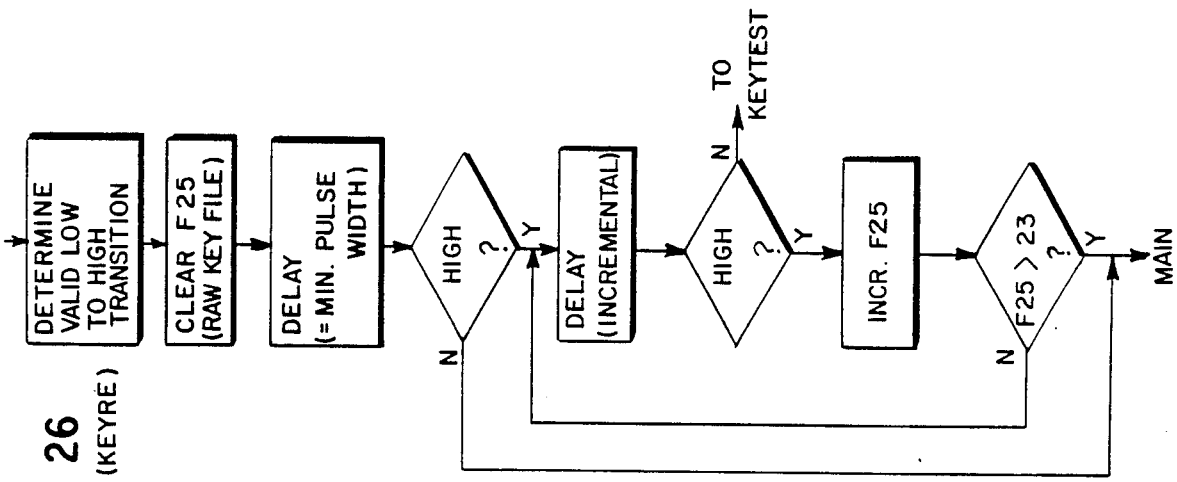
FIG. 26 (KEYRE)
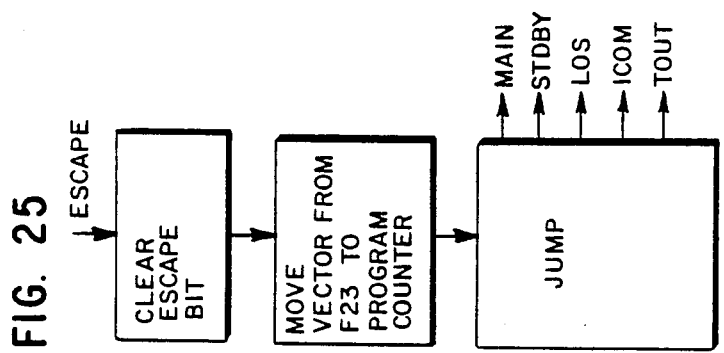
FIG. 25

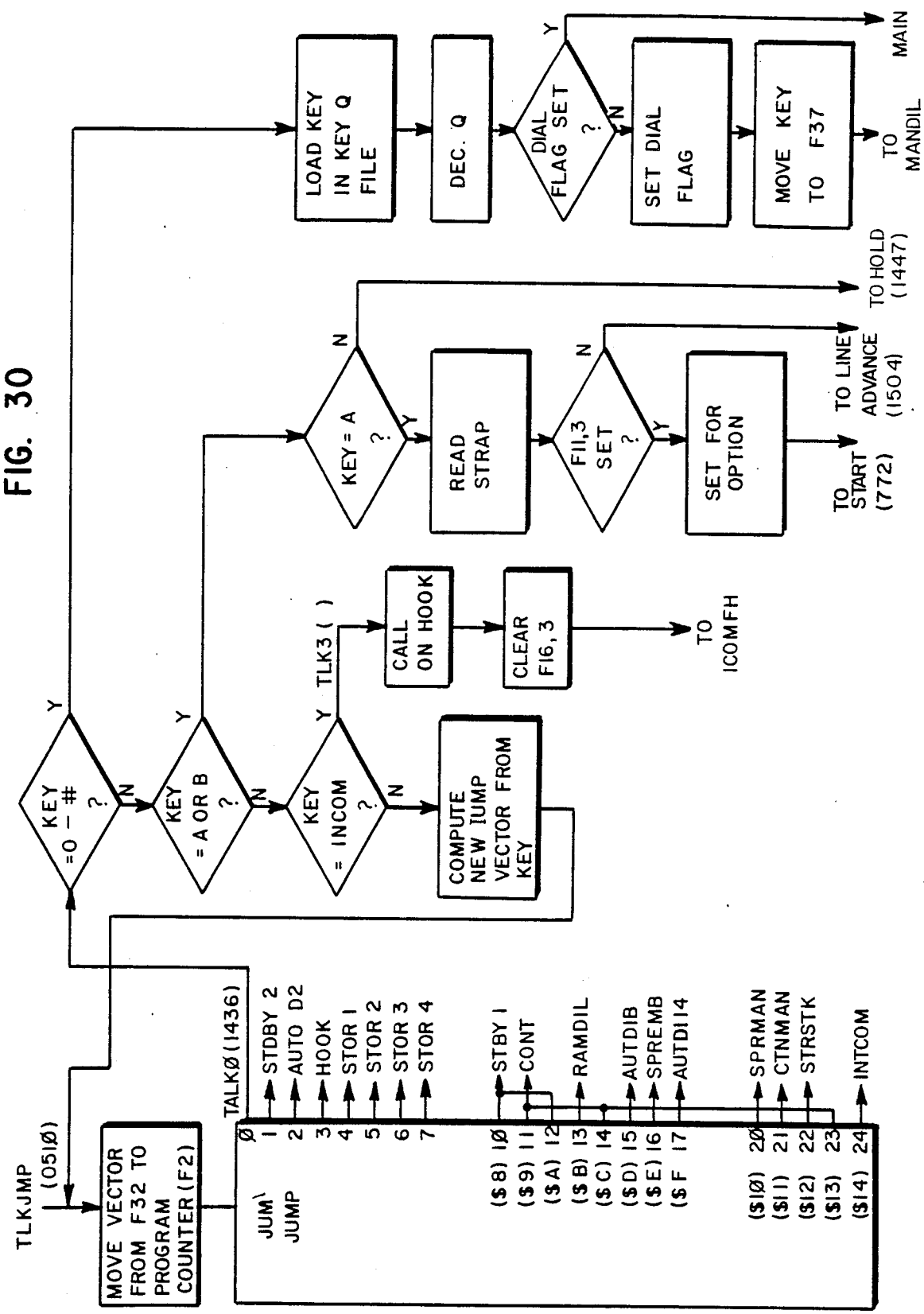

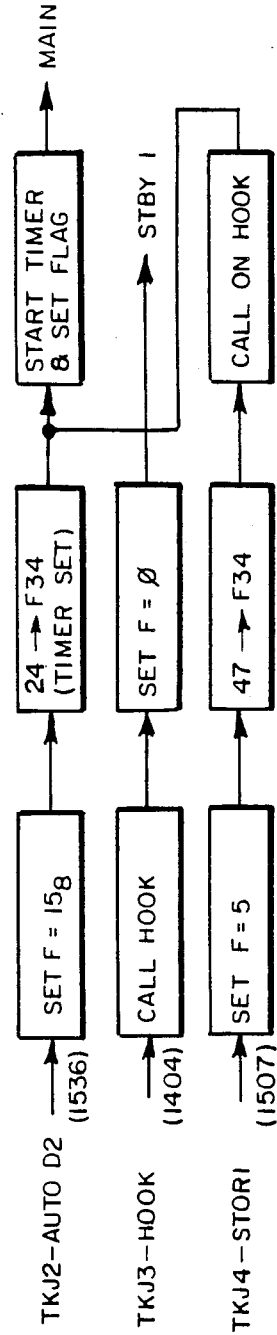
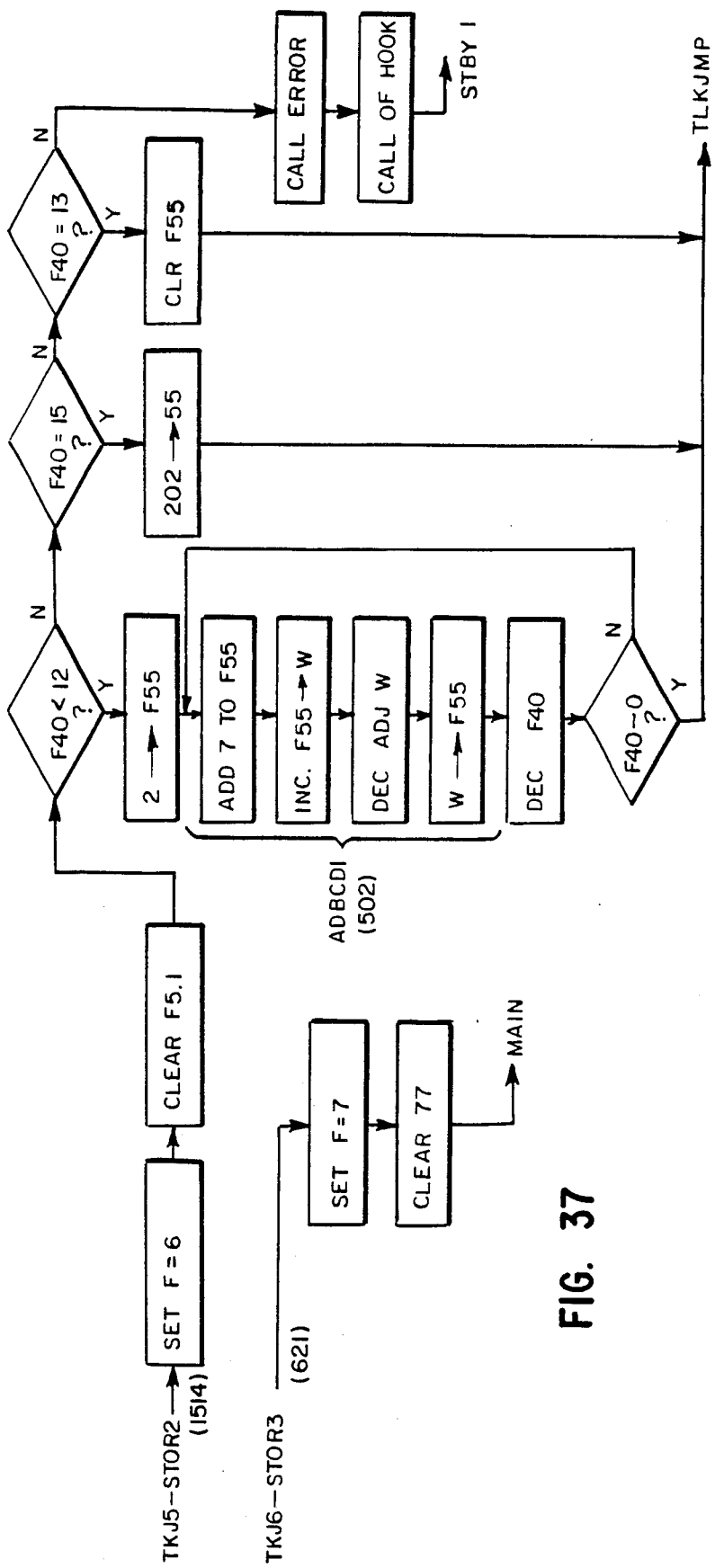
FIG. 36
FIG. 37

CORDLESS TELEPHONE SYSTEM

This invention relates to a system which has many features usable advantageously in other types of systems while being especially desirable in a cordless telephone system as disclosed. The system provides high quality transmission and reproduction of audio signals and accurate and reliable transmission of security and digital signals and it is operable over an extended distance range without using excessive power or creating interference. It also incorporates many features to make it more convenient and desirable for the user, including the storage of local, long distance and private carrier numbers for automatic dialing, the use of control and handset units for intercom and three-way conversations, and the provision of a two-line interface. The system is economically manufacturable while being durable and highly reliable with excellent performance.

BACKGROUND OF THE INVENTION

Prior cordless telephone systems have had a number of problems and have been limited with respect to automatic dialing and other features provided for the user. Many of the problems have been related to the need to operate at very low power levels to avoid interference with the reception of radio and television signals by others. The quality of reproduction of audio signals has often been poor and there have been many problems with disruptions of transmissions and fading, with inadequate transmission of dialing signals, and with the dialing of wrong numbers, false ringing and failures to go on hook after completion of a conversation. Unauthorized access has also been a problem.

SUMMARY OF THE INVENTION

This invention was evolved with the general object of providing a system for accurate and reliable transmission of audio and digital signals, particularly for cordless telephone or other systems which must operate in situations in which the relative noise levels are quite high.

Another object of the invention is to provide a cordless telephone system having a high degree of security against unauthorized access and in which the user has many different available modes of operation, with respect to programming, automatic dialing, multiline operation, hold operation and intercom communications.

A further object of the invention is to obtain improved reliability and to prevent malfunctions and failures in operation, especially in systems such as cordless telephone systems having a portable battery operated handset or the like.

Still another object of the invention is to provide a high performance system which is economically manufacturable and also durable and very reliable.

Important features relate to the transmission of a handshake signal after validation of a received signal and the transmission of series of signals having a predetermined value to acknowledge receipt of the handshake signal.

A DTMF chip is provided for permitting touch tone dialing, when desired, and it also performs a variety of additional important functions including the generation of signals which are transmitted to the handset to signal the reception of transmitted digits, the transmission of a signal for a reconstructed ring tone in the handset and the generation of ring/call signals at the control unit speaker.

A speaker is provided in the control unit together with a microphone and voice-operated switching circuitry is provided to allow the control unit to be used as a speaker phone and for intercom communication with the handset as well in three-way conversations.

A specific feature relates to the provision of control circuitry operative to facilitate use of the control unit for communications. For example, it is found that in a local answer mode it is desirable to inhibit transmission of signals from the handset to the outside line and the control circuitry operates to inhibit such transmission and to perform other functions which were discovered or recognized as being desirable.

Another specific feature relates to the use of microprocessor with an interrupt circuit which operates in response to a signal from the handset or a signal from an intercom switch or a signal froma ring detect circuit. With this feature, control operations are effected in accordance with the identity of the signal which caused the interrupt and in accordance with the status of the control unit, permitting priority handling of signals as required or desired for optimum communications.

Additional important features relate to the provision of a two line interface circuit and the provision for switching from one line to the other, together with the provision of hold controls for hold of a signal on one line, the handset being usable for control of such functions.

These and other objects, features and advantages of the invention will become more fully apparent from the following detailed description taken in conjunction with the accompanying drawings.

BRIEF DESCRIPTION OF THE DRAWINGS

FIG. 9 is a circuit diagram of switching and control circuitry of the control unit;

FIG. 10 is a circuit diagram of a switching circuit of the control unit;

FIG. 11 is a schematic diagram of microphone amplifier and voice-operated control circuitry of the control unit;

FIG. 12 is a circuit diagram of interrupt circuitry of the control unit;

FIG. 13 is a circuit diagram of processor, memory, tone generator and control circuitry of the control unit;

FIG. 14 is a circuit diagram of a Schmitt trigger circuit of the unit;

FIG. 15 is a circuit diagram of a 83 Hz detector circuit of the control unit;

FIG. 16 is a circuit diagram of 98 Hz detector and filter circuits of the control unit;

FIG. 17 is a circuit diagram of a gate circuit of the control unit;

FIG. 18 is a circuit diagram of a line circuit of the control unit;

FIG. 22 is a memory map showing the use of general purpose registers of the microcomputer of FIG. 21 in the system of the invention;

FIG. 25 is a flow chart illustrating "ESCAPE" operations in the system;

FIG. 26 is a flow chart illustrating certain "KEYRED" and related operations in the system;

FIG. 27 is a flow chart illustrating the detection of low-to-high signal transitions in the system of the invention;

FIG. 30 is a flow chart illustrating certain "TALK JUMP" and "TALKMODE" operations of the systems of the invention;

FIGS. 36–42 are flow charts illustrating certain "TALK JUMP" operations which may be performed in response to the storage of certain vectors prior to execution of the "TALK JUMP" mode;

DESCRIPTION OF A PREFERRED EMBODIMENT

Figure 1:
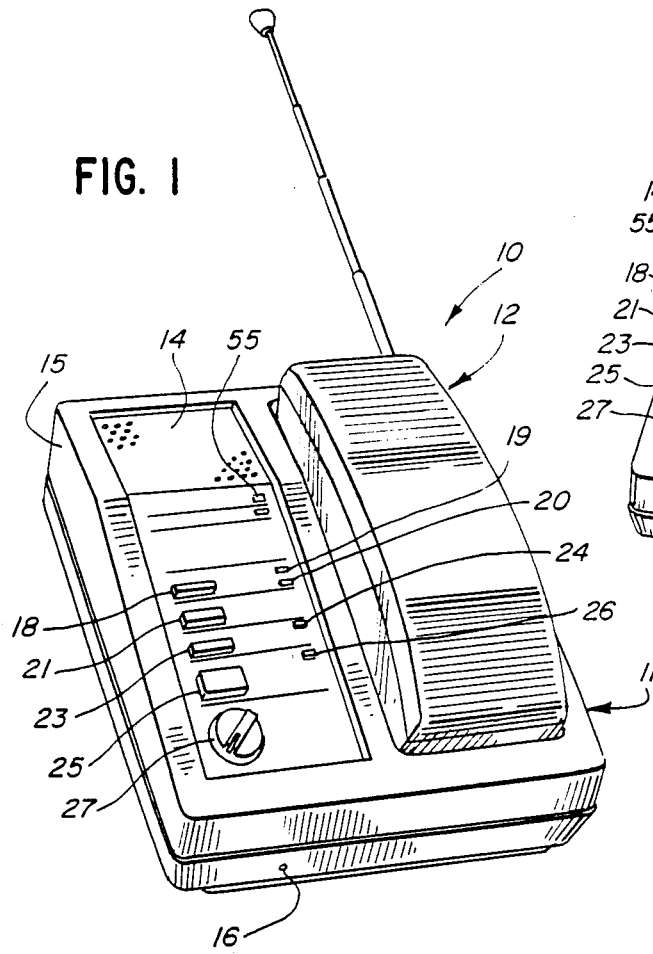
FIG. 1 is a perspective view showing a base or control unit and a handset cradled thereon, constructed in accordance with the invention.
Figure 2:
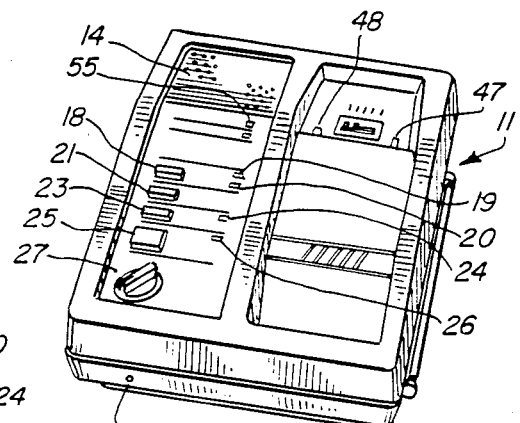
FIG. 2 is a perspective view of the control unit, from a different viewing angle and with the handset removed.

Reference numeral 10 generally designates telephone apparatus constructed in accordance with the principles of this invention. The apparatus 10 includes a control unit 11 which is arranged to be connected to one or two telephone lines and also to a 120-volt AC supply. A handset 12 may be cradled on the control unit 11, when not in use, and may be lifted and carried to a remote location for radio communication with the control unit 11. The handset includes an extendable antenna 13 and a similar antenna is provided on the control unit 11.

The control unit 11 has a built-in speaker, mounted behind a perforated wall portion 14 of a housing 15 and also includes a microphone mounted behind an opening 16 in the housing 15. When the handset is at a remote position, the speaker and microphone may be used in answering an incoming call and they may also be used in an intercom mode for communication with the handset. A three-way conversation is also possible.

Control and signalling means are provided on the control unit 11, including a line select button 18 for switching from one telephone line to another. Two lights 19 and 20 are provided for indicating which line is in use.

A hold button 21 is provided which may be pressed to put an incoming call on hold, and which may be pressed again to return to the call or to put the call through to the handset. Light 22 is energized when a call is on hold. An intercom call switch 23 is provided which may be pressed to call the handset for intercom communication therewith, a light 24 being associated with the button 23. An answer button 25 and an associated light 26 are provided for use in answering incoming calls from the control unit 11. Button 25 may be pressed to answer calls and may be pressed again when the call is complete to disconnect from the line. A volume control knob 27 is provided for controlling the volume of the output signal from the speaker.

The handset 12 includes a microphone mounted behind openings 28 in a case 29 and a speaker which is mounted behind a perforated wall portion 30 of the case 29. In addition, a separate ringer speaker is provided which is mounted behind openings in a wall portion 31 of the case 29, wall portion 31 being on the outside of the case, i.e., on a portion of the case which faces outwardly away from the ear when the wall portion 30 is held against the ear of the user. The separate ringer speaker thus obviates the possibility of applying a strong ringing signal directly to the ear.

The handset 12 has a number of controls. A two level volume control 32 is provided and an OFF/ON/TALK control 33 is provided. In the off position of control 33, the handset 12 will not receive calls and cannot be used to make calls. In the ON position of control 33, it can be used to receive calls and in the TALK position of control 33, it may be used to make calls as well as to communicate with the control unit and an outside call. The handset further includes a standard type of pushbutton key pad 34 with 12 keys for the numbers 0 through 9 and the symbols asterisk (*), and octothorpe (#).

The asterisk (*) key in an autodial mode is usable as a toll-dialing key and may be used to dial a 28 digit number. When used in conjunction with other automatic dialing features, it provides up to 49 digits to easily access alternative long distance carriers or services.

The octothorpe (#) key in the autodial mode functions as a pause key to provide an automatic three second dialing pause each time the button is pressed when storing an autodial number. Multiple pauses can be programmed to achieve a longer pause. Both the asterisk (*) and octothorpe (#) keys also function to produce the designated DTMF tones when not in the autodial mode and when DTMF dialing is selected at the central unit.

The handset 12 also includes a handset line advance or "LINE" key 35 which is usable to select either of the external phone lines connected to the control unit 11. A HOOK/FLASH key 36 is provided to allow recalling of dial tone without turning off the phone. It permits use in phone systems requiring "flash" for call transfer, conference calls, "call waiting", and other custom services. A HOLD key 37 is provided for putting an incoming call on hold. It may be pressed again to return to the call or to put the call through to the control unit 11.

An automatic dial or "AUTODIAL" key 38 is provided for automatically redialing the last number called and for automatically dialing a number stored in memory. An INTERCOM key 39 is provided which may be pressed to call the control unit 11 for intercom communication therewith.

A "STORE" key 40 is provided for allowing the user to store into memory any of ten numbers with up to 22 digits in each number, or store into memory a toll-dialing number with up to 28 digits. Pauses of three seconds may be stored in the autodial number by pressing the octothorpe (#) key. More than one pause may be stored. However, each three second pause counts as one digit in storage memory.

The handset 12 further includes a mute bar 42 adjacent the microphone openings 28. When pressed, the microphone is momentarily disconnected to allow the user to talk privately without disconnecting from the other party.

The handset 12 includes a rechargeable battery for supplying power to the various circuits thereof. To charge the battery, two contacts 43 and 44 of the handset 12 are engaged with pins 45 and 46 of the control unit 11 when the handset is placed in a cradled position on the control unit 11.

Figure 4:
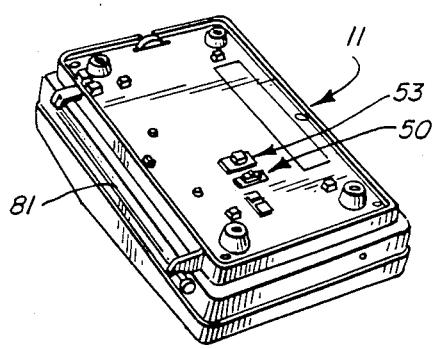
FIG. 4 is another perspective view of the control unit, showing the appearance of the underside thereof and also showing the antenna of the control unit and switch controls which are not visible in the normal position of the control unit.

Full duplex communication between the control unit 11 and handset 12 is obtained by frequency modulation and demodulation of 46/49 MHz pairs of FCC-designated channels. Four sets of crystals are provided for selective control of the frequency of the transmitter and receiver of each unit so that if there is a user nearby operating on the same channel pair, a different channel pair may be selected. As shown in FIG. 4, the control unit 11 has a multichannel switch control 47 and a similar control is provided in the handset 12.

An important feature relates to the provision of a programmable security system. Different codes can be programmed into a non-volatile memory in the control unit 11, using the handset pushbuttons. The user chooses his own personal security code to prevent unauthorized outside access to his telephone line or lines.

Figure 3:
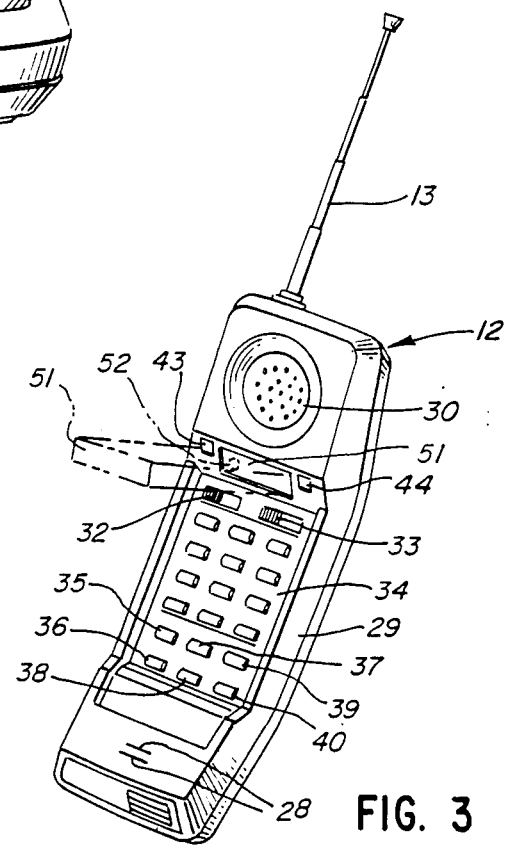
FIG. 3 is a perspective view of the handset, showing the keys and other elements on one side of the handset which are not visible in the cradled position of FIG. 1.

To change the security code, the control unit 11 is turned over to a position as shown in FIG. 4 and a code switch control 50 is moved to a "code" position. Then a phone number plate 51 on the handset 12 is removed to expose a code select pushbutton 52, as shown in FIG. 3. With the control 33 of the handset in the ON position, the user holds the pushbutton 52 depressed, using a ball-point pen, while entering the new code using the keys 34. He or she enters three digits of his or her choice. When each digit is entered, a confirmation tone is generated. Then the button 52 is released, the plate 51 is replaced, and the control 50 on the base unit is moved to a "telephone" position. Any one of the twelve keys of the key pad 34, the "LINE" key 35, the "HOLD" key 37 or the "INTERCOM" key 39 may be used to enter a digit of the security code. Thus, 3375 security codes are possible.

The apparatus is compatible with tone (DTMF) and also with ten and twenty pulse-per-second rotary dial systems. A selector switch control 53 is provided on the bottom of the control unit 11 to be set in accordance with the type of system to which the apparatus is connected.

The control unit 11 further includes a power light 55, to indicate when power is supplied to the unit, and a charge light 56 which is energized when the battery of the handset 12 is being charged.

In operation, the control unit 11 is connected to a telephone line or lines and also to a power outlet. Batteries of the handset 12 are charged by placing it in the control unit for a sufficient time. Then the handset 12 may be removed from the control unit 11 and the telescoping antenna 13 may be extended. Then while holding the handset 12 and with the control unit 11 in view, the operation of the system may be checked. The power indicator light 55 of the control unit 11 should be energized. Then the OFF/ON/TALK switch control 33 on the handset 12 may be placed in the TALK position. One of the lights 19 or 20 will be energized, indicating that the handset is in use on that line. If the handset line advance button 35 on the handset 12 is pressed, or if while the handset is not in use, the line select control 18 on the control unit 11 is pressed, the line indicator lights 19 and 20 will change to an opposite condition. At this time, a dial tone will be heard through the speaker of the handset 12 as well as through the speaker of the control unit 11.

Then the OFF/ON/TALK control 33 may be placed in the TALK position and the range of operation of the apparatus may be checked. When moving several hundred feet away from the control unit, a dial tone will be heard and an audible system response signal will be heard when any one of the numbered keys of the key set 34 is pressed. This system response signal is an "in-range" signal, indicating that the user is within the operating range of the system and that calls can be received and placed.

To receive calls at the handset 12, the control 33 may be placed in the ON position such that when a call on either line is received, the handset will emit an audible ring signal. Then the control 33 may be placed in the TALK position and the handset may be used in a conventional fashion. When the call is ended, the switch control 33 is placed in the ON condition, to place the handset in condition to receive a subsequent call.

To place a call, the control 33 is placed in the TALK position and the number one line will initially become active. If the user wishes to use the number two line, the line advance or "LINE" key 35 is pressed once. After waiting for a dial tone, the user selects the desired number by slowly pressing the proper keyboard buttons. If an error is made, the HOOK/FLASH button 36 is pressed to regain dial tone. If a busy signal is received or if there is no answer, the HOOK/FLASH button 36 may be pressed or the control 33 may be switched to ON and then back to TALK. Then the automatic redial button 38 may be pressed to cause the last number dialed to be automatically redialed.

The apparatus is designed for use in commercial systems such as those in which a call may be transferred to another line within a private exchange by depressing the hook switch. The HOOK/FLASH button 36 is usable in such systems in the same way as the "hook switch" of a standard telephone set.

The HOLD button 37 may be pressed once to place a call on hold and once again to return to the call. To place the line being used on hold and answer a call on the other line, the hold button 37 may be pressed once and then the line advance key 35 may be pressed to select the alternate line. When the call is completed on the second line, the key 35 may be pressed to regain the original line and then the hold key 37 may be pressed to communicate with the original line.

The control unit 11 may be used as an answering phone completely independent of the handset 12 and may be also used for intercom communication with the handset 12. To receive a call at the control unit 11, the answer button 24 is pressed and then the control unit operates as a "speaker phone". The volume of the speaker of the control unit may be controlled by rotating the control 26 which may be rotated fully counterclockwise to turn the speaker off completely.

To call the control unit 11 from the handset, the control 33 is placed in the talk position and the intercom control 39 is pressed to signal the control unit 11. The person at the control unit 11 may then answer by pushing the intercom call button 23 and then normal intercom communications may be made. Communication may be terminated at the handset by placing the control 33 in the on or off position, or by pressing the "HOOK" key. In addition, it may be terminated at the control unit 11 by pressing the intercom control switch 22.

To receive a call and then use the intercom feature, the handset 12 is used to receive a call and then the hold button 37 is pressed to put the call on hold. Then the intercom button 39 is pressed to call the control unit and the user at the control unit may answer by pressing the intercom/call button 22. Either the handset 12 or the control unit 11 may be used to terminate the intercom function and the other unit may then be used to communicate with the outside party. After the communication in the intercom mode is terminated and the handset is to be used to communicate with the outside party, the HOLD button 37 at the handset 12 is pressed to enable communication with the outside party on the line. If the control unit 11 is to be used to communicate with the outside party, the handset 11 is terminated by placing the control 33 in the on position after which the local answer button 25 and hold button 21 at the control unit are pressed to activate the control unit speaker phone operation and remove the line from hold.

An auto-dial memory system is provided for automatically dialing any of 12 telephone numbers programmed into the memory within the control unit 11. Each of the numbered keys of the group 34 may be used in storing up to a 22 digit number. The asterisk (*) key is usable in storing a number having up to 28 digits and is labeled as a "TOLL" key. It makes possible storing of the code numbers required when using the various private carrier long distance services. The octothorpe (#) key is usable for programming of a delay which is preferably about three seconds. The operation obtained through this key is an important feature. When using a long distance service, there is usually a delay after an access code number has been entered and a second dial tone is heard. There is also a delay in some business telephone systems before a second dial tone is heard when accessing an outside line. Pressing the octothorpe (#) or pause key will cause the control unit to delay before continuing to dial a number. If necessary, two or more delays can be entered to provide a total delay of six or more seconds, for example.

Another feature relates to the generation of an audible "key-confirming" tone each time a key stroke is effected and properly entered. Also, if an error is made in a programming sequence, an audible error signal, in the form of three consecutive beeps, is heard.

To program a local or long distance number, the control 33 is placed in the talk position and the store key 40 is pressed. Next, the desired memory location is entered. For example, the number 5 key may be pressed. Next, the desired telephone number is entered either as a local number or as a long distance number. In programming a long distance number, for example, the initial digit may be "1⇌, under present long distance practice. After the telephone number is entered, the store key 40 is again pressed to load the number into memory.

The toll or asterisk (*) key may be used for automatic dialing of the number of a long distance service and the user's access code number for that service. It can also be used for the complete automatic dialing of a particular long distance number through a long distance service. To program using the toll or asterisk (*) key, the control 33 is placed in the talk position and then the store key 40 is pressed. Then the toll key is pressed. Then the access number of the long distance service is entered, including the area code of the access number, if any, followed by a pause which is entered by depressing the pause or octothorpe (#) key.

Next, the user's access code for the long distance service is entered. This sequence may optionally be followed by entry of a particular long distance number which the user may desire to have automatically dialed through use of the toll key alone.

In using the automatic dialing functions, a local or long distance number may be automatically dialed by placing the switch 33 in the talk position, then pressing the automatic dialing key 40 and then pressing the number key of the desired number. To use the toll (*) key in automatically dialing a long distance number which has been stored for a recall through use of one of the numbered keys, the control 33 is placed in the talk position, the automatic dialing key 40 is pressed, then the toll (*) key is pressed and then the number key of the desired number is pressed.

When a particular long distance number has been entered for automatic dialing through use of the toll key, it is only necessary to place the control 33 in the talk position, then press the automatic dialing key 40 and then press the toll (*) key. The system will then carry out all of the automatic dialing functions required for dialing of the desired long distance number through a long distance service.

The autodial capability also includes means to automatically dial the long distance service dialing sequence while a destination number is entered from the keyboard. Press autodial, *, /. The access and user code numbers will automatically be dialed; then the system will accept any quantity of numbers to be entered from the keyboard. When the destination number has been dialed, the user presses autodial again. The autodial sequence will be completed.

GENERAL DESCRIPTION OF CONTROL UNIT CIRCUITS (FIG. 5)

Figure 5:
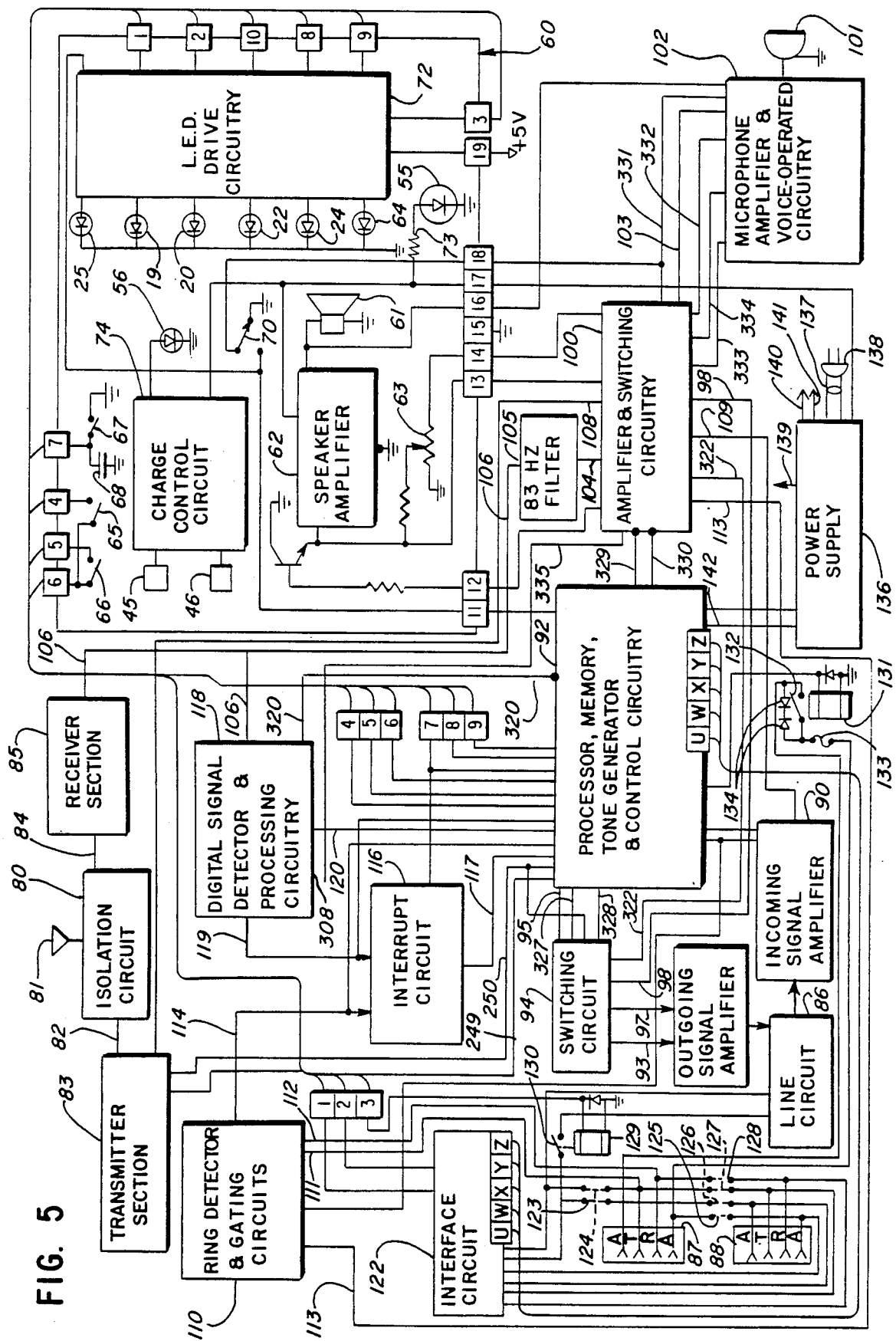
FIG. 5 is a schematic block diagram of the electrical circuitry of the control unit.

FIG. 5 is a schematic block diagram of the circuitry of the control unit 11. An indicating and switching circuit board 60 is provided which has terminals numbered 1 through 19 and which is mounted under the top wall of the case 15 of the unit 11. The circuit board 60 supports various switches and indicator lights of the unit as well as a speaker 61, a speaker amplifier 62 and a potentiometer 63 which is controlled by the volume control knob 26. The line 1 and line 2 indicator lights 19 and 20 as well as the hold, intercom, local answer, power and charge indicator lights 22, 24, 26, 55 and 56 are in the form of light-emitting diodes. An additional light-emitting diode 64 may optionally be provided for use when the apparatus is to be used with a single telephone line only. In that case, the light 64 is an "in use" light which indicates that the apparatus is in operation.

A hold switch 65, operated by the hold button 21, is connected between the illustrated terminals 4 and 6. A switch 66, operated by the line select button 18, is connected between terminals 5 and 6. An intercom switch 67, operated by the intercom button 23, is connected between terminal 7 and ground, a capacitor 68 being connected in parallel with the switch 67. A switch 70 operated by the local answer button 25, has a movable contact connected to ground and fixed contacts connected to terminals 11 and 18. Driver circuitry 72 is provided for energizing the lightemitting diode 26 when the local answer switch 70 is in a local position and for energizing diodes 19, 20, 22, 24 and 64 when terminals 1, 2, 10, 8 and 9, respectively, are grounded. Circuitry 72 is supplied with +5 volts from terminal 19. The power-light diode 55 is connected in series with a resistor 73 to terminal 17 which supplies +10 unregulated voltage to the speaker amplifier 62 and also to a charge control circuit 74 which is connected to the charge terminals 45 and 46 as well as the charge indicating diode 56.

The control unit 11 includes an isolation circuit 80 which is connected to an antenna 81 and through a line 82 to the output of a transmitter section 83 and also through a line 84 to the input of a receiver section 85. Isolation circuit 80 operates to minimize transmission between the output of the transmitter 83 and the input of the receiver 85 and it forms an important feature of the invention, as hereinafter described.

The control unit 11 also includes control and signal processing circuitry connected to the transmitter and receiver sections 83 and 85 and also to the indicating and switching circuit board 60. Terminals of the control and signal processing circuitry, indicated schematically by numbered boxes, are connected to the correspondingly numbered terminals of the circuit board 60 as diagrammatically illustrated.

A line circuit 86 is connectable to one or the other of a pair of jacks 87 and 88 and is connected to the output of an outgoing signal amplifier 89 and the input of an incoming signal amplifier 90.

Processor, memory, tone generator and control circuitry is provided, as diagrammatically illustrated by block 92 in FIG. 5. When the apparatus is connected to a telephone system adapted to receive tones, such tones may be supplied to one input of the out-going signal amplifier 89 through a line 93 which is connected through a switching circuit 94 to a tone signal output line 95 of the circuitry 92. A second input of the amplifier 89 is connected through a line 97 and through the switching circuit 94 to a line 98 which is connected to switching and amplifier circuitry 100.

A microphone 101 of the control unit 11 is connected to amplifier and voice operated circuitry 102 which has an output connected through a line 103 to the switching and amplifier circuitry 100. When the control unit 11 is in a local answer mode of operation, amplified signals from the microphone 101 may be applied through the circuitry 100, line 98, circuit 94 and line 97 to an input of the outgoing signal amplifier 89 to be transmitted through the line circuit 86 to an outside line.

The switching and amplifier circuitry 100 is also connected through a line 104 and through a 83 Hz rejection filter 105 and through a line 106 to the output of the receiver section 85, permitting transmission of audio signals to an outside line. Such audio signals may also be applied from the circuitry 100 to terminal number 14 of the circuit board 60, terminal 14 being connected to the potentiometer 63. The movable contact of potentiometer 63 is connected to the input of the amplifier 62 which amplifies an audio signal speaker 61.

For transmission of audio signals from the control unit 11 to the handset 12, a modulation signal input of the transmitter section 83 is connected through a line 108 to the circuitry 100 which, as hereinafter described, includes a summing amplifier one input of which is connectable through switching circuitry to the line 103. Another input is connectable through switching circuitry to a line 109 which is connected to the output of the incoming signal amplifier 90.

Ring detector and gating circuitry 110 is provided, connected through lines 111 and 112 to the jacks 87 and 88. One output of the circuitry 110 is connected through a line 113 to the circuitry 100. Another output is connected through a line 114 to the circuitry 92 and to an interrupt circuit 116 which is connected through a line 117 to the circuitry 92. In response to a ring signal detected on an outside line, the processor and control circuitry 92 is arranged to perform control operations, as determined by the status of the equipment when the ring signal is detected.

For control of operations from the handset 12, digital signal detecting and processing circuitry 118 is provided, having an input connected to the receiver output line 106 and having one output connected to a line 119 which is connected to an input of the interrupt circuit 116 and also to an input of the circuitry 92. To establish communication from the handset 112 to the control unit 11, the handset generates a 83 Hz signal and coded signals as hereinafter described, the 83 Hz signal and the coded signals being detected by the circuitry 118. Among other things, the circuitry 118 develops a "signal present" signal on the line 119 when either the 83 Hz signal or a coded signal is developed. The coded signals are processed and applied through a line 120 to the circuitry 92. The coded signals are, in effect, analyzed by the circuitry 92 and if the signals correspond to a user's code stored in a memory circuit of the circuitry 92, the control unit operates to transmit "handshake" signals and otherwise operates to establish communication with the handset 12.

The circuitry of the control unit 11, as illustrated, includes a two-line interface circuit 122 and it is designed to permit connection to two separate telephone lines. In addition to the "T" and "R" line terminals, a pair of auxiliary terminals may be provided, for use in signalling a switchboard, for transfer of a call to another telephone of a private system or for consultation, three-way calls, etc. The apparatus may, however, be used with a non-commercial type system. For single line operation, the two-line interface circuit 122 may be disconnected and jumpers may be installed as indicated by dotted lines 123 and 124. Also, jumpers, as indicated by dotted lines 125–128, may be installed to permit use of the jack 88 for connection to a telephone accessory such as an answering machine.

A relay 129 is provided which is controlled from the circuitry 92 in a manner as hereinafter described and which has a contact 130 connected in series between the tip or "T" terminal of the operative jack and one input of the line circuit 86. Contact 130 operates as a hook switch and it is controlled by the circuitry 92 to effect pulse-dialing operation, when the apparatus is connected in a telephone system which uses pulse dialing. The type of dialing operation is controlled by the dial select switch control 53 which interconnects terminals of the circuitry 92, as hereinafter described.

Another relay 131 is provided, also operated from the circuitry 92 and having a contact 132 connected in series with a fuse 133 between auxiliary jack terminals. Protective diodes 134 are connected in series with each other and in parallel with the contact 132. Relay 131 and contact 132 are, of course, used only in commercial applications.

A power supply circuit 136 is provided, connected through a line cord 137 to a plug 138. The power supply circuit 136 supplies a +10 regulated voltage on a line 139, a +10 unregulated voltage on a line 140, a +5 regulated voltage on a line 141 and a power-up signal on a line 142. In addition, it supplies a minus 25-volt memory enable signal on a line 143, connected to a nonvolatile memory circuit within the circuitry 92.

GENERAL DESCRIPTION OF HANDSET CIRCUITS (FIG. 6)

Figure 6:
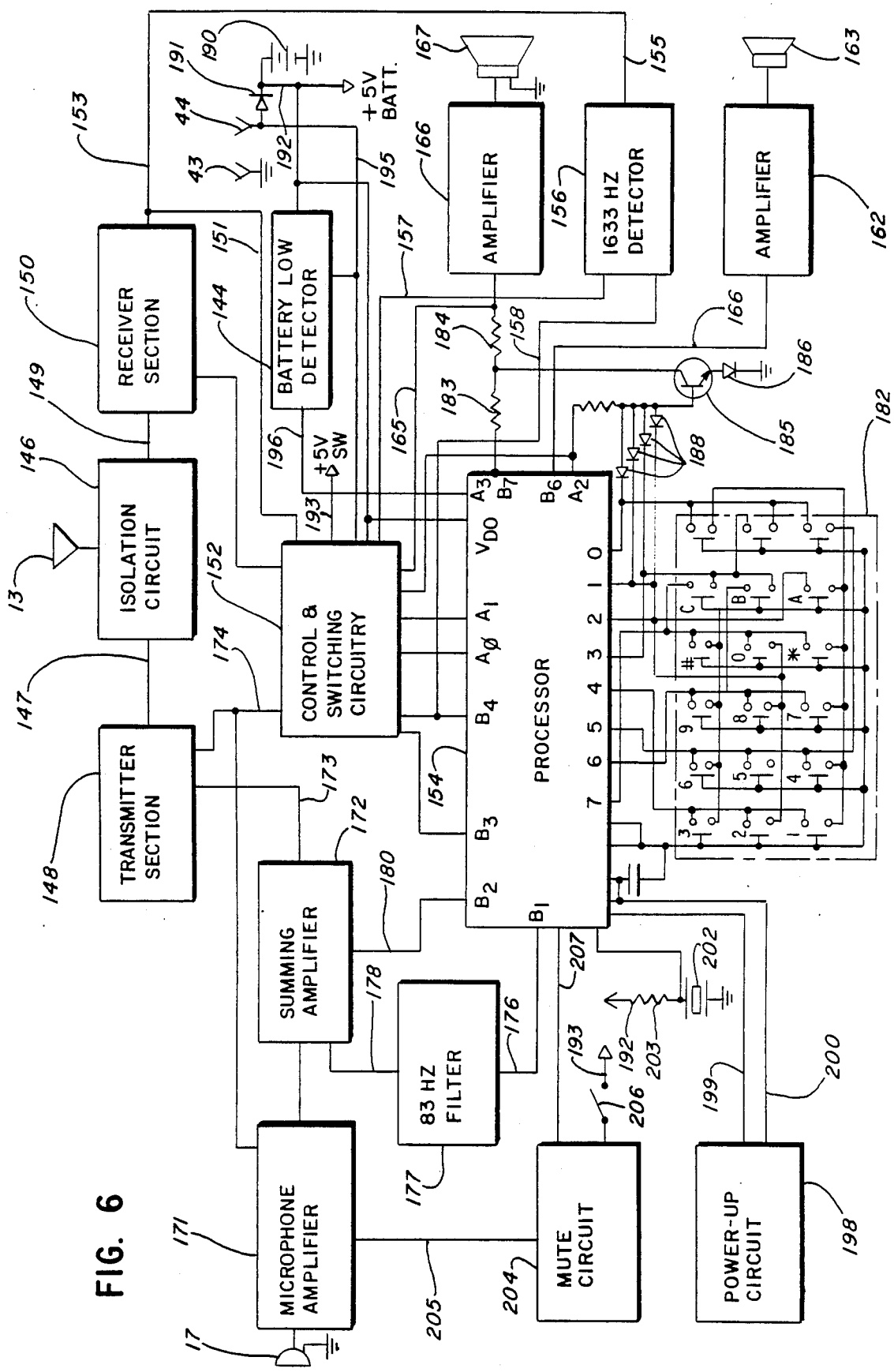
FIG. 6 is a schematic block diagram of the circuitry of the handset.

FIG. 6 is a schematic diagram of the circuitry of the handset 12. An isolation circuit 146 is provided which is connected to the antenna 13 and which is connected through a line 147 to the output of a transmitter section 48 and also through a line 149 to the input of a receiver section 150. A voltage supply input of the receiver section is connected through a line 151 to control and switching circuitry 152 which is connected to a microprocessor 154 to control operation of the receiver section. The output of the receiver section 150 is connected to a line 155 which is connected to a volume control switch in the circuitry 152 and also to an input of a 1633 Hz detector 156, the output of the 1633 Hz detector 156 being applied through a line 157 to the circuitry 152. A control input to the detector 156 is connected through a line 158 to an output of the processor 154 which is also connected through a line 159 to the circuitry 152. When the control 33 of the handset 12 is in its "on" position and a 1633 Hz signal is produced at the output of the receiver 150 and detected by the detector 156, the processor 154 operates to apply a signal through a line 160 to the input of an amplifier 162 connected to a ringer speaker 163. The 1633 Hz detector 156 is also used in detecting "handshake" signals, as hereinafter described.

When the ringer speaker 163 is energized, the user may respond by moving the control 33 to the "TALK" position. Then audio signals developed at the output of the receiver 150 and applied through line 151 to the circuitry 152 are transmitted through a line 165 to the input of an amplifier 166 connected to a main speaker 167 of the handset 12. The user may then hear communications from a party calling from an outside line, or, in the intercom mode, from a person located at the control unit 11.

To provide communication from the user of the handset to an outside party or to a person at the control unit 11, a microphone 170 is provided which is connected to the input of an amplifier 171. The output of the amplifier 171 is connected to one input of a summing amplifier 172 which has an output connected through a line 173 to the transmitter section 148 to frequency modulate the output of the transmitter section 148. Control inputs of the transmitter 148 and amplifier 171 are connected through a line 174 to the control and switching circuitry 152.

To call an outside party from the handset 12, the user moves the control 33 to the "TALK" position and then the processor 154 operates to apply a 83 Hz square wave signal through a line 176 to a 83 Hz filter 177 which is connected through a line 178 to a second input of the summing amplifier 172. The output of the transmitter section 148 is then modulated to send out a substantially sinusoidal 83 Hz burst which signals the control unit. After a 83 Hz burst is sent, the processor develops a 98 Hz coded signal on a line 180 which is applied to a third input of the summing amplifier 172. The coded signal is detected by the control unit and if properly received, the control unit develops a 1633 Hz "handshake" signal which is transmitted back to the handset to be detected by the detector 156. Then the processor operates to develop a 98 Hz coded null signal on the line 180 for transmission by the transmitter section 148. If the null signal is properly detected by the control unit 11, the transmission of the 1633 Hz "handshake" signal is terminated and then the processor 154 responds to the termination of the "hand shake" signal to develop another coded signal on the line 180 for transmission to the control unit, the sequence being repeated.

When the coded signals correspond to a security code stored in the memory of the control unit, the control unit may function to connect to an outside line and to allow transmission of a dial tone signal back to the handset. Then keys of the key set 34 may be used to dial a number to be called, the processor 154 being then operative to develop digital signals on the line 180 corresponding to the dialed digits.

The switches of the key set 34 are located in a keyboard circuit 182 as shown with connections to the processor 154 as shown. When any one of the keys of the key pad 34 or any of the control keys is depressed and there is an acceptance of that key by the control unit, the control unit sends a tone signal to the handset. This tone is detected by the handset 1633 Hz detector which causes the processor to output a beep tone which is applied through resistors 183 and 184 to the input of the speaker amplifier 166. The junction between resistors 183 and 184 is normally clamped to ground through a transistor 185 and a diode 186, the base of the transistor 185 being forwardly biased through a resistor 187. When any one of the keys is depressed, the base of the transistor 185 is grounded through one of four diodes 188 connected to four of the lines of the keyboard matrix.

Power for the handset 12 is supplied by a battery 190 having a grounded negative terminal and having a positive terminal connected through a diode 191 to the charging terminal 44, the other charging terminal 43 being connected to ground. The positive terminal of the battery 190 is connected to a +5 volt line 192 which is connected directly to certain circuits as diagrammatically indicated. As hereinafter described, a switch of the circuitry 152 operates when the control 33 is moved to the "on" or "talk" positions to connect line 192 to a line 193 which is designated as a +5 volt switch line and which is connected to other circuits as indicated.

A battery low detector 194 is connected to the line 192 and also to a line 195 which is connected to the charge terminal 44. The output of the battery low detector 194 is connected through a line 196 to the processor 154. The processor operates to effect transmission of two "beep" tones periodically at 15-second intervals for 15 minutes, followed by 8 beeps in rapid sequence before automatic shutdown. The remaining charge of the battery 190 after shutdown will be sufficient for holding the memory circuits for months.

A power-up circuit 198 is connected to stand by and master clear lines of the processor 154, through lines 199 and 200. Clock circuitry of the processor 154 is connected to a crystal 202 and through a resistor 203 to the +5 volt battery line 192.

The handset 12 further includes a mute circuit 204 which is connected through a line 205 to the microphone amplifier 171. One input of mute circuit 204 is connected through a switch 206 to the +5 volt switch line 193, the switch 206 being operated by the mute bar 42. A second input of the mute circuit 204 is connected through a line 207 to the processor 154.

TRANSMITTER, RECEIVER AND ISOLATION CIRCUITS OF CONTROL UNIT 11 (FIG. 7)

Important features of the invention relate to the coupling of the antenna of each unit to the transmitter and receiver sections thereof in a manner such as to obtain high efficiency and low noise and to obtain a high degree of isolation with respect to detection of transmitted signals in the receiver section. The circuits are such as to be substantially unaffected by variations in loading of the antenna such as those resulting from variations in the position of the antenna relative to the body of the user or other nearby physical structures. The circuits are also advantageous in being relatively simple in construction and in using relatively inexpensive components which are readily interconnected and which are reliable and trouble-free in operation.

Figure 7:
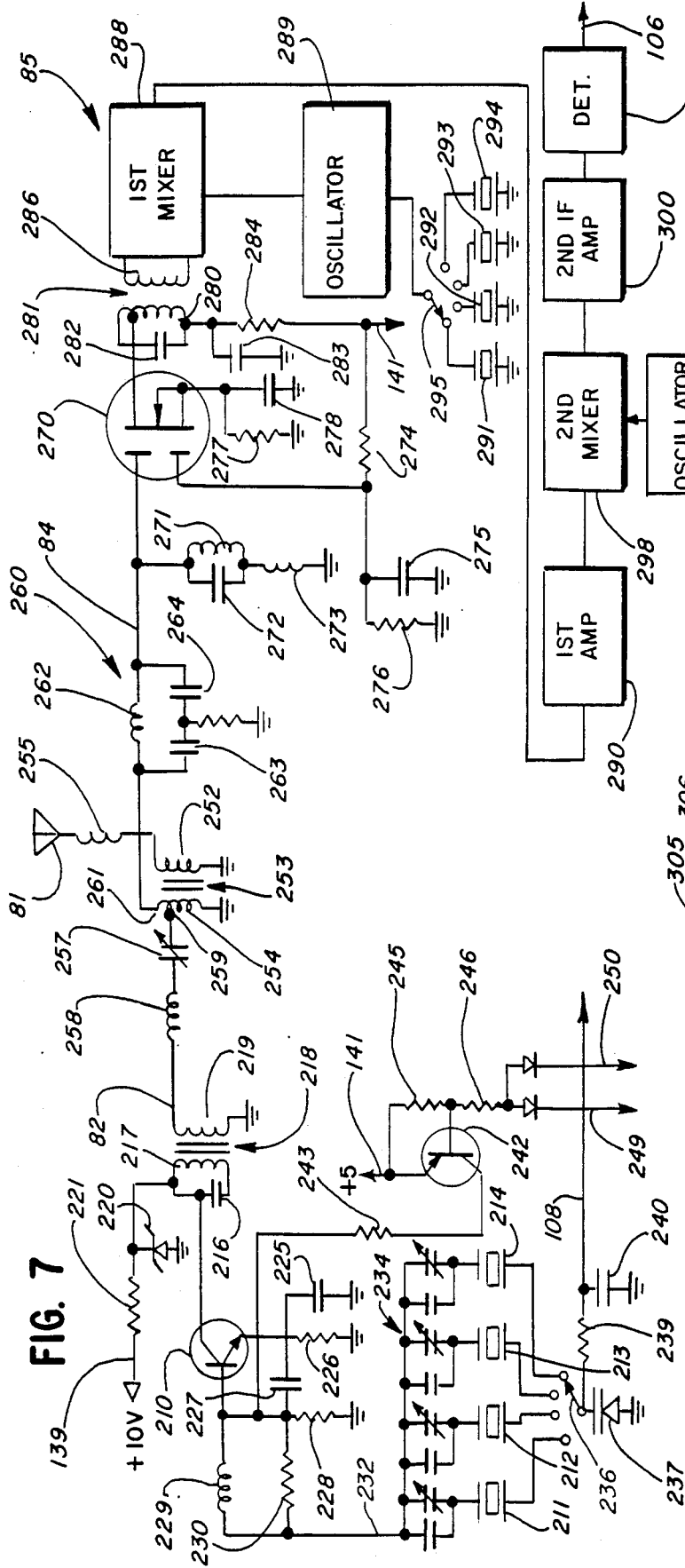
FIG. 7 is a schematic circuitry of the transmitter and receiver sections of the control unit and an isolation circuit thereof.

FIG. 7 is a circuit diagram of the isolation circuit 80 and transmitter and receiver sections 83 and 85 of the control unit 11. Similar circuits are used in the handset 12.

The transmitter section 83 comprises a transistor 210 which operates as an oscillator to develop a frequency modulated output signal having a center or carrier frequency which is within a narrow output frequency band such as the 46 MHz FCC-allocated band. The exact carrier frequency is controlled by one of four crystals 211-214 having resonate frequencies which are different from each other but which are within a narrow range at ⅓ the narrow output frequency range, a frequency-trebling action being produced in the oscillator circuit. When the user encounters interference, he may switch to a different frequency and ordinarily, at least one of the four available frequencies will be free of interference.

The oscillator circuit includes a tank circuit formed by a capacitor 216 and a primary winding 217 of a coil or transformer 218 which has a secondary winding 219 connected between the output line 82 and ground. A tap of the primary winding 217 is connected to the collector of transistor 210 while one end terminal of primary winding 217 is connected through a zener diode 220 to ground and through a resistor 221 to the power-supply line 139 to which a 10-volt regulated voltage is applied from the power supply 136. The tank circuit formed by capacitor 216 and winding 217 has a resonant frequency at about a mid-frequency of the aforementioned narrow output frequency band and at about three times the resonant frequencies of the crystals 211-214.

The emitter of the transistor 210 is connected to ground through a capacitor 225 and a parallel resistor 226 and is also connected through a capacitor 227 to the base thereof, the base being connected through a resistor 228 to ground. The base is also coupled to the crystals, being connected through a choke coil 229 and a resistor 230 to a line 232 which is connected to terminals of the crystals 211-214 through a group of capacitors 234 formed by four fixed capacitors and four trimmer capacitors in parallel. The other terminals of the crystals 211-214 are connected to fixed switch contacts which are selectively engageable by a movable switch contact 236.

A varactor diode 237 is provided for modulating the transmitted frequency. The switch contact 236 is connected to ground through a varactor diode 237 and through a resistor 239 to the line 108 which is connected through a capacitor 240 to ground. Audio and tone signals are applied to the line 108 from the switching and amplifier circuitry 100. The applied signals operate to vary the effective reactance of the varactor diode 237 to shift the frequency of oscillation in proportion to the magnitude of the signal applied on line 108.

On-off operation of the transmitter section 83 is controlled by a transistor 242 which has its collector connected through a resistor 243 to the base of the transistor 210 with the emitter of transistor 242 being connected to the +5-volt power supply line 141. The base of the transistor 242 is connected through a resistor 245 to the line 141 and is connected through a resistor 246 and through diodes 247 and 248 to two control lines 249. Control lines 249 and 250 are connected to outputs of the circuitry 92. When either of the lines 249 or 250 is brought to a low state, at or near ground potential, the transistor 242 is rendered conductive to apply a positive bias through resistor 243 to the base of the oscillator transistor 210 to cause operation of the oscillator circuit.

The isolation circuit 80 includes antenna coupling means which, in the illustrated arrangement, includes a winding 252 of a matching coil or transformer 253 which has a second winding 254. The antenna coupling means further includes a loading coil 255 connected between one terminal of the coil and the antenna 81, the other terminal of the winding 252 being connected to ground. The antenna may alternatively be coupled through the loading coil 252 to the ungrounded end of winding 254 so as not to use winding 252. Such an arrangement is used in the handset 12.

One terminal of the winding 254 is connected to ground and other terminals thereof are coupled through transmitter and receiver coupling means to the output of the transmitter section 83 and the input of the receiver section 85. The transmitter coupling means includes a capacitor 257 and an inductor 258 connected in series between a tap 259 of the winding 254 and the output line 82 of the transmitter section 83. The receiver coupling means comprises a filter 260 connected between an end terminal 261 of the winding 254 and the receiver input line 84. The filter 260 comprises an inductor 262 connected in series between the terminal 261 and line 84. It further includes a pair of capacitors 263 and 264 connected in series with each other and also in series between terminal 261 and line 84, the series combination of capacitors 263 and 264 being connected in parallel relation to the inductor 262. The filter 260 additionally includes a resistor 265 connected between ground and the junction between capacitors 263 and 264.

The isolation circuitry as shown is comparatively simple and it has a number of features which cooperate to reliably achieve excellent performance over a wide range of operating conditions. The combination of capacitor 257 and inductor 258 provides a series resonant circuit and the resonant frequency thereof is at the mid-frequency of the narrow output frequency band of the transmitter section. As a result, it provides minimum impedance to flow of current at the output frequency and efficient transmission of power to the antenna 81. The combination of capacitor 257 and inductor 258, however, has a high impedance at the receiver frequency which may, for example, be in the 49 MHz band when the transmitter frequency is in the 46 MHz band. Thus, efficient coupling is provided between the transmitter section and the antenna for transmission of signals while loading of the receiver section is very substantially reduced.

The filter 260 is very important in that it provides a further attenuation of high magnitude with respect to transmission of signals from the transmitter section output to the receiver section input. The combination of inductor 262 and capacitors 263 and 264 forms a parallel resonant circuit which is effectively in series relation with respect to transmission of signals from the terminal 261 to the receiver section input line 84. It is tuned to resonate at the transmitter frequency. When, for example, the transmitter frequency is in the 46 MHz range, the filter 260 is tuned to resonate in the 46 MHz range to provide a very high impedance with respect to transmission of transmitted signals to the receiver section input. However, the filter 260 is not resonant at the receiver frequency, which may be in the 49 MHz range when the transmitter frequency is in the 46 MHz range. The filter thereby provides a relatively low impedance with respect to received signals, for efficient coupling thereof.

The performance of the filter 260 is further enhanced by the provision of the resistor 265 between ground and the junction between capacitors 263 and 264. Resistor 265 operates to provide a phase balance such as to obtain an extremely high attenuation at the frequency to which the filter 260 is tuned.

In addition to having the capability of providing a very high attenuation of transmitted signals at the receiver section input, the isolation circuitry 80 is further advantageous in that its operation is substantially unaffected by variations in the loading of the antenna such as caused by variations in the relationship of the antenna to the body of the user. It is noted that although variations in loading of the antenna may affect the impedance between terminal 261 and ground, across the input of the filter section 260, such impedance variations do not affect the operation of the filter 260 to any substantial degree. Such is the case because the inductor 262 and capacitors 263 and 264 operate in effect as a parallel resonant circuit which provides a very high impedance in series relation to the path of signal transmission, augmented by the effect of the resistor 265.

It is advantageous to couple the transmitter output to the tap 259 of the winding 254 while coupling the receiver input to the end terminal 261 of the winding 254 in obtaining an optimum impedance match for efficient transmission of power to the antenna and for efficient transmission of a received signal to the receiver input.

The values of the components are important. By way of example, components 255, 257, 258, 262, 263, 264 and 265 may have values of about 1.8 microhenries, 6 picofarads, 2 microhenries, 0.22 microhenries, 27 pf, 27 pf, and 8200 ohms.

It is also noted that the use of relatively simple transmitter oscillator circuit as shown is advantageous in reducing noise to a minimum level. With the circuit as shown, it is possible to obtain an extremely low noise level and at the same time obtain highly efficient coupling of energy and signals to and from the antenna, and also obtain a very high degree of isolation between the transmitter and receiver sections. It is possible to obtain a 50 decibel isolation at a minimum while operating over a wide range of variations in antenna loading and other operating conditions.

The receiver section 85 includes an input stage using a dual gate MOSFET transistor 270 with one electrode connected to the line 84 which is connected to ground through a tuned circuit formed by an inductor 271 in parallel with a capacitor 272, the tuned circuit being connected in series with an additional inductor 273. Another electrode is connected through a resistor 274 to the power supply line 141 and through a capacitor 275 and a parallel resistor 276 to ground.

Additional electrodes are connected to ground through a resistor 277 and a parallel capacitor 278. An output electrode is connected to a tap of a primary winding 280 of a coupling transformer 281, a capacitor 282 being connected in parallel with the winding 280. An end terminal of the winding 280 is connected to ground through a capacitor 283 and through a resistor 284 to the power supply line 141.

A coupling transformer 281 has a secondary winding 286 which is connected to the input of a first mixer stage 288, coupled to an oscillator stage 289 and to a first IF section 290.

The circuits of the mixer and oscillator stages 288 and 289 as well as the IF section 290 are not illustrated in detail but it will be understood that standard types of circuits may be used. The mixer stage preferably uses a dual gate MOSFET transistor and the oscillator stage 289 preferably uses a circuit similar to that used in the transmitter section 83. As shown, four crystals 291–294 are selectively connectable to the oscillator stage 289 through a switch 295, for control of the received frequency. By way of example, the IF section may operate at a frequency of 10.695 MHz and a ceramic filter may be included in the IF section 290.

The output of the first IF section 290 is applied to a second mixer 298 which is coupled to a second oscillator stage 299 and a second IF section 300, the output of the second IF section 300 being coupled to a demodulator 302 to develop an output signal on the line 106. The circuits of the mixer 298, oscillator 299, IF section 300 and demodulator 302 are not illustrated in detail, it being understood that standard types of circuits may be used. By way of example, the second IF frequency may be 400 KHz and a ceramic filter may be included in the second IF section 300. With double conversion, it is possible to obtain image rejection such that it is not necessary to use special image rejection filter circuitry in the input stage of the receiver section.

DIGITAL SIGNAL DETECTING AND PROCESSING CIRCUITRY OF CONTROL UNIT (FIG. 8)

Figure 8:
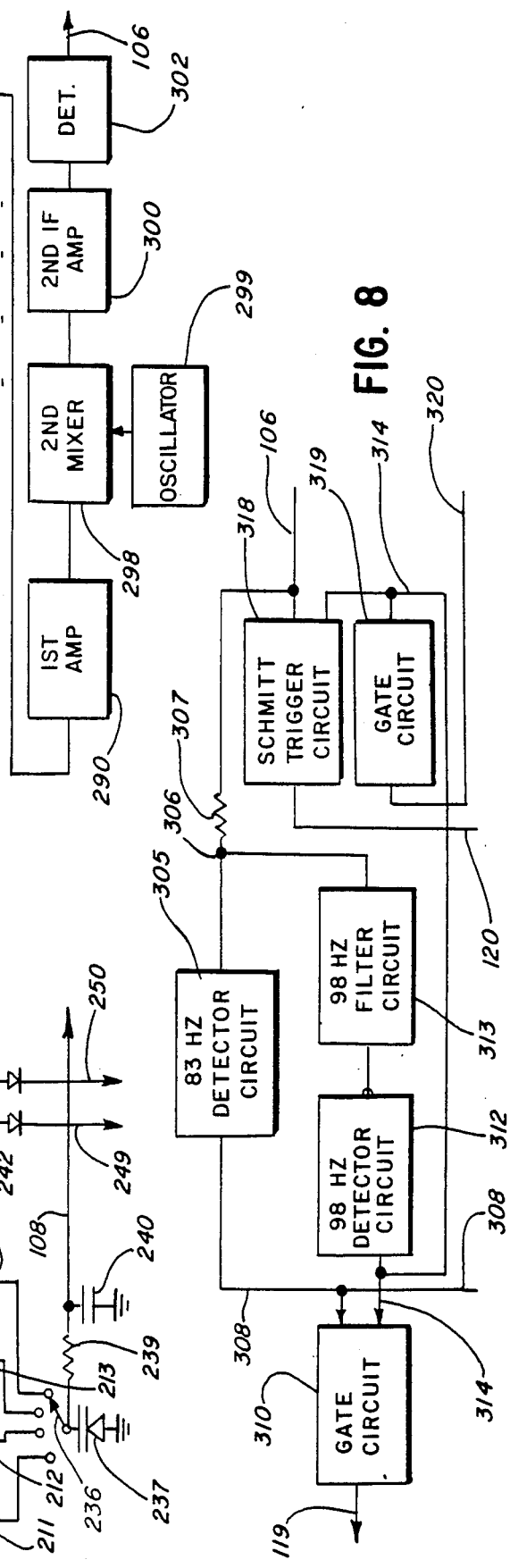
FIG. 8 is a schematic block diagram showing the key functional elements of digital signal detector and processing circuitry of the control unit.

FIG. 8 is a block diagram illustrating the circuitry 118 of the control unit 11 which operates to detect and process digital signals transmitted from the handset 12 and developed at the output line 106 of the receiver section 85 of the control unit 11. The circuits are described in detail hereinafter.

When the control 33 of the handset 11 is placed in its "talk" position, a 83 Hz pilot tone is tranmitted which is detected by a detector circuit 305. The input of circuit 305 is connected to a circuit point 306 which is connected through a resistor 307 to the line 106, connected to the output of the receiver section 85. The output of detector circuit 305 is connected to a line 308 which is connected to one input of a gate circuit 310, the output of gate circuit 310 being applied through the "signal present" line 119 to an input of the processor circuitry 92 and also to an input of the interrupt circuitry 116. In response to a transition of the signal developed on line 119, an interrupt is applied to the processor circuitry to cause it to initiate a signal decoding operation.

After transmitting the 83 Hz pilot tone for a certain time interval, the handset 12 initiates transmission of groups of pulse signals that are encoded on the handset transmitted signal by FM modulating the carrier, the pulse signals of each group having a 98 Hz repetition rate and each pulse signal having a predetermined duration, which may signal a null or which may correspond either to a digit of a security code, or to a digit of a number to be called or to a control digit. The duration of each of the pulses of the first group of 98 Hz pulses which is tranmitted from the handset corresponds to a first digit of a security code which is stored in a memory section of the circuitry 92. After properly receiving and registering the first digit, the control unit sends a 1633 Hz handshake signal to the handset which responds by sending acknowledgment signals back to the control unit. In the illustrated system, the acknowledgment signals are 98 Hz pulses of minimum duration referred to herein as "null" pulses or signals.

When the control unit detects null pulses or signals, the 1633 Hz handshake signal is turned off and, in response, the handset sends the next security code digit, by sending a second group of 98 Hz pulses with each pulse of the second group having a duration corresponding to the second digit of the stored code. This sequence is repeated for the third digit of the security code and after the three digits are received and verified, additional dialing or control signals are transmitted from the handset to the control unit to be decoded or analyzed in a similar fashion.

The transmission of the 83 Hz tone signal is discontinued during transmission and decoding of the 98 Hz pulses but is thereafter reinstituted and is continued as long as the handset control 33 is in the "talk" position. Thus, the existence of either a 83 Hz signal or 98 Hz pulses indicates that the control 33 is in the "talk" position.

transmission of the 98 Hz signals is detected by a detector 312. Detector 312 has an input connected to the output of a 98 Hz filter 313, the input of filter 313 being connected to the circuit point 306 which is connected through the resistor 307 to the output line 106 from the receiver section 85. The output of detector circuit 312 is applied through a line 314 to a second input of the gate circuit 310 which operates to continue generation of the signal present signal on the line 119 and to allow the processor circuitry 92 to measure the durations of 98 Hz pulses, such pulses being applied thereto through the line 120.

Line 120 is connected to the output of a Schmitt trigger circuit 318 which has one input connected to the line 106 which is the output line of the receiver section 85. A second input of circuit 318 is connected to line 314. A gating circuit 319 is connected to the line 314 from the 98 Hz detector circuit 312 and is connected through a line 320 to the processor circuitry 92 to insure against undesirable interrupts. As described hereinafter, the Schmitt trigger circuit 318 performs an important function in developing pulses having leading and trailing edges developed at threshold levels of the received signal in a manner such as to minimize the effects of noise in the signals transmitted from the handset 12 to the control unit 11.

The 1633 Hz handshake signal is developed by a tone generator section of the circuitry 92, described hereinafter, which operates to generate signals on the tone signal output line 95, connected to the switching circuitry 94. In addition to the 1633 Hz handshake signal, the tone generator section is also usable to transmit DTMF signals for dialing. During the handshake operation, the 1633 Hz signal is applied from the switching circuit 94 through a line 322 to the switching and amplifying circuitry 100, to be transmitted through the line 108 to the modulation input of the transmitter section 83 for transmission to the handset 12.

SWITCHING AND CONTROL CIRCUITRY (FIGS. 9 AND 10)

FIG. 9 illustrates the switching and control circuitry 100 and FIG. 10 illustrates the switching circuit 94. These circuits operate to control transmission of audio signals, including tone signals, from one circuit to another, under control of various control signals applied from the processor circuitry 92, the amplifier and voice operated circuitry 102, the circuit board 60 and other circuits.

The audio input signals to the circuits 94 and 100 include a microphone signal applied through line 103 to the circuitry 100 and derived from the microphone 103 after amplification in the circuitry 102; a handset audio signal applied through line 104 to the circuitry 100 and derived through filter 105 from the line 106 which is connected to the output of the receiver section 85; a line audio signal applied to the circuitry 100 through the line 109, connected to the output of the incoming signal amplifier 90; and tone signals applied through the line 95 to the circuitry 94. A 1633 Hz tone signal is applied from the switching circuitry 94 and through line 322 to the circuitry 100.

The audio output signals from the circuits 94 and 100 include an outgoing line audio signal applied from the circuit 94 through line 97 to the outgoing amplifier 89, the signal being derived through the line 98 from the circuitry 100; an outgoing handset audio signal applied from the circuitry 100 and through line 108 to the modulation input of the transmitter section 83; a speaker audio signal applied through a line 324 to terminal 14 of the circuit board 60 which is connected through the volume control potentiometer 63 to the input of the speaker amplifier 62; a ring signal which is applied through a line 326 to a ring select switch 328, connected to terminal 13 of the circuit board 60; and DTMF signals which may be applied from circuitry 94 and through line 93 to the outgoing signal amplifier 89.

The control input signals to the circuits 94 and 100 include a control signal on line 250 which connects the processor circuitry 92 to the switching circuitry 94 as well as to the transmitter section 93; a signal applied through line 327 from the processor circuitry to the switching circuitry 94 to control transmission of tone signals; a signal a line 328 applied from the processor circuitry 92 to the switching circuitry 94 to control transmission of out-going line signals; control signals applied through lines 329 and 330 from the processor circuitry 92 to the circuitry 100; a local answer control signal applied from terminal 18 of the circuit board 60 and through line 331 to the circuitry 100; and control signals applied through lines 332, 333 and 334 from the voice operated control circuits 102 to the circuitry 100. In addition, a ring detect signal is applied from the ring detector and gating circuits 110 and through line 113 to the circuitry 100.

Such applicable control signal operate to control switching of signals within the circuits 94 and 100. In addition, the circuits operate to generate a speaker squelch signal on a line 335 which is connected to terminal 12 of the circuit board 60.

The circuitry 100 includes a summing amplifier 338 which has an output connected to the line 108 and which has three inputs connected to lines 339, 340 and 341. The summing amplifier 338 includes an operational amplifier 342 which has an output connected to the line 108 and through a resistor 343 to a circuit point 344 which is connected through a resistor 346 to a minus input of the amplifier 342. The plus input of the amplifier 342 is connected through a resistor 347 to the +5-volt power supply line 341 and is connected through a capacitor 348 to ground. Circuit point 344 is connected through resistors 350, 351 and 352 and capacitors 353, 354 and 355 to the lines 339, 340 and 341. Line 341 is connected to the movable contact of a potentiometer 356 connected between ground and a line 358.

A second summing amplifier 360 is provided which includes an operational amplifier 361 having an output connected through a capacitor 362 to the line 324 and through a capacitor 363 and a resistor 364 to a minus input of the amplifier 361, a plus input of amplifier 361 being connected to a resistor 365 to the +5-volt supply line 141. The minus input of amplifier 361 is connected through resistors 367 and 368 and capacitors 369 and 370 to lines 371 and 372.

The circuitry 100 further includes two integrated circuits 373 and 374, each of which includes four switch devices. The circuit 373 includes a switch device 375 operative to control transmission of incoming line audio signals from line 109 to line 372 for application to the speaker 61. A control input of device 375 is connected to the output line 332 of the circuitry 102, line 332 being connected through a diode 377 to the local answer control line 331.

The circuit 373 includes a second switch device 378 which has one terminal connected through resistors 379 and 380 to the line 103 and a second terminal connected to the line 98. A control input of the device 378 is connected to the line 334 and through a diode 381 to the local answer control line 331. In a local answer mode of operation, device 378 operates to transmit microphone audio signals to the outside line.

A third device 382 of circuit 373 has one terminal connected to the junction between resistors 379 and 380, a second terminal connected to the line 358, and a control terminal connected to a line 384. Device 382 is used in transmitting microphone audio signals to the summing amplifier 338 for transmission to the handset 12.

A fourth device 386 of circuit 373 has one terminal connected to the line 98 and a second terminal connected to a line 387. A control input of the device 386 is connected through a resistor 389 to ground and through a resistor 390 to line 333. Device 386 is used in transmitting audio signals received from the handset 12 to the outside line.

The second integrated circuit 374 has four switch devices 391–394. Device 391 has one terminal connected to the line 322, to which a tone signal is applied, and a second terminal connected through a capacitor 396 and through the line 325 to the ring select switch 326. Ring select switch 326 includes a movable contact 397 which is illustrated in an off position. In second position, it connects the line 325 through a resistor 398 to the terminal 13 of the circuit board 60, resistor 398 having a relatively high valve to obtain a relatively low amplitude audible tone or ringing signal. In a third position, contact 397 connects line 325 through a resistor 399 to the terminal 13, the resistor 399 having a lower resistance to obtain a higher amplitude audible signal.

The second and third devices 392 and 393 of circuit 374 have terminals connected together to the line 104 which is coupled to the output of the receiver section of the control unit. A second terminal of the device 392 is connected to the line 371 for transmission of audio signals from the handset and through the summing amplifier 360 to the speaker amplifier, in certain modes of operation. A second terminal of the device 393 is connected to the line 387 for transmission of audio signals from the handset and through the device 386 to the out-going line signal amplifier and thence to the outside line. The fourth switch device 394 has one terminal connected to the incoming signal line 109 and a second terminal connected to the line 339 for application through the summing amplifier 338 to the line 108 and for transmission to the handset.

The control inputs of the devices 391–394 are connected to control circuitry including an integrated circuit 400 having four NAND gates 401–404. The output of gate 401 is connected through the line 335 to the terminal 12 of the control circuit board 60, the terminal 12 being a "squelch" terminal and being connected to the base of a control transistor which operates to effectively short-circuit the input of the speaker amplifier when the line 335 is brought high. The two inputs of the gate 401 are connected together and to a line 405 which is connected through a resistor 406 to ground. Line 405 is connected through diodes 408, 409 and 410 to the line 331, the line 384 and a line 411 which is connected to the output of the gate 402 and also to the control terminal of the switch device 391.

One input of the second gate 402 is connected to the ring detect line 113 while the other is connected through the line 329 to an output terminal of the processor circuit 92. The output of the second gate 402 is connected to the switch device 391 to cause transmission of a tone signal when either the ring detect line 113 or the processor line 329 is brought low.

The third gate 403 has its output connected to the line 384 which is connected to the switch devices 392 and 382 to control transmission of audio signals from the handset to the speaker and to control transmission of audio signals from the microphone to the handset. One input of gate 403 is connected to the output of the fourth gate 404. A second input of the gate 403 is connected through line 330 to the processor circuitry 92 which is also connected through a diode 414 to a line 415 which is connected to the control input terminals of switch devices 393 and 394, also through a resistor 416 to the +5-volt power supply line 141 and also through a diode 417 to one input of the fourth gate 404 and also to the line 308. The second input of the gate 404 is connected to the line 331. Line 331 is connected through a resistor 419 to the +5-volt power supply line 141 to be pulled toward a high state. It is also connected through a diode 420 to the line 330 from the processor circuitry 92 and may be brought to a low state when line 330 is brought low or when the local answer switch 70 is in a position as shown in FIG. 5, i.e., when the control unit 11 is not in the local answer mode.

When there is a high 83 Hz tone detect signal on line 308 and the control unit 11 is in the local answer mode, or when the processor line 330 is brought low, the line 384 is high to activate switch devices 392 and 386 for transmission of audio signals from the handset to the speaker and from the microphone to the handset.

Switch device 393 is activated when there is a high 83 Hz tone detect signal on line 308 and the processor line 330 is high. When switch device 386 is also activated as hereinafter described, audio signals are applied from the handset to the outside line.

Switch device 394 is activated for transmission of incoming audio signals from the outside line to the handset except when processor line 330 is brought low.

As shown in FIG. 10, switching circuit 94 includes an integrated circuit 422 with four switch devices 423–426, only three of which are used in the illustrated apparatus. Switch device 423 has one terminal connected to the line 95 and through resistor 427 to ground and a second terminal connected through a resistor 428 to ground and through a capacitor 429 to the line 322. Device 424 has one terminal connected to the line 95 and a second terminal connected through a resistor 430 to ground and to the line 93. Device 426 has one terminal connected to the line 98 and a second terminal connected through a resistor 432 to ground and to the line 97. A control input of the first device 423 is connected through the line 327 to the processor circuitry 92 and a control input of the second device 424 is connected to the line 250. The control input of the device 426 is connected to the line 328.

MICROPHONE AMPLIFIER AND VOICE OPERATED CONTROL CIRCUITRY (FIG. 11)

The circuitry 102 of FIG. 11 is operative in a local answer mode to allow use of both the speaker and the microphone of the control unit in a manner such as to avoid feedback. At the moment that a user speaks into the microphone 101, the circuitry operates to amplify the microphone signal and to immediately deactivate the switch device 375 in the circuitry 100 (FIG. 9) to avoid transmission of the signal from the microphone to the speaker. At the same time, the switch device 378 is activated for transmission of an amplified microphone signal through line 103, and through resistors 380 and 379 to the line 98, for transmission to the outside line. When the user's voice signal is terminated, the circuitry operates after a slight pause of approximately 0.5 seconds to switch back to a condition in which the switch device 375 is activated for transmission of the audio signals from the outside line to the speaker. A delay of approximately 0.5 seconds allows for the shorter pauses which occur during normal speech patterns and prevents continual on-off switching operations. There is, however, a very fast response to the user's voice signal to avoid any loss of speech.

An important feature is that the circuitry so operates as to allow for a three-way conversation, to allow for the user at the control unit to talk to both the user of the handset and the outside party at the same time.

Another feature is that the microphone and speaker of the control unit may be used for intercom communication with the handset.

The output line 333, which opeates through the resistro 390 to control the switch device 386, is coonnected tot eh output of an operational amplifier 436 which is at a high level except at times during local answer operation. The output linne 332, which controls the switch device 375, is connected through a resistor 437 to the output of amplifier 436 and is also connected through the diode 377 to the local answer line 331, diode 377 being in the circuitry 100, shown in FIG. 9. Line 331 is grounded when the control unit is not in the local answer mode and line 332 is held low through diode 377. In the local answer mode, line 331 is at a high level and line 332 may be either pulled to a high level from the output of the amplifier 436 or placed at a low level, depending upon the state of the amplifier 436.

Line 332 is also connected through a resistor 438 to the base of a transistor 439 having a grounded emitter and having a collector connected to the line 334 and also connected through a resistor 440 to the +5-volt supply line 141. Transistor 439 operates as an inverter, the line 334 being in a state opposite that of the line 332.

A positive reference voltage is applied to the plus input of the amplifier 436 from the movable contact of a potentiometer 442 having one terminal connected to ground and a second terminal connected through a resistor 443 to the +10-volt power supply line 139. A resistor 444 is connected between the plus input of amplifier 436 and its output.

The minus input of amplifier 436 is connected through a diode 446 to the local answer line 331 to be grounded except during the local answer mode, the output of amplifier 436 being thereby maintained at a high level except during the local answer mode.

When the control unit is in the local answer mode, the line 331 is at a high level and the minus input of amplifier 436 may be elevated to a potential greater than that of its plus input, in response to an amplified microphone signal. The output of the amplifier 436 is then switched to a low state to deactivate the switch devices 375 and 386 and to activate the device 378, through the line 334.

The minus input of amplifier 436 is connected through a capacitor 448 to ground and through a diode 449 and a parallel resistor 450 to a circuit point 452. Circuit point 452 is connected through resistors 453 and 454 to circuit points 455 and 456 which are at the outputs of two detector circuits. The first detector circuit is responsive to the output signal from the microphone 101 and it develops a positive voltage of the circuit point 455 in proportion to the amplitude of the microphone output signal. The second detector circuit is responsive to a signal from the speaker and it develops a negative voltage at the circuit point 456 which is proportional to the voltage applied to the speaker. Since the voltages developed at circuits points 455 and 456 are of opposite polarity, the voltage at circuit point 452 corresponds to differences between such voltages and, with proper adjustment, the net voltage developed at circuit point 452 may be substantially independent of the intensity of any soundwaves transmitted from the speaker to the microphone 101, to be proportional only to the intensity of the user's voice picked up by the microphone 101.

The voltage developed at circuit point 452 is of positive polarity and it is applied directly through the diode 449 to rapidly charge the capacitor 448 and to increase the potential of the negative input of amplifier 36. When the voltage so developed exceeds the reference voltage applied from the potentiometer 442 to the plus input of amplifier 436, the amplifier 436 is switched to a state in which the output is low, to perform the aforementioned switching operations.

The discharge path for the capacitor 448 is through the resistor 450 which has a resistance which is such in relation to the capacitance of the capacitor 448 as to provide a time constant of substantial magnitude, preferably on the order of 0.5 seconds. This feature provides the aforementioned pause while the diode 449 provides the rapid response to a voice signal from the user.

The microphone signal detector circuit comprises a capacitor 459 and a resistor 460 connected in parallel between circuit point 455 and ground and a pair of diodes 461 and 462 connected in series between circuit point 455 and ground, the junction between diodes 461 and 462 being connected through a capacitor 463 to the output of an operational amplifier 464, a resistor 465 and a capacitor 466 being connected in parallel between the output of amplifier 464 and one input thereof which is connected through a resistor 469 and a series capacitor 470 to the movable contact of a potentiometer 473 which forms a microphone gain control. Potemtiometer 473 is connected between ground and the output of an operational amplifier 474 with a resistor 475 and a capacitor 476 being connected in parallel between the output of amplifier 474 and one input thereof, connected through a capacitor 478 to one terminal of the microphone 101, the other terminal of the microphone 101 being connected to ground. Amplifier 474 amplifies the microphone signal and its output is connected to the line 103.

A second input of the detector signal amplifier 464 is connected to a circuit point 480 connected through a resistor 481 to a circuit point 482 which is connected to the second input of the amplifier 474, also through a capacitor 483 and a resistor 484 to ground and also through a resistor 485 to the +10-volt power supply line 139. The ungrounded terminal of the microphone 101 is connected through resistors 487 and 488 to the +10-volt supply line 139, the junction between resistors 487 and 488 being connected through a capacitor.

The speaker signal detector circuit is similar to the microphone signal detector circuit. A capacitor 491 and a resistor 492 are connected in parallel between circuit point 456 and ground and a pair of diodes 493 and 494 are connected in series between circuit point 456 and ground, the diodes 493 and 494 having a polarity opposite that of the diodes 461 and 462 so as to develop a negative voltage at circuit point 456 rather than a positive voltage as developed at circuit point 455. The junction between diodes 493 and 494 is connected through a capacitor 495 to the output of an amplifier 496. One input of the amplifier 496 is connected to the circuit point 480. The other input thereof is connected through a resistor 497 to its output and through a resistor 498 and a series capacitor 499 to the movable contact of a potentimeter 500 which is connected in parallel with a capacitor 501, between ground and a line 502. Line 502 is connected to terminal 16 of the circuit board 60 which is connected to one terminal of the speaker 61.

INTERRUPT CIRCUITRY (FIG. 12)

The interrupt circuitry 116, shown in FIG. 12, operates to effect a high to low transition of the line 117 and to generate an interrupt in response to either a high to low transition or a low to high transition of a ring detect signal on line 114 or in response to either a high to low or a low to high transition on the line 119. It may also operate to generate an interrupt in response to a high to low transition on a line 506 which is connected to terminal 7 of the circuit board 60 and which is connected to ground when the intercom switch 67 is operated.

The interrupt circuitry includes an operational amplifier 507, which has its output connected to the line 117, also through a resistor 508 to the +5-volt power supply line 141 and through a resistor 509 to the plus input of the amplifier 507. The plus input of amplifier 507 is connected through a resistor 510 to a circuit point 511 which is connected through a resistor 512 to the +5-volt supply line 141. The minus input of amplifier 507 is connected through a resistor 514 to a circuit point 515 which is connected through a resistor 516 to ground. Through the resistors 510, 512, 514 and 516, the amplifier 507 is normally biased to an "ON" condition to develop a high output at the output line 117.

The ring detect signal line 114 and the "SIGNAL PRESENT" line 119 are connected through capacitors 517 and 518 to a circuit point 520 which is connected through diodes 521 and 522 to the plus and minus inputs of amplifier 507, also through a resistor 524 to the circuit point 511 which is connected through a resistor 525 to the circuit point 515. The capacitors 517 and 518 are normally charged at levels corresponding to the levels of the lines 114 and 119. When there is a high to low transition on either of the lines 114 or 119, the positive input of the amplifier 507 is dropped to a low level through the diode 521 to cause a high to low transition at the output line 117. Similarly, when there is a low to high transition on either of the lines 114 or 119, the minus input of amplifier 507 is moved from a low level to a high level to cause a high to low transition on the output line 117.

The line 506 is connected through a resistor 528 to the +5-volt supply line 141 and is connected through a capacitor 529 to a circuit point 530 which is connected through a resistor 531 to the circuit point 511 and which is connected through a diode 532 to the plus input of amplifier 507. When the intercom switch 67 is operated to ground the line 506, a high to low transition of the plus input of amplifier 507 is effected through the diode 552, to generate an interrupt.

PROCESSOR, MEMORY, TONE GENERATOR AND CONTROL CIRCUITRY (FIG. 13)

The processor, memory, tone generator and control circuitry 92, as illustrated in FIG. 13, comprises a microcomputer 536 which may, for example, be a PIC 1670 8-bit microcomputer manufactured by General Instrument Corporation. A real time interrupt input terminal of the microcomputer 536 is connected through a resistor 537 to the 5-volt supply line 141 and is also connected to the collector of a transistor 538, the emitter of which is connected to the line 117. Transistor 538 operates to prevent an interrupt during certain conditions. Its base is connected through a resistor 539 to a circuit point 540 which is connected through the line 320 to the output of the gating circuit 319 of the circuitry 118, shown in block form in FIG. 8. Thus, circuit point 540 is also connected through a diode 541 to a line 542 which is connected to an output terminal of the microcomputer 536. Line 542 is also connected to the incoming signal amplifier 90 and to the ring detector and gating circuits 110.

The circuitry 92 also includes a tone generator 544 which may be a standard type of DTMF integrated circuit having an output terminal connected to the line 95 and having an input or control terminals connected through lines 545–552 to output terminals of the microcomputer 536, another terminal of the circuit 544 being connected to the collector of a transistor 544. The emitter of the transistor 554 is grounded and the base thereof is connected through a resistor 555 to the line 327 which is connected to an output terminal of the microcomputer 536. Line 552 is connected through a resistor 557 to the base of a transistor 558 having a grounded emitter and having a collector connected to the line 328 which is connected through a resistor 559 to the +5-volt supply line 141. An oscillator input terminal of the circuit 544 is connected through a capacitor 560 to an oscillator terminal of the microcomputer 536 which is connected through a resistor 561 to one terminal of a crystal 562, the other terminal of crystal 562 being connected to a second oscillator terminal of the microcomputer 536. A pair of capacitors 563 are connected between ground and the terminals of crystal 562 with a resistor 564 connected in parallel with the crystal 562.

Certain of the interconnect lines between the tone generator 544 and the microcomputer 536 are also used in sensing and control of line advance, hold, dial select and program security functions. Lines 545 and 546 are connected to switch contacts which are selectively engageable by a dial select switch contact 566 to be selectively connectable a line 567 which is connected to a terminal of the microcomputer 536 and also to the terminal 6 of the control board 60. Line 547 is connectable through a program security switch 568 to the line 567. Lines 548 and 549 are respectively connected to terminals 4 and 5 of the control board 60 to be connectable to the line 567 through the line advance and hold switch contacts 66 and 65. Line 551 is connected to the line 567 through a diode 570.

To inhibit transmission of audio signals to and from the outside line, an output of the microcomputer 536 is connected to a line 572 which is connected through a diode 573 to the line 328 and through a diode 574 to a line 575. Line 328 controls transmission of audio signals to the input of the outgoing signal amplifier 89 and line 575 controls transmission of audio signals by the amplifier 90.

To control the relay 131 which is used in commercial applications, a terminal of the microcomputer 536 is connected through a line 577 and a resistor 578 to the base of a transistor 580, the collector of which is connected to the relay 131.

For control of the two-line interface circuit 122, a set of terminals U, W, X, and Z are provided, connected to corresponding terminals of the circuit 122, terminal U being connected to line 572 and terminal Y being connected to line 577 with terminals W, X and Z being connected to other outputs of the microcomputer 536.

A non-volatile memory 582 is provided for storing a 3-digit security code and for storing numbers to be automatically dialed. Terminals of the memory 582 are connected through lines 583–586 to terminals of the microcomputer 536 and also through resistors 587–590 to the power supply line 140. Another terminal of the memory 582 is connected through a line 592 to a terminal of the microcomputer 536 and also through a resistor 593 to the collector of a transistor 594 which is connected through a resistor 595 to the power supply line 140. The base of the transistor is connected through a resistor 596 to the line 586. Another terminal of the memory 582 is connected to the line 143 which is connected to a minus 25-volt output of the power supply 136.

SCHMITT TRIGGER CIRCUIT (FIG. 14)

FIG. 14 is a circuit diagram of the Schmitt trigger circuit 318. The output line 120 is connected through a resistor 600 to the +5-volt power supply terminal and is connected to the output of an operational amplifier 601, also through a resistor 602 to the minus input of the amplifier 601, the minus input of amplifier being connected through a resistor 603 to the input line 106, for switching of the amplifier from one state to the other, at switching levels which are dependent upon the voltage level at the input line 106. The switching levels are such that the more positive level is well below the average level of the positive portions of applied pulse-containing signal, the more negative level is well above the average level of the negative portions of the applied pulse-containing signal to minimize the effects of noise and to obtain a "clean" output.

In accordance with an important feature, a variable bias level is applied to the minus input of the amplifier 601, the bias level being changed in proportion to the average integrated value of 98 Hz pulses applied to the line 106.

In particular, the minus input of amplifier 601 is connected through a capacitor 605 to ground and through a resistor 606 to the output of a second operational amplifier 607. The minus input of amplifier 607 is connected to the output thereof and is also connected through a capacitor 608 to a circuit point 609 which is connected through a resistor 610 to the line 106 and through a resistor 611 to the plus input of amplifier 607. The plus input of amplifier 607 is connected through a capacitor 612 to ground and is also connected through a resistor 613 to the movable contact of a potentiometer 614 connected between ground and the +5-volt supply terminal.

In operation, the capacitor 608 and the resistors 610 and 611 cooperate in producing a low pass filter action such that the bias voltage developed at the minus input of the amplifier 601 is proportional to the average integrated value of the applied signal-containing 98 Hz pulses. It has been discovered that the average integrated value of such pulses may vary over a substantial range depending upon the duration of the pulses being transmitted. As a result, the DC level at the input line 106 is varied and the amplifier 607 and associated circuitry balances out this effect to avoid any substantial effect on the triggering operation of the amplifier 601. The overall result is a great improvement in the accuracy of detection of the leading and trailing edges of the 98 Hz pulses, permitting operation even under extremely adverse noise conditions.

By way of example and not by way of limitation, the components of the circuit 318 may have values as follows:

| Reference Numeral | Value |
|---|---|
| 600 | 2.2K |
| 602 | 1 M |
| 603 | 100K |
| 605 | 0.001 MFD |
| 606 | 82K |
| 608 | 0.1 MFD |
| 610; 611 | 220K |
| 612 | 0.047 MFD |
| 613 | 4.7 M |
| 614 | 20K |

FIG. 14 also provides a circuit diagram of the gate circuit 319. The minus input of amplifier 601 is connected through a diode 616 to the line 314 which is connected through a resistor 617 to the base of a transistor 618. The emitter of transistor 618 is grounded while the collector thereof is connected to a line 320 and through a resistor 620 to the +5-volt supply terminal.

83 HZ DETECTOR CIRCUIT (FIG. 15)

FIG. 15 is a circuit diagram of the 83 Hz detector circuit 305. The line 306 is connected through a capacitor 622 and a resistor 623 to the minus input of an operational amplifier 624, the minus input being connected through a resistor 625 to the +5-volt power supply terminal and being also connected to a resistor 626 to the output of amplifier 624. The plus input of amplifier 624 is connected through a resistor 627 to the output of an amplifier 628, the plus input of which is connected through a resistor 629 to the +5-volt power supply terminal. A resistor 630 and a capacitor 631 are connected in parallel between the minus input of amplifier 628 and the output thereof. The minus input of amplifier 628 is connected through a fixed resistor 632 and a variable resistor 633 to the output of amplifier 624, which forms an output terminal of the circuit and which is connected through a capacitor 635 and a resistor 636 to a circuit point 637. Circuit point 637 is connected through a diode 638 to ground and is connected through a diode 639 to a circuit point 640 which is connected through a resistor 641 and a parallel capacitor 642 to ground. Circuit point 640 is connected through a resistor 643 to pin 14 of an integrated circuit 644 having another pin 13 connected to the line 308 with a resistor 645 being connected between pins 13 and 14. The detector circuit 305 uses an operational amplifier of the integrated circuit 644 which is a commercially available chip having IF amplifier and detector components used in the receiver section of the control unit 11.

The circuit as shown operates as a very highly selective filter which has an extremely narrow bandpass at the frequency of 83 Hz. As a result, it can operate to detect the 83 Hz signal under very adverse noise conditions.

It is noted that both amplifiers 624 and 628 operate as active filter amplifiers, contributing to the highly selective operation of the filter. The skirts of response continuously fall at 6 dB/octave, with an ultimate rejection which greatly surpasses the 30 to 40 dB rejection of standard OR-Amp bandpass circuits. At the same time, a minimum number of parts is required.

It is important that the proper relative circuit values can be used and by way of example and not by way of limitation, the values of the circuit components may be as follows:

| Reference Numeral | Value |
|---|---|
| 622 | 1 MFD |
| 623 | 220K |
| 625 | 220K |
| 626 | 0.015 MFD |
| 629 | 330K |
| 630 | 3.3 M |
| 631 | 0.015 MFD |
| 635 | 0.33 MFD |
| 636 | 10K |
| 641 | 270K |
| 642 | 3.3 MFD |
| 643 | 220K |
| 645 | 3.3 M |

98 HZ DETECTOR & FILTER CIRCUITS (FIG. 16)

FIG. 16 is a circuit diagram of the 98 Hz detector circuit 312 and the 98 Hz filter circuit 313. The filter circuit 313 has circuitry which is substantially the same as that of the 83 Hz filter circuit 305, including a pair of operational amplifiers 647 and 648 respectively, corresponding to the operational amplifiers 624 and 628, the minus input of amplifier 647 being connected through a resistor 649 and a capacitor 650 to the line 306 and the output of amplifier 647, which forms an output for the filter circuit, being connected through a fixed resistor 651 and a variable resistor 652 to the minus input of amplifier 648. The values of the circuit components may preferably be the same as those listed above for the corresponding components of the 83 Hz filter circuit 305, except that the fixed resistor 651 may have a resistance of 100K, rather than 150K as listed for the resistor 632, and a resistor 653, between the plus input of amplifier 648 and the power supply terminal, may have a resistance of 220K, rather than 330K as listed for the corresponding resistor 629.

It is noted that as shown in FIG. 16, a pair of oppositely poled diodes 655 and 656 are connected in parallel and in series with a capacitor 657 between the line 306 and ground. These components operate in conjunction with the resistor 307 to provide a filtering action with respect to both the 83 Hz and 98 Hz filters. The capacitor 657 may have a value of 1 MFD while the resistor 307 may have a value of 2.2K.

The 98 Hz detector 312 comprises an operational amplifier 659 having an output connected to line 314 and having a minus input connected through a resistor 660 to the +5-volt terminal. The plus input of amplifier 659 is connected through a resistor 661 to a circuit point 662 which is connected through a resistor 663 to the line 314 and to ground through a capacitor 665 and a resistor 666 in parallel. Circuit point 662 is connected through a diode 667 to a circuit point 668 which is connected through a diode 669 to ground and through a capacitor 670 and a resistor 671 to the output of the 98 Hz filter circuit 313.

By way of example and not by way of limitation, the circuit components may have values as follows:

| Reference Numeral | Value |
|---|---|
| 660 | 3.3 M |
| 661 | 220K |
| 663 | 3.3 M |
| 665 | 0.22 MFD |
| 666 | 220K |
| 670 | 0.33 MFD |
| 671 | 10K |

GATE CIRCUIT (FIG. 17)

FIG. 17 is a circuit diagram of the gate circuit 310 which comprises an operational amplifier 674 having an output connected to the line 119, having a plus input connected through a resistor 675 to the +5-volt supply and having a minus input connected through a resistor 676 to the line 314 and through a resistor 677 to the line 308. Resistor 675 may have a value of 1M while resistors 676 and 677 may each have a value of 220K.

LINE CIRCUIT (FIG. 18)

FIG. 18 is a circuit diagram of line circuit 86. A transformer 680 is provided having windings 681 and 682. Winding 681 is connected to the lines which are connected through capacitors 683 and 684 to ground. One terminal of the winding 682 is connected through a Zener diode 685 to ground and also to a circuit point 686 which is connected through a capacitor 687 to ground and through a resistor 688 to the +5-volt supply. Circuit point 686 is additionally connected to the collector of a transistor 690, the base of which is connected to the output of the outgoing signal amplifier 89. The emitter of the transistor 690 is connected to a circuit point 691 which is connected to an impedance network including a resistor 692 connected between circuit point 691 and ground. The impedance network further includes a resistor 693 connected between circuit point 691 and a circuit point 694 which is connected to ground through a resistor 695 and a parallel inductor 696. Circuit point 694 is also connected through a variable resistor 697 to a circuit point 698 which is connected through a capacitor 699 to the input of the incoming signal amplifier 90 and through a resistor 700 to a circuit point 701 which is connected to one terminal of the winding 682. Circuit point 701 is connected through a Zener diode 702 to ground and through a capacitor 703 to ground. It is also connected to the collector of a transistor 704 which has an emitter connected to ground through resistors 705 and 706. The base of transistor 704 is connected through a resistor 707 to the circuit point 691 and is connected to the circuit point 701 through a capacitor 708 and a series resistor 709.

In the operation of the circuit, the incoming signal amplifier 90 receives a signal component from the outgoing signal amplifier 89 of one phase, applied from circuit point 691 and through resistor 693 and variable resistor 697 to the circuit point 698. A signal of the opposite phase is applied from the collector of transistor 704 which operates as a phase inverter. By selection and adjustment of the values of the components, a balance is obtained to avoid any coupling from the output of the outgoing signal amplifier 89 to the input of the incoming signal amplifier 90.

The provision of the inductor 696 and associated resistors 693, 695 and 697 is important in providing the proper balance with respect to the reactance of the transformer 680. With the circuit as shown, it is possible to obtain a balance over a quite broad frequency range and to thereby minimize any coupling from the output of the outgoing signal amplifier 89 to the input of the incoming signal amplifier 90. At the same time, efficient coupling is obtained with respect to transmission of signals from the outgoing signal amplifier 89 to the telephone line and transmission of incoming signals from the telephone line to the input of the incoming signal amplifier 90.

By way of illustrative example and not by way of limitation, the components of the line circuit may have values as follows:

| Reference Numeral | Value |
|---|---|
| 683, 684 | 0.001 MFD |
| 688 | 10 Ohm |
| 687 | 470 MFD |
| 692 | 100 Ohm |
| 693 | 330 Ohm |
| 695 | 8.2 Ohm |
| 696 | 27 Millihermies |
| 697 | 1K |
| 697 | .2 MFD |
| 700 | 22K |
| 703 | 0.047 MFD |
| 705 | 82 Ohm |
| 706 | 68 Ohm |
| 707 | 680 Ohm |
| 708 | 47 MFD |
| 706 | 1K |

The resistor 695 is adjustable to obtain a balance which is as accurate as possible over the audio range of frequencies transmitted.

POWER SUPPLY CIRCUIT (FIG. 19)

Figure 19:
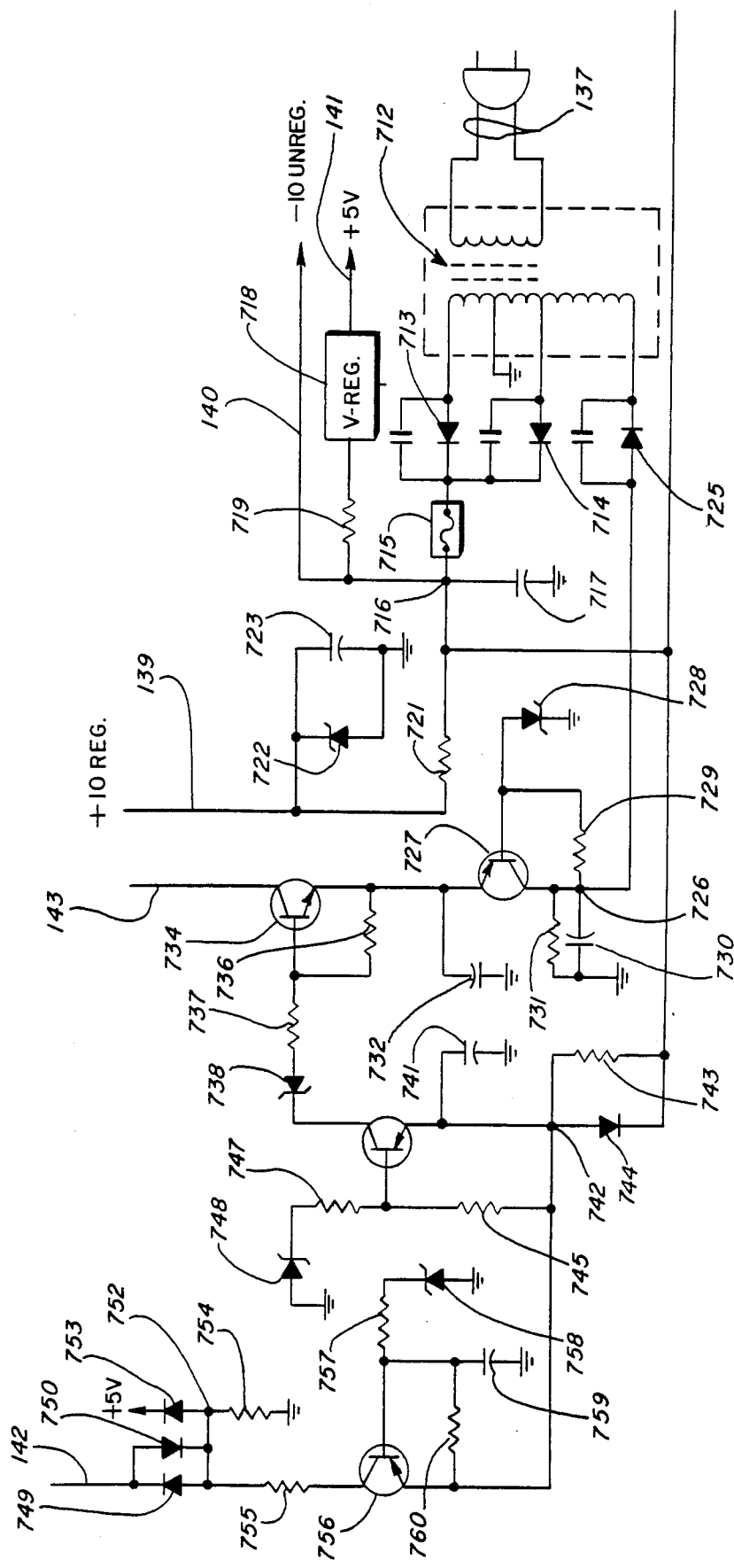
FIG. 19 is a circuit diagram of a power supply circuit of control unit.

FIG. 19 is a circuit diagram of the power supply circuit 136. The line cord 137 is connected to the primary winding of a transformer 712 which has a center-tapped winding section connected through rectifier diodes 713 and 714 and through a fuse 715 to a circuit point 716 which is connected to ground through a capacitor 717, the center tap of the winding section being connected to ground so as to provide a full-wave rectifier circuit. A +10-volt unregulated voltage is developed at the circuit point 716 which is connected to the line 140. The +5-volt regulated voltage on line 141 is produced by a regulator 718 connected through a resistor 719 to the circuit point 716. To develop the +10-volt regulated voltage on line 139, it is connected through a resistor 721 to the circuit point 716 and it is also connected through a Zener regulating diode 722 and a parallel capacitor 723 to ground.

To provide a minus 25 volt signal on line 143, the transformer 712 includes an additional winding section having one end connected to one end of the aforementioned center-tapped section and having an opposite end connected through a diode 725 to a circuit point 726 which is connected to the collector of a transistor 727 operative as a voltage regulator. The base of the transistor 727 is connected through a 27-volt Zener diode 728 to ground and is also connected through a resistor 729 to the circuit point 726. A capacitor 730 and a parallel resistor 731 are connected between circuit point 726 and ground.

The emitter of the regulator transistor 727 is connected through a capacitor 732 to ground and is also connected to the emitter of a transistor 734 operative as a switching device, the collector of transistor 734 being connected to the line 143. The base of the transistor 143 is connected through a resistor 736 to the emitter thereof and is also connected through a resistor 737 and a 27-volt Zener diode 738 to the collector of a transistor 740 which controls operation of the switching transitor 734. The emitter of the control transistor 740 is connected through a capacitor 741 to ground and to a circuit point 742 which is connected through a resistor 743 and a diode 744 to the circuit point 716, i.e., to the +10-volt unregulated output of the supply. The base of the transistor 740 is connected through a resistor 745 to the circuit point 742 and is connected through a resistor 747 and a 9.1 volt Zener diode 748 to ground. Transistor 740 operates to control the switching transistor 734 to supply an enabling signal to the non-volatile memory 582 at a certain time after connection of the primary of transformer 712 to an AC supply. The circuit also operates to disable the non-volatile memory 582 at a certain time after the primary of transformer 712 is disconnected from the AC supply.

Another circuit is provided for controlling application of an initialization signal to the line 142 which is connected to a "MASTER CLEAR" terminal of the microcomputer 536. The line 142 is connected through a pair of parallel reversely poled diodes 749 and 750 to a circuit point 752 which is connected through a diode 753 to the +5-volt supply line 141 and through a resistor 754 to ground. Circuit point 752 is also connected through a resistor 755 to the collector of a transistor 756, the emitter of which is connected to the circuit point 742. The base of transistor 756 is connected through a resitor 757 and a series Zener diode 758 to ground, through a capacitor 759 to ground and through a resistor 760 to the circuit point 742. The Zener diode 758 may be a 7.5 volt diode.

The circuitry operates to apply an initialization signal on the line 142 at a certain time after connection of the primary winding 712 to the AC supply line. This time is after application of V+ to the microcomputer 536 and is before application of enabling signal on line 143 to the non-volatile memory 582. This sequence is found to be very important to obtain the proper initialization operation. As hereinafter described, signals stored in the non-volatile memory circuit 582 may be transferred to a random access memory of the microcomputer 536 during an initialization sequence.

On power-down, i.e., when the primary of transformer 712 is disconnected from the AC supply, the sequence is reversed, the enabling signal being removed from the line 143 to disable the memory before removing signals from the microcomputer circuitry.

By way of example and not by way of limitation, the various components of the power supply circuitry may have values as follows:

| Reference Numeral | Value |
| --- | --- |
| 717 | 2200 MFD |
| 719 | 27 Ohm |
| 721 | 330 Ohm |
| 723 | 10 MFD |
| 729 | 10K |
| 730 | 220 MFD |

-continued

| Reference Numeral | Value |
| --- | --- |
| 731 | 1 M |
| 732 | 2.2 MFD |
| 736, 737 | 10K |
| 741 | 47 MFD |
| 743 | 2.2K |
| 745 | 100K |
| 747 | 4.7K |
| 754 | 100K |
| 755 | 22K |
| 757 | 4.7K |
| 759 | 0.22 MFD |
| 760 | 100K |

RING DETECT & TWO LINE INTERFACE CIRCUITS (FIG. 20)

Figure 20:
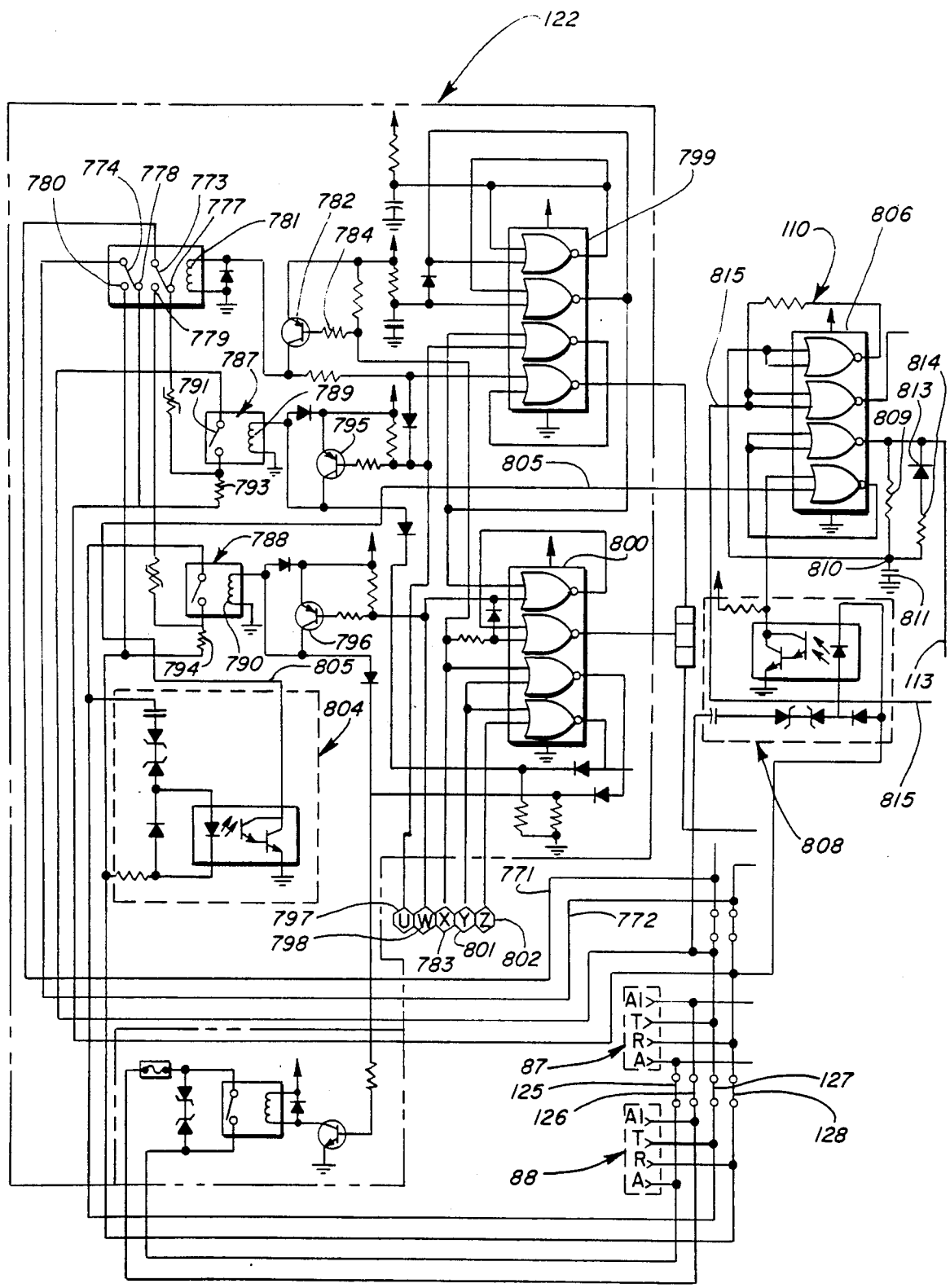
FIG. 20 is a circuit diagram showing ring detect and two line interface circuits of the control unit.

FIG. 20 is a circuit diagram of the ring detection and gating circuit 110 and of the two-line interface circuit 122. The interface circuit 122 is designed for optional use. When used, the jumpers 123 and 124, indicated in dotted lines, are not used and also the jumpers between jacks 87 and 88, indicated by dotted lines 125-128, are not used. A pair of lines 771 and 772, which are connected through the relay contact 130 to the line circuit transformer, are connected to movable contacts 773 and 774 of a relay 776, the contacts 773 and 774 being selectively engageable either with a pair of contacts 777 and 778 or with a pair of contacts 779 and 780. The relay 776 has an operating coil 781 which is energized through a transistor 782. Transistor 782 is biased toward a non-conductive state and may be rendered conductive by a low signal applied to an "X" terminal 783 which is connected through a resistor 784 to the base of the transistor 782. With relay coil 781 de-energized, the lines 771 and 772 are connected through the contacts 773 and 774 to the contacts 777 and 778 to be connected to the "T" and "R" terminals of the jack 87. When the relay coil 781 is energized, lines 771 and 772 are connected to the "T" and "R" terminals of the jack 88.

A pair of relays 787 and 788 are provided having coils 789 and 790 and having contacts 791 and 792, contact 791 being connectable in series with a resistor 793 between the terminals 777 and 778 while contact 792 is connectable in series with a resistor 794 between contacts 779 and 780. The coils 789 and 790 are energized through transistors 795 and 796 which have base electrodes coupled to "U" and "W" terminals 797 and 798 to be energized when such terminals are brought low.

A pair of quad NOR gate circuits 799 and 800 are provided having inputs connected to the terminals 783, 797 and 798 and to other components of the circuitry in the manner as shown, an output of one gate of the circuit 799 being connected to the terminal 1 of the printed circuit board 60, for energization of the "LINE 1" signal light 19 and an output of one gate of the circuit 800 being connected to terminal 2 of circuit board 60 for energization of the "LINE 2" signal light 20. Inputs of gates of the circuit 800 are also connected to "Y" and "Z" terminals 801 and 802.

A ring detector circuit 804 is provided in the interface circuit 122 which has input lines connected to the terminals 779 and 780 of the relay 776. An output line 805 of circuit 804 is connected to an input of a quad NOR gate circuit 806 of the ring detector and gating circuits 110 of the control unit. Another ring detector circuit 808 is provided in the circuits 110, located within the control unit, the output of the circuit 808 being connected to the line 805 and the input thereof being connected to the "T" and "R" terminals of the jack 87. Thus, ring detector circuit 804 of the interface circuit 122 detects an external ring on the "T" and "R" lines of jack 88 while the ring detector circuit 806 within the control unit detects an external ring on the lines connected to the "T" and "R" lines connected to jack 87.

The quad NOR gate circuit 806 is connected as shown. The output of one of the gates is connected to the line 113 which is connected through a resistor 809 to a circuit point 810 which is connected through a capacitor 811 to ground. A diode 813 and a resistor 814 are connected in series with each other and in parallel with resistor 809. Inputs of another gate of the circuit 806 are connected through a line 815 and a diode 816 (FIG. 13) to the microcomputer 536.

The system will respond to interrupts generated by ring signals on either outside line. It also operates through the microcomputer 536 to control the relays of the interface circuit and to obtain line advance and hold operations as well as pulse dialing operations.

MICROCOMPUTER (FIG. 21)

Figure 21:
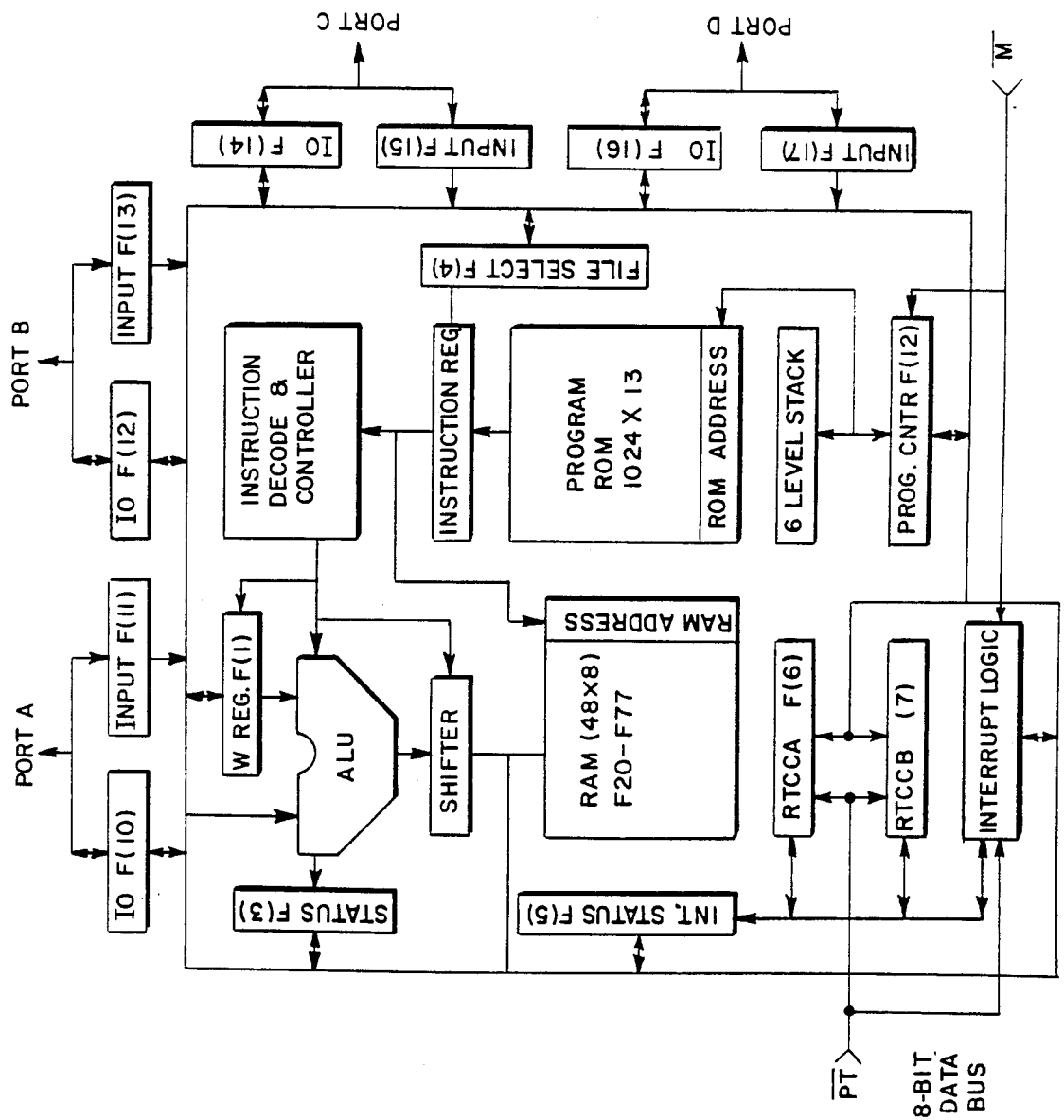
FIG. 21 is a a block diagram of a microcomputer used in the control unit.

FIG. 21 is a block diagram of the microcomputer 536 which as aforementioned may, for example, be a "PIC 1670" 8-bit microcomputer manufactured by General Instrument Corporation. The functional blocks are connected by an 8-bit bi-directional bus. There are sixty-four 8-bit registers of which the first sixteen are special purpose and there is an arithmetic logic unit and a ROM with 1024×13-bit words. The first sixteen registers are operational registers and they include real-time clock counters A and B, four I/O registers, two status registers, a program counter and a file select register. The remaining registers are general purpose registers which are used for data and control information under command of the instructions.

The operational registers or "files" are designated as follows, it being noted that an octal numbering system is used:

F0—not a physical register; F0 calls for the contents of a file select register (F4) to be used to select a file for storage or retrieval of data, F4 being used as an indirect address pointer.

F1 is the "W" register —the working register.

F2—the program counter —points to the next program ROM address to be executed.

F3—the arithmetic status register. The bits of this register are used as follows:

Bit 0 (C)—the carry flag.

Bit 1 (DC)—the half-carrier or decimal carry, used to indicate a carry from bit 3 in the arithmetic logic unit as the result of an addition. This bit is used in the decimal adjust instruction to allow BCD decimal addition.

Bit 2 (Z)—the zero flag which is set to a 1 if the results of the previous operation was identically zero.

Bit 3 (0)—bit 3 is the overflow flag and is set to 1 by operation which cause a signed two's complement arithmetic overflow.

Bit 4 (A8)—bit 4 is the ninth of the program, a read only bit.

Bit 5 (A9)—bit 5 is the tenth bit of the program counter, also a read only bit.

F-4—The file select register.

F-5—The interrupt status register; bits 7-0 being respectively designated as follows: "X", "CNTE", "A/B", "CNTS", "RTCIR", "XIR", "RTCIE" and "XIE".

F-6, 7—"RTCCA" and "RTCCB" which are real-time clock counters which can be arranged as two 8-bit registers, a single 16-bit register or two general purpose registers.

F—10, 11—"I/O PORT A".

F—12, 13—"I/O PORT B".

F—14, 15—"I/O PORT C".

F—16, 17—"I/O PORT D".

It is noted that F—10, 12, 14 and 16 are the "I/O" registers and F—11, 13, 15 and 17 are used for reading the actual pin levels.

The following chart relates the file designations to the pin numbers of the microcomputer 536 (shown in FIG. 13) and also to the reference numerals used in describing the system. Also, the functions of the input or output ports are indicated, where appropriate.

| PIN NO. | FILE I.D. AND/OR FUNCTION | CORRESPONDENCE REFERENCE NO. |
|---|---|---|
| 1 | OSC | |
| 2 | OSC | |
| 3 | F10 or F11, 0 "SIGNAL PRESENT" | 119 |
| 4 | F10 or F11, 1 "KEY CODE IN" | 120 |
| 5 | F10 or F11, 2 RING DETECT | 114 |
| 6 | F10 or F11, 3 LINE ADVANCE & HOLD SW; PROGRAM SEC. | 568 |
| 7 | CLOCK OUT | |
| 8 | F10 or F11, 4 HOOK RELAY | |
| 9 | F10 or F11, 5 AUX. HOOK RELAY | |
| 10 | F10 or F11, 6 INC. SIGNAL AMP. RING DETECT. | 542 |
| 11 | F10 or F11, 7 | |
| 12 | F12 or F13, 0 TONEGEN | 552 |
| 13 | F12 or F13, 1 TONEGEN, OR HOLD SW. | 548 |
| 14 | F12 or F13, 2 TONEGAN", OR LINE ADVANCE | 549 |
| 15 | F12 or F13, 3 TONEGAN, | 550 |
| 16 | F12 or F13, 4 TONEGAN OR DIAL SELECT | 551 |
| 17 | F12 or F13, 5 TONEGAN OR PROGRAM SEC. | 547 |
| 18 | F12 or F13, 6 TONEGAN OR DIAL SELECT | 546 |
| 19 | F12 or F13, 7 TONEGAN OR DIAL SELECT | 545 |
| 20 | VSS | |
| 21 | TEST | |
| 22 | F14 or 15, 0 EAROM | 592 |

-continued

| PIN NO. | FILE I.D. AND/OR FUNCTION | CORRESPONDENCE REFERENCE NO. |
|---|---|---|
| 23 | F14 or 15, 1 EAROM | 585 |
| 24 | F14 or 15, 2 EAROM | 586 |
| 25 | F14 or 15, 3 EAROM | 584 |
| 26 | F14 or 15, 4 EAROM | 583 |
| 27 | F14 or 15, 5 EAROM | |
| 28 | F14 or 15, 6 EAROM | |
| 29 | F14 or 15, 7 TRANSMITTER | 249 |
| 30 | F16 or 17, 0 INTERFACE | 122 |
| 31 | F16 or 17, 1 INTERFACE | 122 |
| 32 | F16 or 17, 2 LOCAL ANS. SW. | |
| 33 | F16 or 17, 3 | |
| 34 | F16 or 17, 4 INTERFACE | 122 |
| 35 | F16 or 17, 5 INTERFACE | 122 |
| 36 | F16 or 17, 6 INTERCOM LIGHT | |
| 37 | F16 or 17, 7 INTERCOM SW. | |
| 38 | REAL TIME INTERRUPT | 538 |
| 39 | MASTER CLEAR | 142 |
| 40 | V+ | |

With regard to an external interrupt, the external interrupt request bit (XIR) of F5 is set on any high to low transition of pin 38 to be serviced if the external interrupt enable bit (F5,0) is set or if it set at a later point in the program. Once external interrupt service is initiated, the processor clears the XIR bit, pushes the current program address on to the stack and executes the instruction at address or location 1760 (octal base).

Real-time clock interrupt operation is accomplished with the RTCCA and RTCCB file registers F6 and F7. When timer interrupt service is initiated, the present program counter is pushed onto the stack and the instruction at address or location 1740 is executed.

Each instruction used in the microcomputer of the illustrated embodiment is a 13-bit word divided into an OP code which specifies the instruction type and one or more operands which further specify the operation of the instruction. The following condensed summary lists byte-oriented, bit-oriented and literal and control operations. For byte-oriented instructions, "f" represents a file register designator and "d" represents a destination designator. If "d" is 0, the result is pushed in the "W" register F1. If "d" is one, the result is returned to the file register specified in the instruction. For bit-oriented instructions, "b" represents a bit field designator which selects the number of the bit affected by the operation, while "f" represents the number of the file in which the bit is located. For literal and control operations, "k" represents an eight or nine bit constant or literal value.

| Instruction-Binary(Octal) | Name | Mnemonic, | Operands |
|---|---|---|---|
| BYTE-ORIENTED INSTRUCTIONS | | | |
| 0 000 000 000 000 (00000) | No Operation | NOP | — |
| 0 000 000 000 001 (00001) | Halt in PIC 1665 | HALT | — |
| 0 000 000 000 010 (00002) | Return from Interrupt | RETFI | — |
| 0 000 000 000 011 (00003) | Return from Subroutine | RETFS | — |
| 0 000 000 000 100 (00004) | Decimal adjust W | DAW | — |
| 0 000 001 fff fff (00100) | Move W to file | MOVWF | f |
| 0 000 1d fff fff (00200) | Subtract W from file w/borrow | SUBBWF | f,d |
| 0 000 10d fff fff (00400) | Subtract W from file | SUBWF | f,d |
| 0 000 11d fff fff (00500) | Decrement file | DECF | f,d |
| 0 001 00d fff fff (01000) | Inclusive ORW with file | IORWF | f,d |
| 0 001 01d fff fff (01200) | And W with file | ANDWF | f,d |
| 0 001 10d fff fff (01400) | Exclusive ORW with file | XORWF | f,d |
| 0 001 11d fff fff (01600) | Add W with file | ADDWF | f,d |
| 0 010 00d fff fff (02000) | Add W to file with carry | ADCWF | f,d |
| 0 010 01d fff fff (02200) | Complement file | COMPF | f,d |
| 0 010 10d fff fff (02400) | Increment file | INCF | f,d |
| 0 101 11d fff fff (02600) | Decrement file, skip if zero | DECFSZ | f,d |
| 0 011 00d fff fff (03000) | Rotate file right thru carry | RRCF | f,d |
| 0 011 01d fff fff (03200) | Rotate file left thru carry | RLCF | f,d |
| 0 011 10d fff fff (03400) | Swap upper and lower nibble of file | SWAPF | f,d |
| 0 011 11d fff fff (03600) | Increment file, skip if zero | INCFSZ | f,d |
| 1 000 000 fff fff (10000) | Move file to W | MOVFW | f |
| 1 000 001 fff fff (10100) | Clear file | CLRF | f |
| 1 000 010 fff fff (10200) | Rotate file right/ no carry | RRNCF | f |
| 1 000 011 fff fff (10300) | Rotate file left/ no carry | RLNCF | f |
| 1 000 100 fff fff (10400) | Compare file to W, skip if F W | CPFSLT | f |
| 1 000 101 fff fff (10500) | Compare file to W, skip if F=W | CPFSEQ | f |
| 1 000 110 fff fff (10600) | Compare file to W, skip if F W | CPFSGT | f |
| 1 000 111 fff fff (10700) | Move file to itself | TESTF | — |
| BIT-ORIENTED INSTRUCTIONS | | | |
| 0 100 bbb fff fff (04000) | Bit clear file | BCF | f,b |
| 0 101 bbb fff fff (05000) | Bit set file | BSF | f,b |
| 0 110 bbb fff fff (06000) | Bit test, skip if clear | BTFSC | f,b |
| 0 111 bbb fff fff (07000) | Bit test, skip if set | BTFSS | f,b |
| LITERAL & CONTROL OPERATIONS | | | |
| 1 001 0kk kkk kkk (11000) | Move Literal to W | MOVLW | k |
| 1 001 1kk kkk kkk (11400) | Add Literal to W | ADDLW | k |
| 1 010 0kk kkk kkk (12000) | Inclusive OR Literal to W | IORLW | k |
| 1 010 1kk kkk kkk (12400) | And Literal and W | ANDLW | k |

FIG. 22 is a memory map showing the use of the general purpose registers as timers and for storage of painters, vectors, flags, key values, security codes and other data used in the system.

Figure 23:
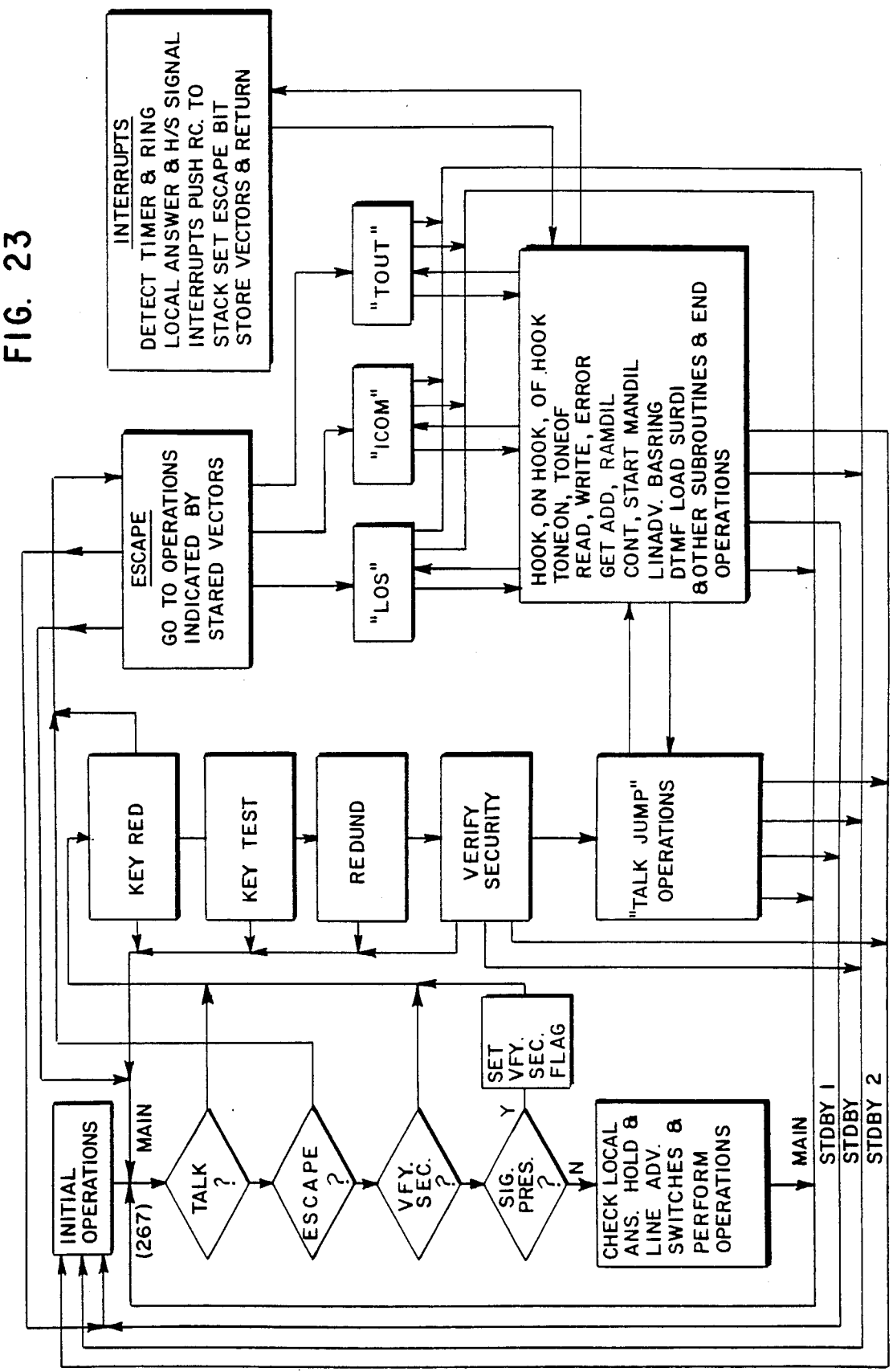
FIG. 23 is a flow chart illustrating the general operation of the microcomputer in the system of the invention.
Figure 31:
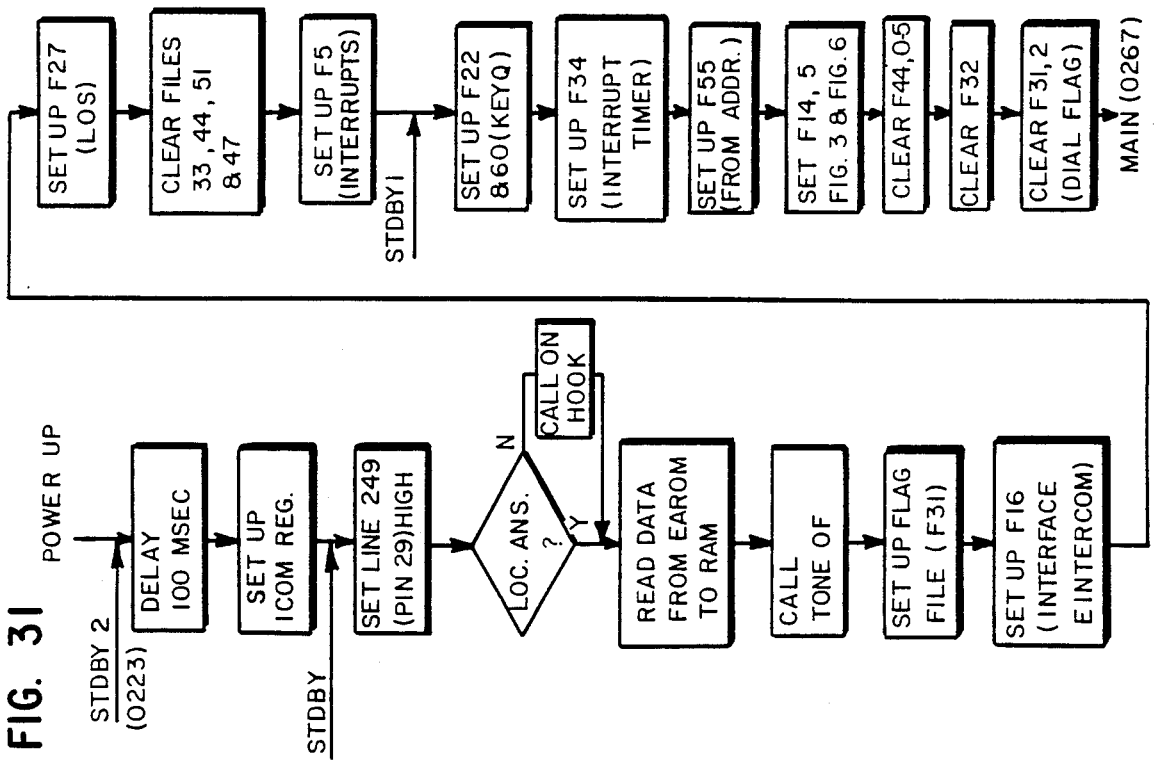
FIG. 31 is a flow chart showing initialization operations of the system of the invention.
Figure 34:
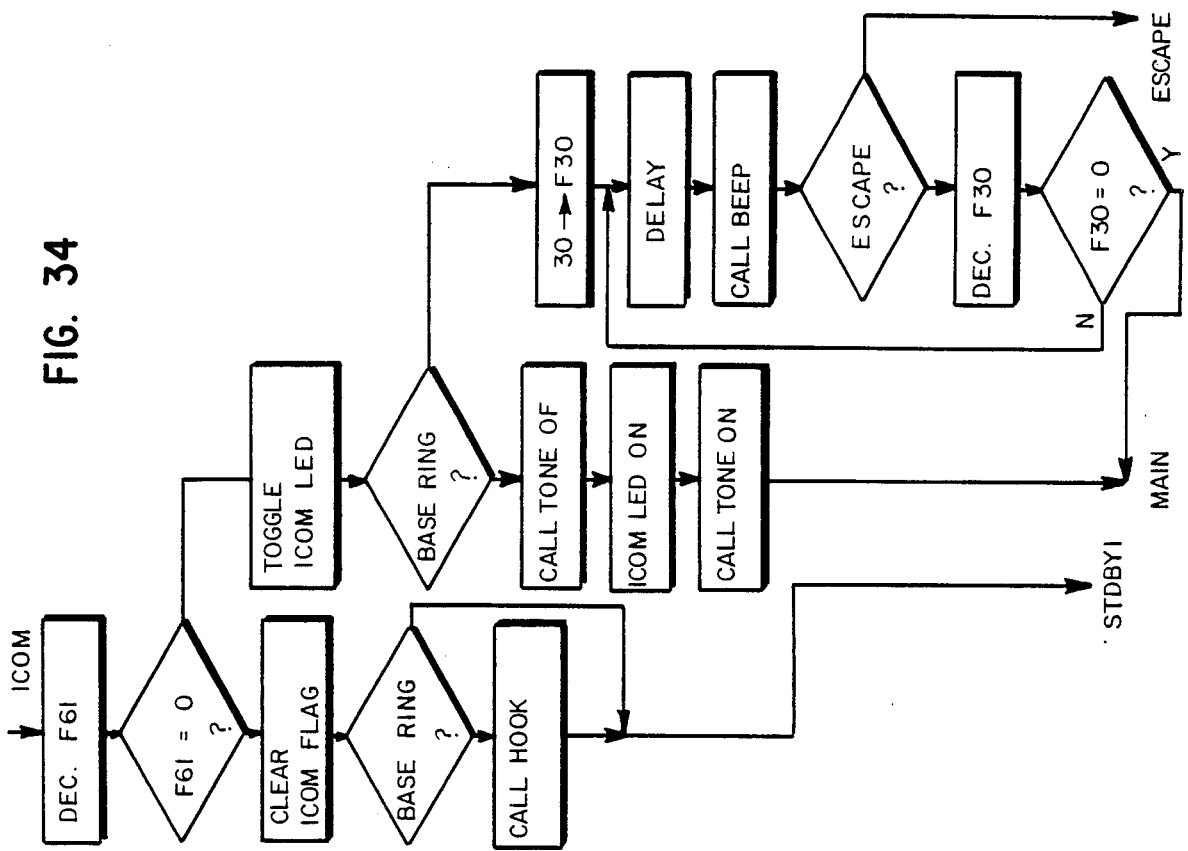
FIG. 34 is a flow chart illustrating certain "INTERCOM" operations which may performed during the "ESCAPE" operation of FIG. 25.
Figure 33:
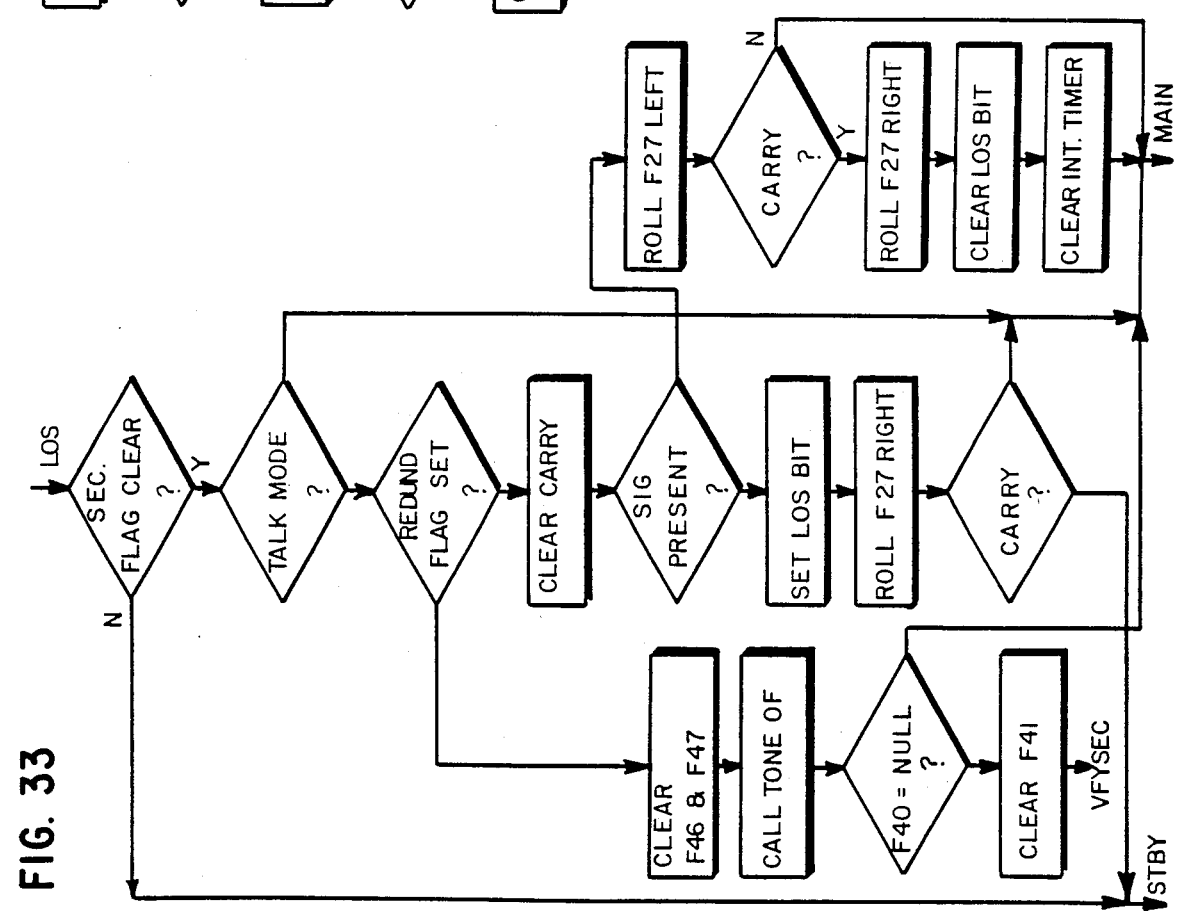
FIG. 33 is a flow chart illustration certain loss of signal or "LOS" operations during the "ESCAPE" operations illustrated in FIG. 25.

FIG. 23 is a general flow chart illustrating the general mode of operation of the processor 536 of the control unit 11. After power-up, initialization operations are performed, including the setting up of various registers or files of the processor either in cleared conditions or in conditions with certain bits in a set condition. The initialization operations are shown in detail in FIG. 31 and the operations may be entered at certain addresses indicated as "STDBY2", "STDBY" and "STDBY1" in the flow charts and also in the listing of the program. For convenience in correlating the flow charts with program listings, which are set forth hereinafter in Tables I and II, the addresses at certain points are indicated in parentheses in the flow charts. It is noted that an octal base numbering system is employed with respect to the addresses and instructions as well as with respect to the files or registers of the system.

After the initialization operations, the operation goes to a "MAIN" operation at address 0267. A talk flag is tested. If it is not clear, indicating that the talk flag is set, the operation goes to certain "KEYRED" and subsequent "KEYTEST", "VERIFY SECURITY" and "REDUNDANT" operations and thence to "TALK JUMP" operations, returning to "MAIN" or to one of the addresses of the initialization operations.

Figure 24:
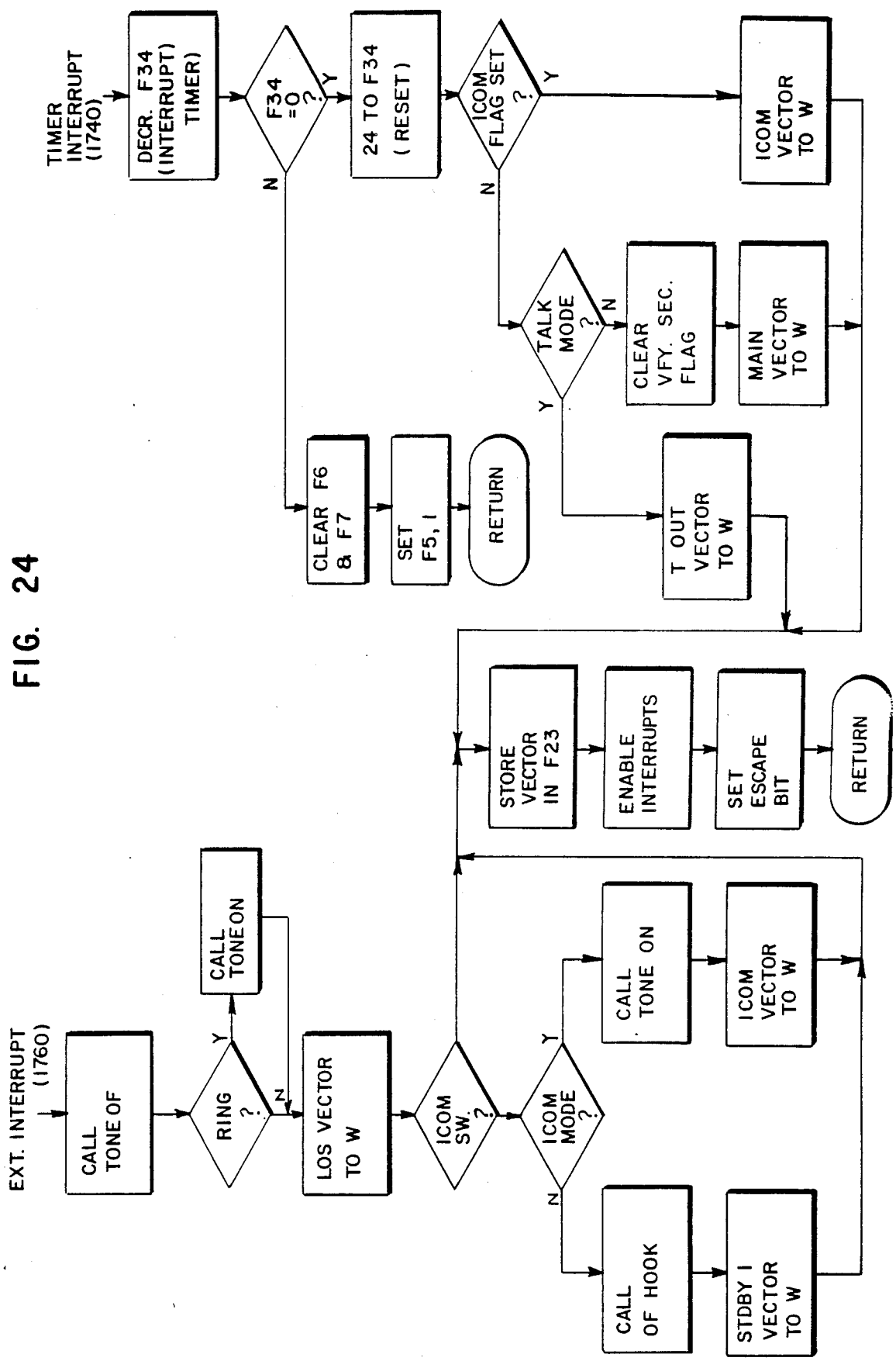
FIG. 24 is a flow chart illustrating interrupt processing in the system of the invention.
Figure 28:
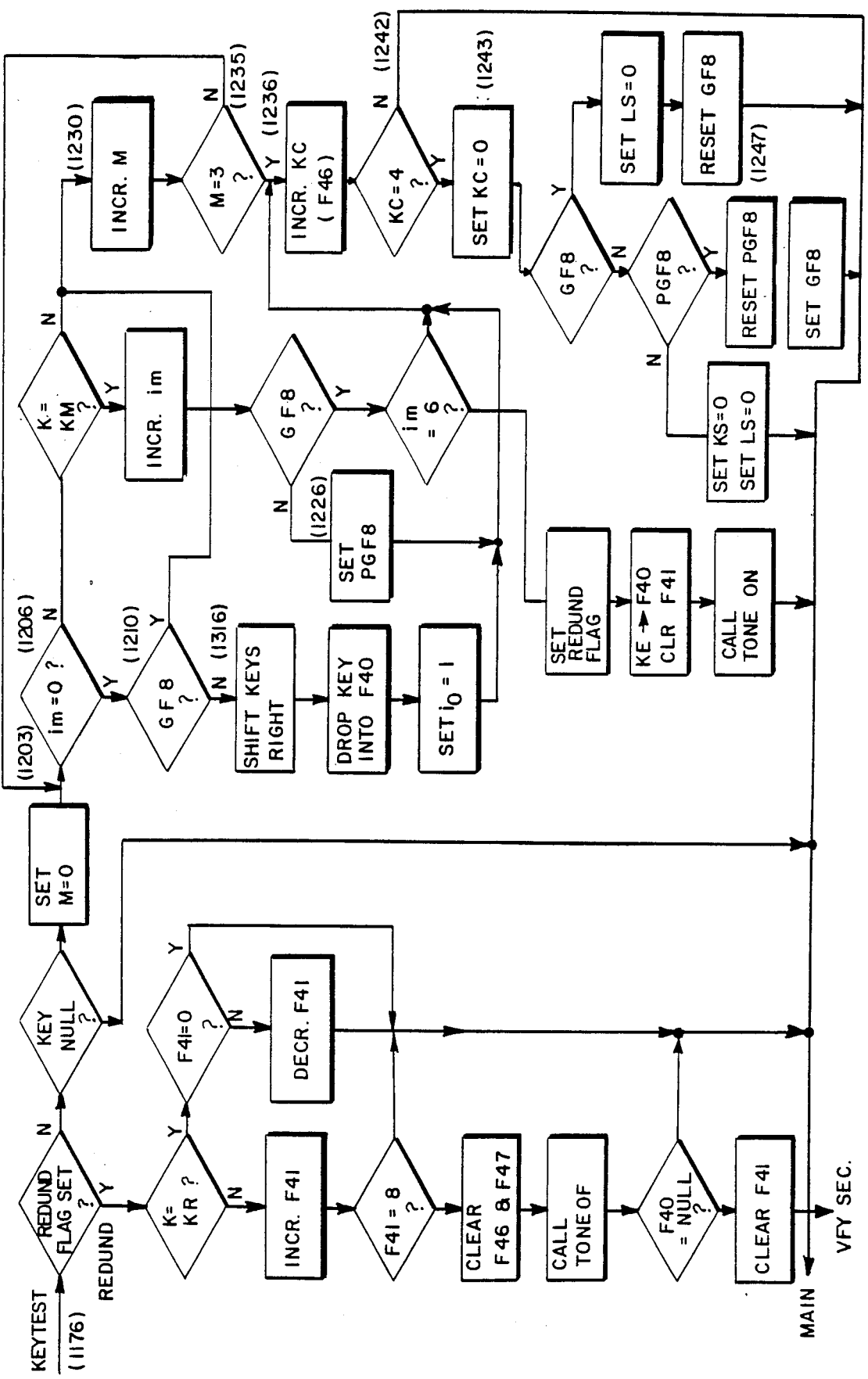
FIG. 28 is a flow chart illustrating certain "KEYTEST" and "REDUND" operations in the system of the invention.

If the talk flag is clear, an escape flag or bit is tested. If the escape bit is not clear, "ESCAPE" operations are performed as indicated by interrupt vectors which may be stored in response to either a timer interrupt or an interrupt generated in response to the detection of an external ring, to the placing of the local answer switch in an "ON" condition or to the transition of a signal received from the handset 12. FIG. 24 illustrates the storage of interrupt vectors in response to interrupts and FIG. 25 illustrates processing of interrupts.

Figure 32:
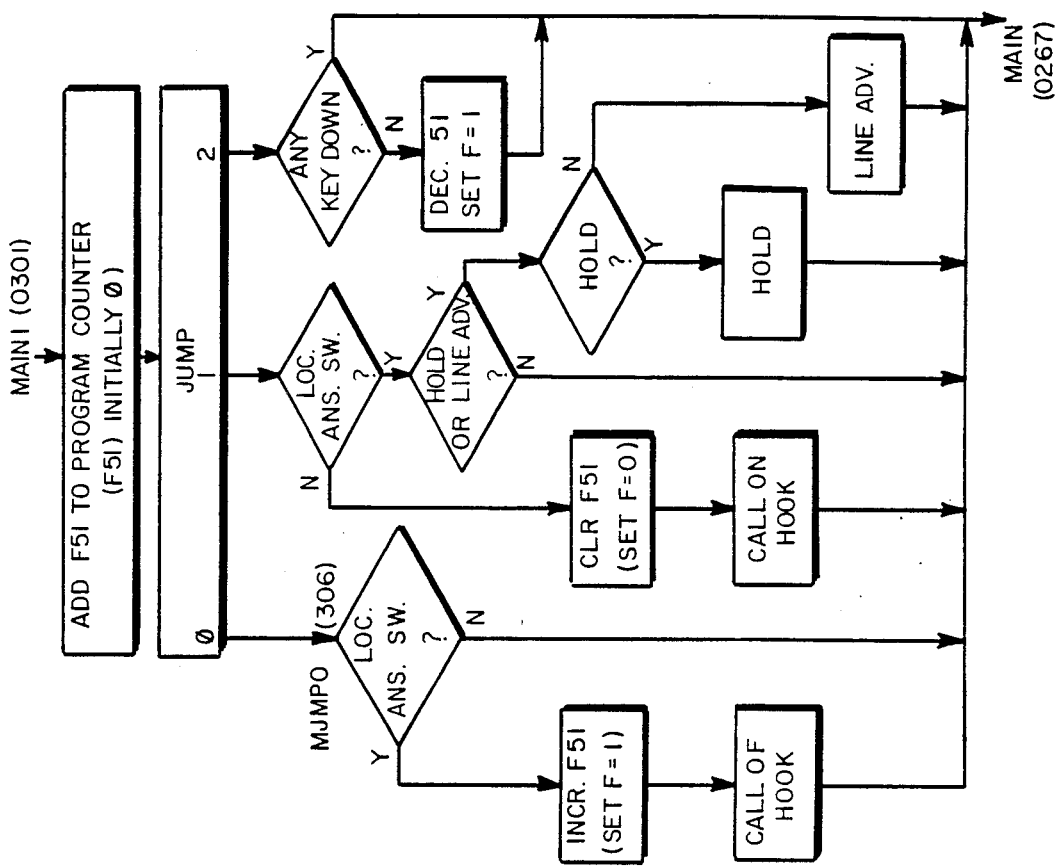
FIG. 32, is a flow chart illustrating certain control unit switch check operations of the system of the invention.

If the escape bit is clear, a "VERIFY SECURITY" flag is tested. If the "VERIFY SECURITY" flag is not cleared, the operation goes to the aforementioned "KEYRED" and subsequent operations. If the "VERIFY SECURITY" flag is cleared, a signal present flag is tested, by testing bit 0 of F11 which corresponds to pin 3 of the processor 536, connected to the line 119. If line 119 is low, indicating the presence of a signal, a "VERIFY SECURITY" flag is set and then the operation proceeds to the "KEYRED" and subsequent operations. If there is no signal present, operations are performed to check the local answer, hold and line advance switches of the control unit 11 and to effect the required operations, with returns as indicated. Such operations are shown in FIG. 32.

Both the "ESCAPE" and "TALK JUMP" operations may use common subroutine or end operations as indicated in the general flow chart of FIG. 23.

The general mode of operation may be clarified by considering the sequences of operations which take place when the system is in a quiescent condition and then considering the operation which takes place in response to placing the control 33 of the handset 12 in a "TALK" position, followed by operation of the keys of the handset to dial a number.

In the assumed quiescent condition, the control unit is energized but the local answer switch of the control unit is off and the switch 33 of the handset in either its "OFF" or "ON" or "STANDBY" positions. In the quiescent condition, the "TALK", "ESCAPE" and "VERIFY SECURITY" flags are all clear and with no signal present, the operation proceeds to a control unit switch-check operation to check the local answer and other switches as shown in detail in FIG. 32. This operation is a "MAIN1" operation, at address 0301, in which a jump vector in F51 is added to the address in the program counter, designated as F2, to jump to a new address. Initially, the vector stored in F51 is 0 and the operation goes to address 0303 and thence to "MJMPO" at address 0306. In "MJMPO", local answer switch is tested by testing bit 2 of F17 which is connected to pin 32 and to terminal 11 of the circuit board 60 which is in a high state normally and which is grounded when the local answer switch is operated to an "ON" condition. In the assumed quiescent condition, bit 2 of F17 is high or not clear and the operation returns to "MAIN" as indicated in FIG. 32.

In the assumed quiescent condition, a timer interrupt is periodically generated and is processed as is shown in FIG. 24. When a timer interrupt is generated, the operation goes to address 1740. Each interrupt causes F34 to be decremented, F34 having been set up with a predetermined count therein during the initialization operations. After repeated interrupts which decrement F34 to 0, F34 is reset and then an intercom flag is tested to determine whether it is in a set condition. If not, a "TALK" mode flag is tested to determine whether it is clear, i.e., whether the system is not in the "TALK" mode. Normally, in the quiescent condition, the "TALK" mode flag will be clear. Then a "VERIFY SECURITY" flag is cleared, after which a "MAIN" vector (0267) is stored in the working register or file W. Then a "CLEARINT" operation is performed in which the vector in W is stored in F23, both interrupts are enabled and the escape bit is set, returning to the point at which the interrupt occurred.

When, after such operations, the operation gets to "MAIN, " the "TALK" flag will be tested and then when the escape bit is tested, it will be found to be set and the operation then goes to an "ESCAPE" operation, at address 0106. In the "ESCAPE" operation, the escape bit is cleared and then the vector in F23 is moved to the program counter F2. In the assumed quiescent condition, the "MAIN" vector is entered into the program counter. Thus, in the assumed quiescent condition, the operation loops from "MAIN" and through tests of the "TALK", "ESCAPE", "VERIFY SECURITY" and "SIGNAL PRESENT" flags and a test of the local answer switch and back to "MAIN", periodically going through the "ESCAPE" operation and directly back to "MAIN" in response to timer interrupts.

If the control 33 of the handset 12 is placed in the "TALK" position, a 83 Hz pilot tone signal is developed and transmitted to be detected in the digital signal detector and processing circuitry 118 of the control unit 11 and to cause the signal present line 119 to be brought low. Line 119 is connected to pin 3 of the processor 536 which corresponds to bit 0 of F11. In the operation as depicted in the basic flow chart of FIG. 23, when the signal present line is brought low, the "VERIFY SECURITY" flag is set and the operation then goes to the "KEYRED" and subsequent operations as depicted in the flow chart of FIG. 26.

KEYRED & RELATED OPERATIONS

Referring to FIG. 26, tests are made to determine the occurrence of a valid transition of the key code input line 120 from a low state to a high state, line 120 being connected to pin 4 which corresponds to bit 1 of F11. To detect such transitions, "SETUP", "INPLO" and "INPHI" subroutines are used. This transition detection operation is a very important feature of the invention and is detailed in FIG. 27, described hereinafter. When a valid low to high transition of the 98 Hz signal is detected, F25 is cleared, F25 being a raw key register, as hereinafter described. After clearing F25, a delay is instituted corresponding to the minimum duration of a valid 98 Hz pulse. At the end of the delay time, F11,1(key code input line 120) is tested to determine whether it is still set or high. If not, it indicates an invalid pulse and the operation returns to "MAIN". If F11,1 remains set, however, a short timer delay is generated and then F11,1 is again tested. If, at this time, F11,1 is clear, it indicates a valid "raw key" pulse of minimum duration which is a pulse referred to hereinafter as a "NULL" pulse.

If, however, F11,1 remains set, F25 is incremented and then if F25 does not contain more than a full count of 23, another short delay is developed and F11,1 is again tested. If the test of the 98 Hz pulse indicates that it is valid, F25 will contain a number corresponding to the duration of the pulse. If the duration of the pulse is less than the minimum valid duration or greater than the maximum valid duration, the operation returns to "MAIN".

Assuming that the pulse is indicated as being a valid "raw key" pulse, the operation proceeds to a "KEYTEST" operation which is complex and which embodies further important features of the invention.

As described in detail hereinafter, the "KEYTEST" operation performs additional validation tests. In general, it tests for receipt of at least a certain number of valid "raw key" pulses of the same duration during receipt of a certain larger number of pulses and stores a validated key value. In the system as illustrated, a validated key value is stored in F40 when six valid "raw key" pulses of the same duration have been received during receipt of a total of not more than eight valid "raw key" pulses. Then a "TONEON" operation is performed, to transmit a 1600 Hz tone to the handset 12 and a "REDUND" flag is set to cause a "REDUND" operation to be performed with respect to valid "raw key" pulses generated in the "KEYTEST" operation.

The "REDUND" operation is also an important feature of the invention. As described hereinafter, the system looks for an acknowledgment signal which the handset transmits in response to the 1633 Hz tone signal. The acknowledgment signal is in the form of a number of valid "raw key" pulses which have a certain value, "null" pulses of minimum duration being used in the illustrated system. The system as illustrated looks for such null pulses and looks for a condition in which, over a period of time, the number of such null pulses less the number of non-null pulses is equal to 8. Then a "TONEOF" operation is performed to terminate transmission of the 1633 Hz signal to the handset 12. Then a "VFYSEC" operation is performed in which the validated key value stored in F40 may be compared with the first digit of a stored security code and verified, if correct.

Another series of 98 Hz pulses may then be transmitted by the handset and the foregoing sequence of operations is repeated, each fully validated key value being compared with a digit of the stored security code, until all digits of the security code have been verified. Then a "VERIFY SECURITY" flag is cleared, a "BEEP" subroutine is called to signal the user of the handset that he is in communication with the control unit. Also, the "TALK" flag is set and a "OFHOOK" subroutine is called, returning to "MAIN". Then, after hearing dial tone, the user of the handset may start keying a number to be called. In response to the validation of a subsequently transmitted key, flags may be conditioned to initiate a talk jump ("TLKJMP") operation, at address 0510.

In the talk jump ("TLKJMP") operation, there is a vectored jump to one of twenty-one addresses, according to an octal base number stored in F32 when the operation is initiated. Under the assumed conditions, a 0 vector is stored and a "TALK" operation is initiated. Initially, the validated key value in F40 is tested to determine whether the key is greater than 10. If not, it is stored in a key queue formed by F60 through F77, and then a dial flag is set and the operation proceeds to a "MANDIL" operation.

In the "MANDIL" operation, F11,3 is tested to determine whether tone or pulse dialing has been selected by the dial select switch 566 and, if pulse dialing has been selected, a further test is made of F11,3 while F12,7 is set, to determine whether 20 pulse per second or 10 pulse per second dialing has been selected. F11,3 and F12,7 correspond to pins 6 and 19 which are connected to contacts of the dial select switch. The "MANDIL" operation functions after such tests to perform tone or pulse dialing operations so as to transmit a keyed digit to the central telephone exchange and also operates to provide proper interdigital timeouts.

Figure 35:
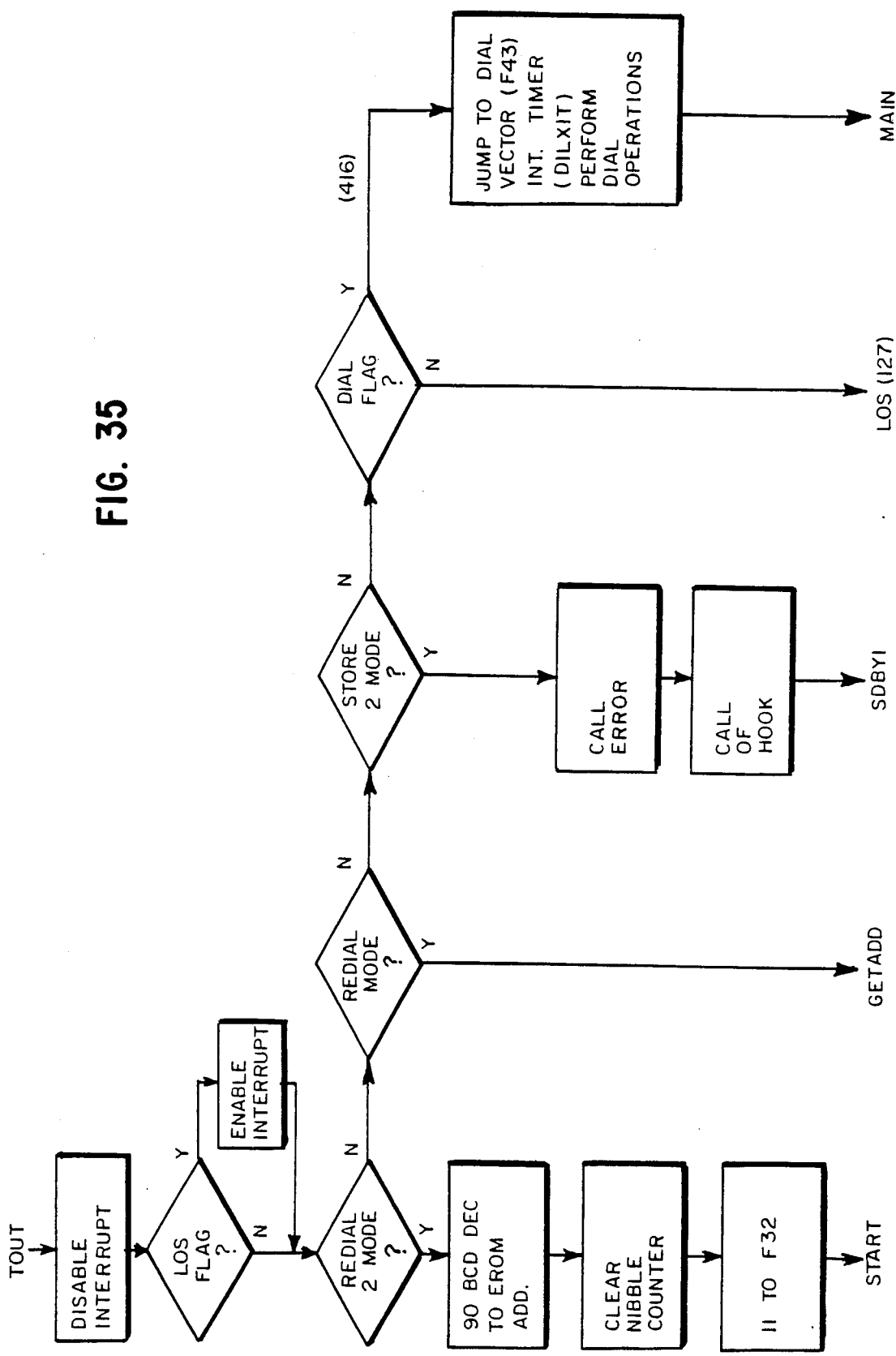
FIG. 35 is a flow chart illustrating certain "TOUT" operations which may be performed during the "ESCAPE" operation of FIG. 25.
Figure 38:
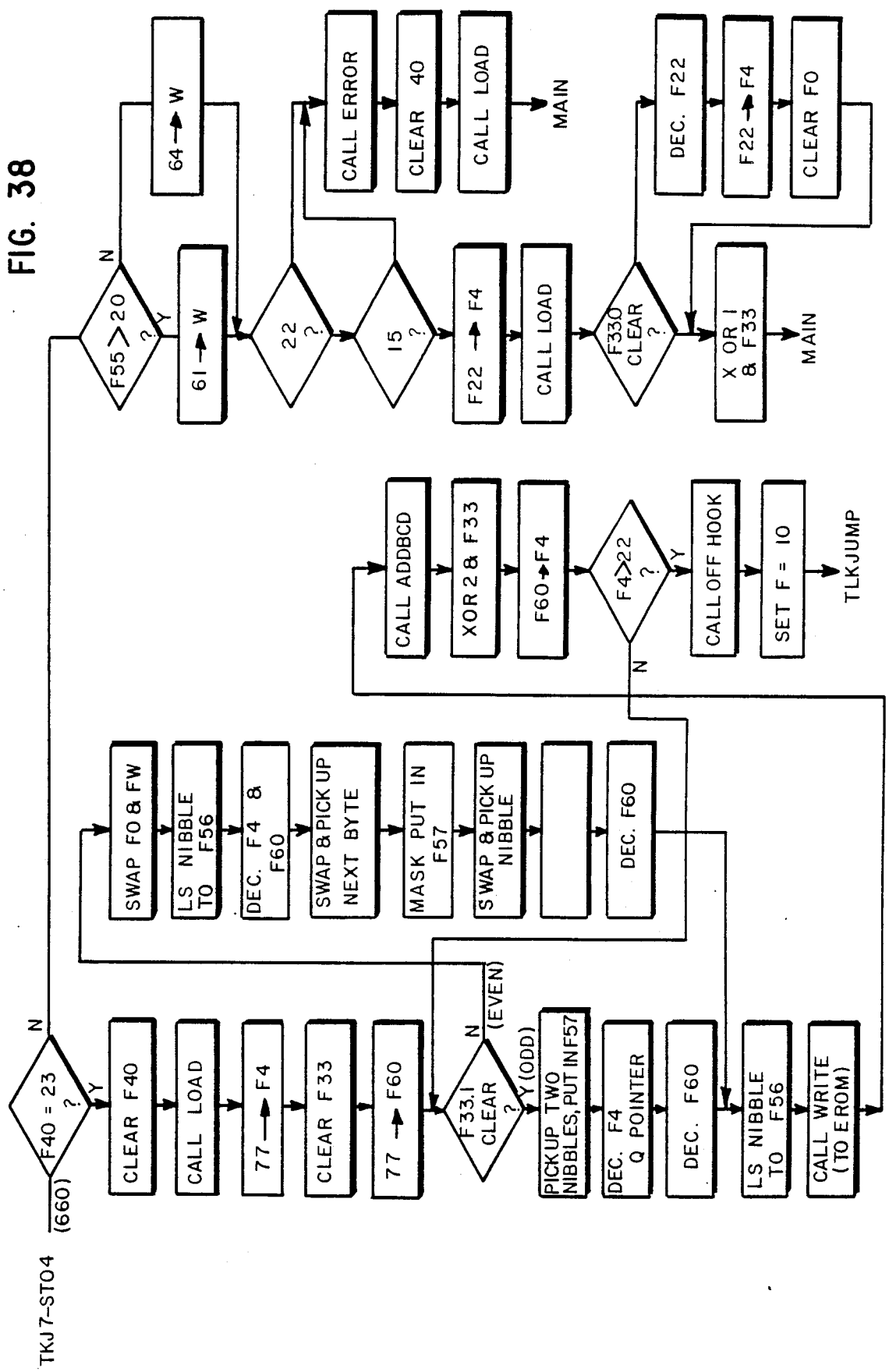
Figure 39:
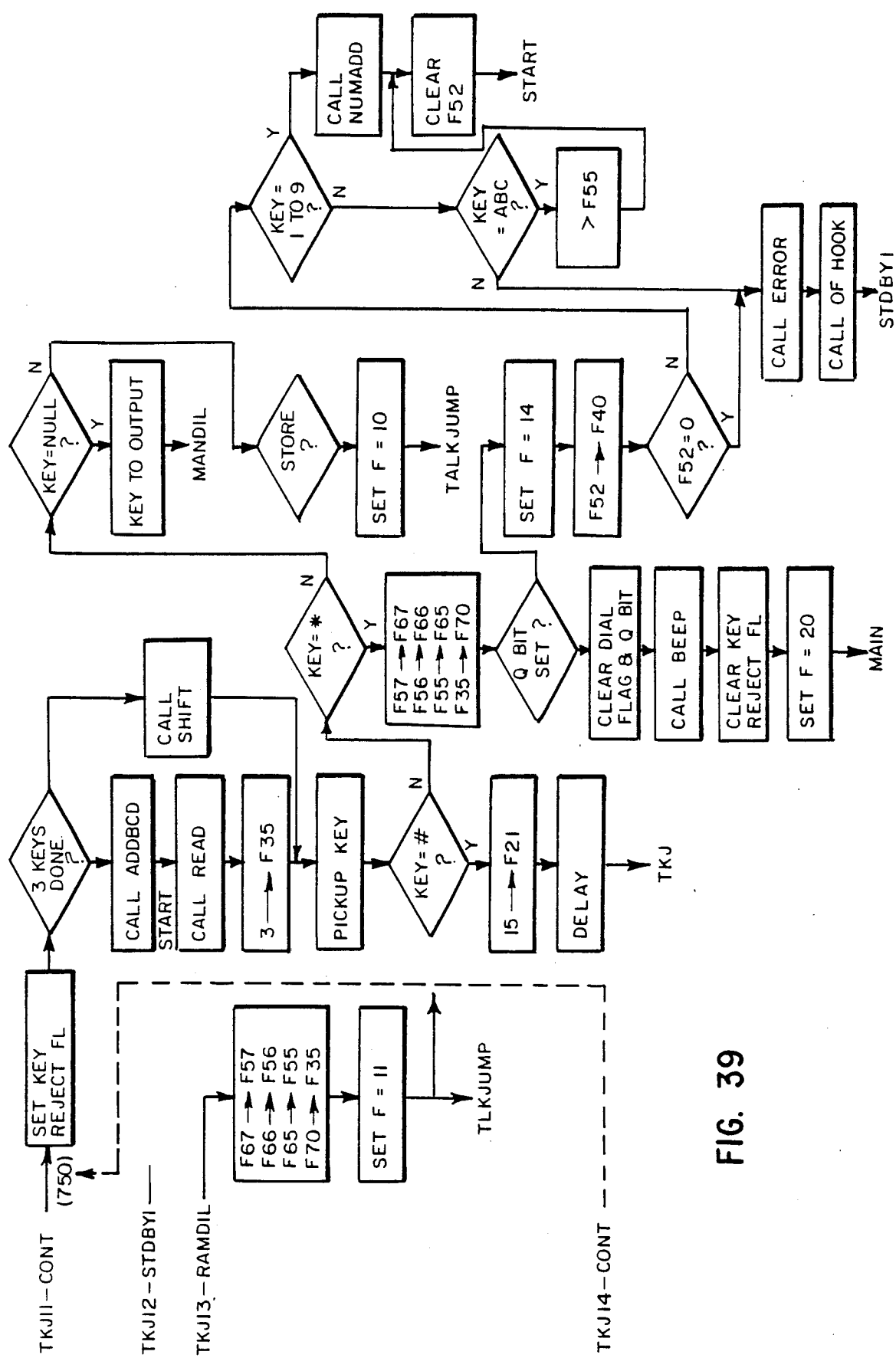
Figure 40:
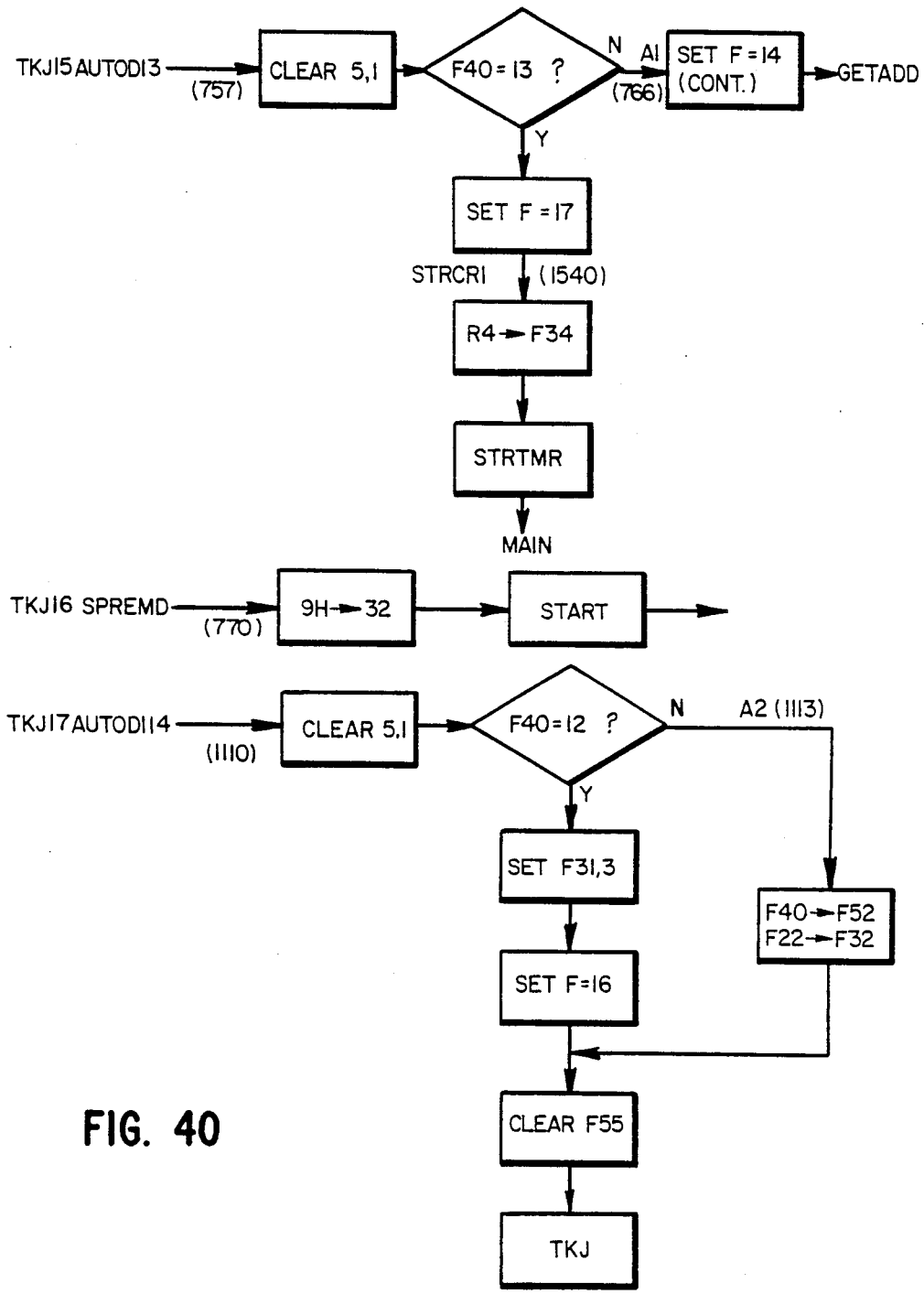
Figure 41:
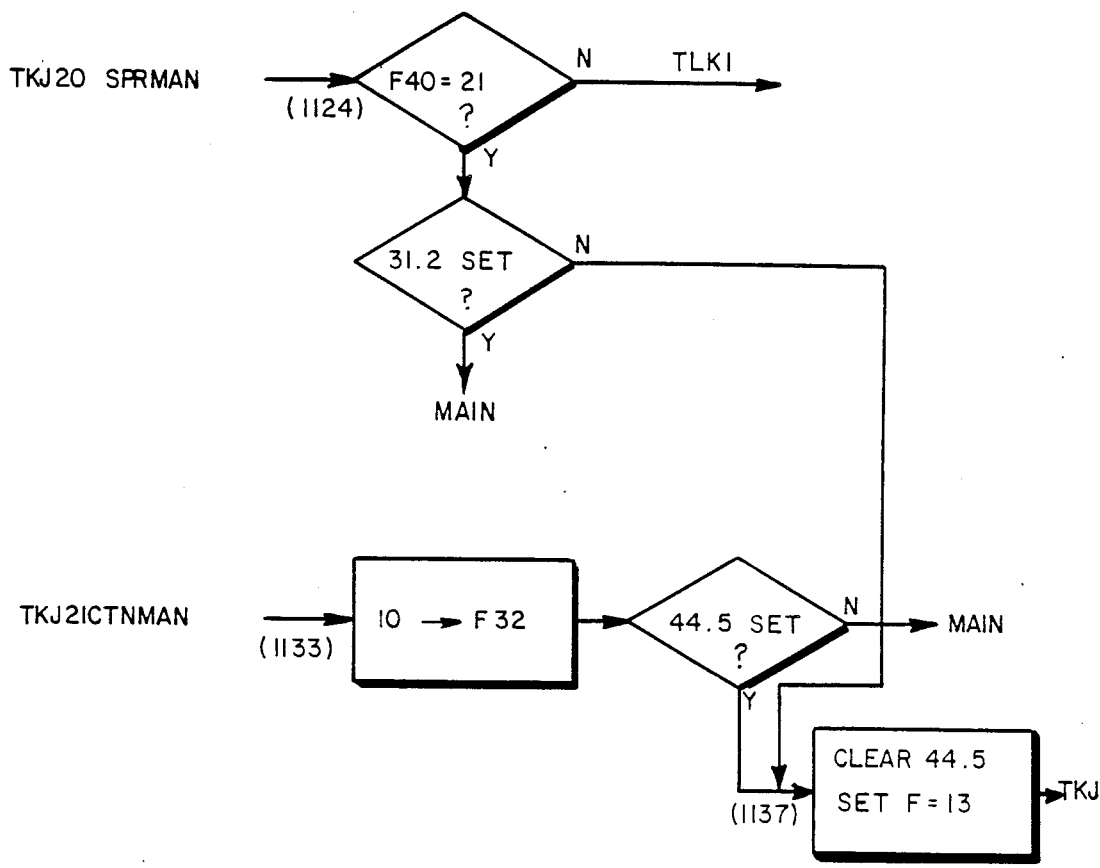
Figure 42:
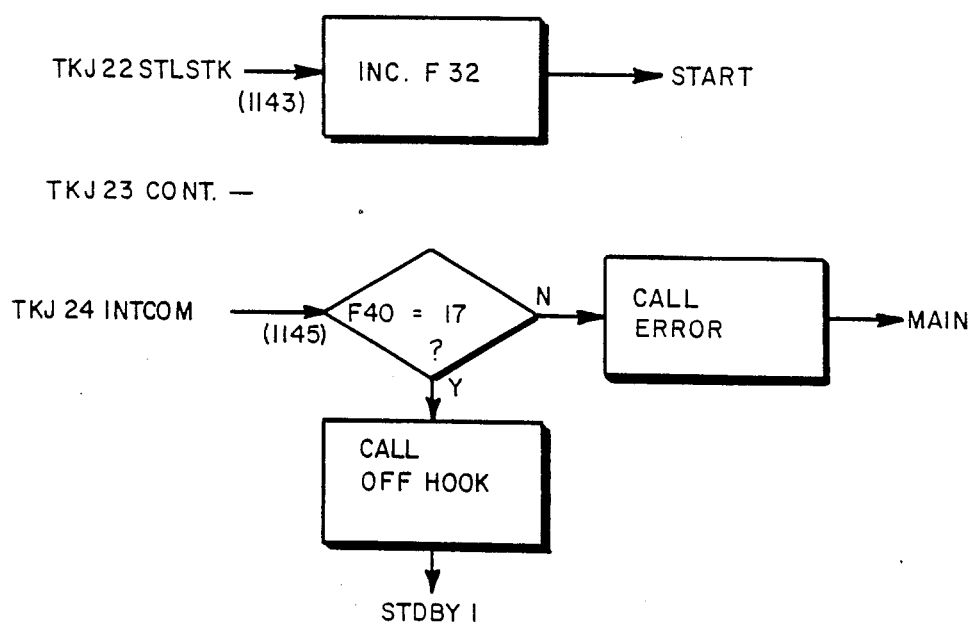

During interdigital timeouts, storage operations are performed to store manual dial keys in the non-volatile memory 582 at a "REDIAL" location. Such storage operations are performed in response to timer interrupts. Referring to the interrupt processing flow chart of FIG. 24, the "TALK" flag is set during manual dialing and a "TOUT" vector is stored in F23, to operate in the "ESCAPE" mode to effect a jump to a "TOUT" operation at address 0157. The "TOUT" operation is shown in the flow chart of FIG. 35 and dialed key values are stored in a manner as hereinafter described, for use if a redialing operation is selected.

After transmitting digits to establish communication with a called party through the central telephone exchange, the user of the handset converses with the called party in the normal fashion. The "TALK" flag remains in a set condition and, from "MAIN", the operation goes through the check of the "TALK" flag to "KEYRED", to check for a low-to-high transition of the key code input and, when no transition is detected, back to "MAIN" or to "ESCAPE" if an interrupt has been generated. With the system in the "TALK" mode, a timer interrupt stores the "TOUT" vector in F23 and sets the "ESCAPE" bit (F31,7) to obtain an "ESCAPE" from the "INPLO" or "INPHI" calls in "KEYRED". Under the assumed conditions, the operation returns from "TOUT" to "MAIN", in response to a timer interrupt.

When the user at the handset terminates his conversation, he may move the control 33 from the "TALK" position to the "ON" position or to the "OFF" position. In either case, the loss of signal is detected at the control unit to generate an interrupt. However, the system does not instantaneously switch out of the "TALK" mode. Instead, it conducts tests to make certain that the loss of signal is not a temporary condition. In response to a loss of signal interrupt, a loss-of-signal "LOS" vector is stored in F23. In the subsequent "ESCAPE" operation, a "LOS" counter (F26) and a "LOS" shift register (F27)

are used in a manner such as to prevent an effective disconnect from a transient loss-of-signal condition.

TRANSITION DETECTION

As aforementioned, the transition detection operation is an important feature of the invention and is detailed in FIG. 27. The carry flag is cleared, F45 is set up with the binary numbers 00111100 and an "INPLO" test-for-low operation is initiated. After testing the escape flag and finding it clear, a test is made to determine whether the signal is low. If so, F45 is rolled right and, if the carry flag is not set, the operation loops to again roll right if the signal is low and the carry is not set. If the signal remains low during three consecutive tests, the test of the carry flag will show that it is set and the operation then proceeds from the "INPLO" test-for-low operation to the "INPHI" test-for-high operation.

The operation will not proceed to the "INPHI" operation in response to a high signal. However, if during the testing for a low, the signal goes high and the carry is clear, F45 is rolled left and loops back. A roll-right operation is then required to place F45 in the condition it was in before the high signal was detected. Thus, an additional low is required to offset one interjected high and a total of four lows are required to emerge from the "INPLO" test-for-low operation. If there are two interjected highs, a total of five lows are required. Repeated highs have no effect once a carry set condition is established, since the roll-left operation is performed only when carry is clear. When the operaion emerges from "INPLO", it means that at least 3 of the last 5 preceding tests showed lows.

An important feature is that the operation is not adversely affected by variations in the order of receipt of highs and lows during the "INPLO" operation. For example, a high may be detected in the very first test and, if followed by four lows, the operation will proceed to the "INPHI" operation.

The relationship between the number of positive responses and the total number of tests may, of course, be changed. For example, in the illustrated system, F45 may be loaded with binary 00111000, or 00011000 or 00010000 to require greater proportionate numbers of positive responses, when desired.

The system thus allows for the possibility of an interjected negative response such as might be caused by transient noise conditions, for example, without affecting the reliable detection of a valid state. At the same time, it is quite fast in response, and any delay in the response is proportionate to the amount of noise which may be encountered.

The "INPHI" operation is essentially the same as the "INPLO" operation, differing only in that a test is made for a high input, rather than for a low input. With the system, it is possible to operate under extremely high noise conditions and yet obtain a reliable indication of a low-to-high transition.

KEYTEST OPERATION

As aforementioned, the "KEYTEST" operation embodies important features of the invention. This operation tests to see whether six out of a series of not more than eight values are the same. Starting from an initial condition, it examines input key values until obtaining two that are the same. If no two out of the first four consecutive values are the same, the system starts over. If during the first four, two are the same, the system "prepares to go for eight", setting a "PGF8" flag and then after the first four, a "go for eight" or "GF8" flag is set. Once the same value is received six times, it is validated and the system is reset, but if this does not occur after eight values are received, the system starts over.

The "KEYTEST" operation uses F40, F41 and F42 as "buckets" to store validated key values and to also store the number of times that the stored key value has been developed, after an initial reset condition. The key value, designated as $k_m$ is stored in the 5 least significant bits of the file in which it is stored while the number of times it has been received, designated as "$i_m$", is stored in the 3 most significant bits of the file. The current file being tested or used for storage or recall is designated as the "M" file, "M" being 0 when the file is F40, being 1 when the file is F41 and being 2 when the file is F42.

In the "KEYTEST" operation, after a test of the "REDUND" flag and a test for a "NULL" value, "M" is set to 0 and then a test is made of the content of "$i_m$" which is initially F40. Then a test is made of a "GF8" flag which is initially clear and then the contents of F40 and F41 are repectively shifted to F41 and F42 while the validated raw key value in F25 is stored in bits 0-4 of F40. Then a 1 is stored in bit 5 of F40 setting "$i_0$" equal to one.

After setting "i" equal to 1, a key counter "$K_C$" (F46) is incremented and if the total count therein is less than 4, the operation returns to "MAIN". In the next operation, when a test is made to determine whether "$i_m$" equals 0, a negative result is obtained since "$i_m$" is in F40 in this case and F40 now contains a key value. Then a test is made as to whether the key value stored in the current counter is equal to the new key value. If it is, "$i_m$" is incremented and a "PGF8" flag is set after which the key counter "$K_C$" is incremented, returning to "MAIN" if "$K_C$" is less than 4.

If the new key value is not equal to "$k_m$", the bucket or "M" counter is incremented and if "M" is not equal to 3, the operation returns to address 1205 to test to determine whether "$i_m$" is equal to 0. If so and if the "GF8" flag is not set, the right shift operation is again effected and the new key is dropped into F40, after which "$i_0$" is again set equal to 1. Then the key or "$K_C$" counter is incremented.

If, after incrementing the bucket or "M" counter, it is found that the "i" value in the corresponding file is not 0 but that the key value stored therein is equal to the current key value, the "i" value of the file is incremented. If the "i" values of all three files are not 0 and the "k" values of all three files are not equal to the current key values, "M" will have been incremented to 3 and the key or "$K_C$" count is incremented.

The system as thus far described thus tests the files or "buckets" F40, F41, F42 in order, each file being tested to determine whether it is empty and, if not empty, whether it contains the new key value. When a tested file is empty, a right shift operation is performed first and then the new key value is entered into F40. When the tested file is not empty and it contains the new key, the "i" portion of the tested file is incremented. In either case, the key counter "$K_C$" is incremented. When all three files are not empty and none of them contain the current key value, the key counter "$K_C$" is incremented but the "i" portion of none of the files is incremented.

Both the "GF8" and "PGF8" flags are initially clear or not set and the "GF8" flag is set only after setting of the "PGF8" flag. The "PGF8" flag is set whenever the "i" portion of a tested file is incremented, i.e., whenever two identical key values have been detected. At the end of a key count of 4, if the "PGF8" flag has not been set, the system is reset to the initial condition. If the "PGF8" flag has been set, it is reset and the "GF8" flag is then set. Thereafter, after incrementing "$i_m$", a test is made as to whether "$i_m$" is equal to 6. If the test shows that it is equal to 6, the key value is validated and is stored in F40, the "REDUND" flag is set and the "TONEON" sub-routine is called. However, if "$i_m$" has not reached 6, another testing operation is made at the end of another 4 key counts, i.e., at the end of a total of 8 key counts. If at the end of 8 key counts, the "$i_m$" test has not shown 6 counts, the system is reset.

The system as shown thus will not produce a validated key value unless at least 6 out of the last 8 preceding values are the same. As a result, the likelihood of an improper validation is extremely small. However, the system will operate under very adverse noise conditions. It is unlikely that transient noise conditions would produce raw key values in F25 and it is extremely unlikely that six out of eight improper key values could be produced. However, the system does allow for the possibility that under high noise conditions, false key values may occasionally be generated. Such false key values may occur at any time during a testing sequence without affecting the operation. Thus, the false key value may be the first value entered after initiating a testing sequence, or both the first and second key values may be false without preventing the production of a validated key value.

It is also noted that the system operates to produce a validated key value when at least "N" out of the last "M" preceding values are the same, "N" being six and "M" being eight in the system as illustrated. However, "N" and "M" may be changed according to the requirements of any particular system, as desired.

REDUNDANT OPERATION

As aforementioned, the system looks for an acknowledgment signal which the handset transmits in response to the 1633 Hz tone signal, the acknowledgment signal being in the form of a series of null pulses, all of which have the same minimum value or duration and which may be described as "redundant" pulses. The system looks for a condition in which, over a period of time, the number of such null pulses, less the number of non-null pulses, is equal to 8. First, a test is made to determine whether the key value stored in F25 is equal to the redundant or "KR" or null value, by testing F25 against itself and then testing the zero flag, F3,2. If a null is detected, F41 is incremented, F41 being now used as a counter. Then F41 is tested to determine whether the count is 8 and if not, the operation returns to "MAIN". The operation also returns to "MAIN" if the test for a null is negative and F41 is in the 0 or reset condition. If the test for a null is negative and F41 is not in a reset condition, F41 is decremented. In order for F41 to reach a full count of 8, there must be a condition in which the accumulated number of null pulses, less the accumulated number of non-null pulses is equal to 8.

Figure 29:
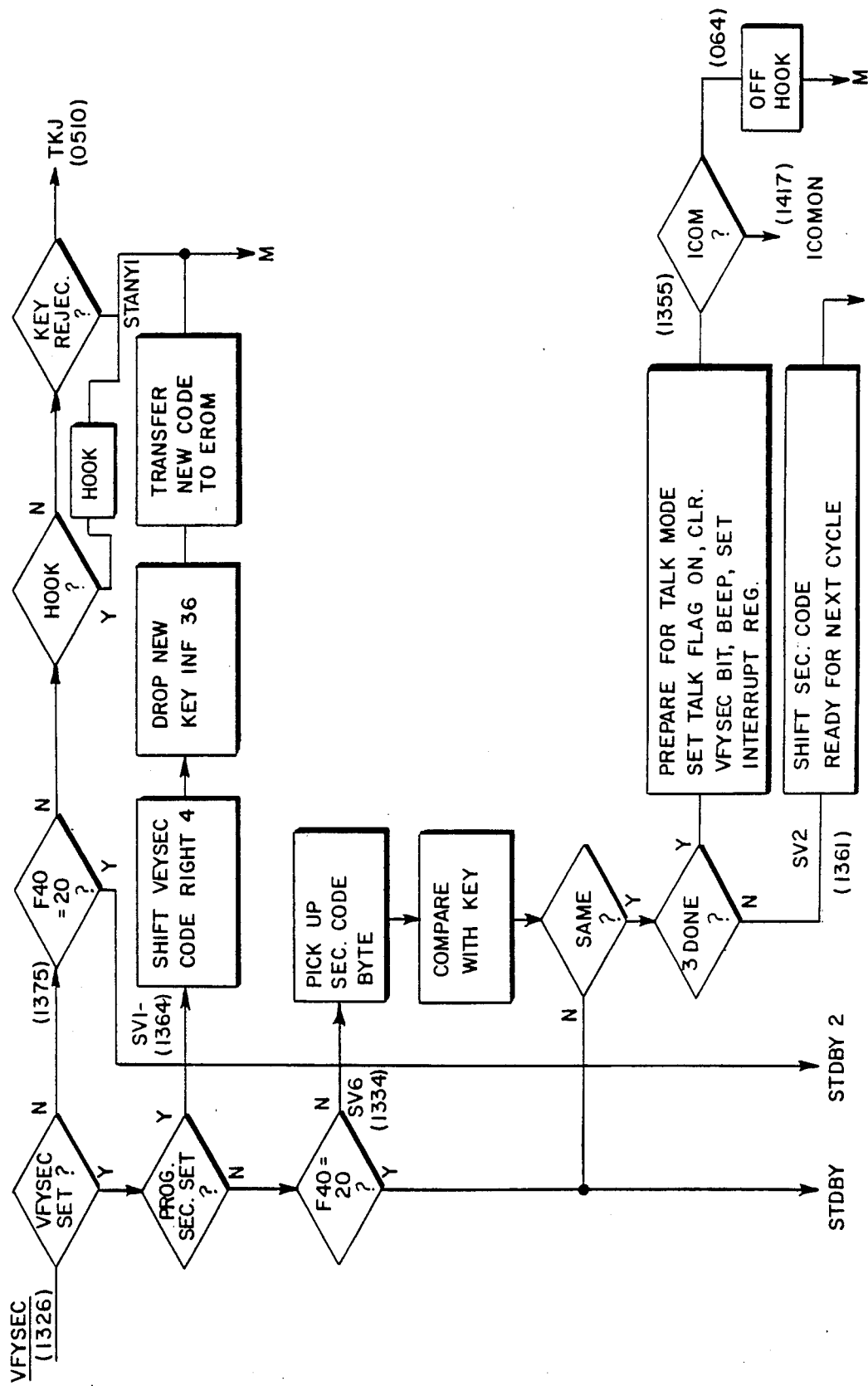
FIG. 29 is a flow chart illustrating a certain "VERIFY SECURITY" operation of the system of the invention.

When a full count of 8 is reached, files F46 and F47 are cleared and a "TONEOF" sub-routine is called after which a test may be made to make certain that the value in F40 is not a null value. If it is, the operation again goes back to "MAIN", but if not, F41 is cleared and then the operation goes to a "VERIFY SECURITY" operation, "VFYSEC", shown in FIG. 29.

VERIFY SECURITY OPERATION

In the "VERIFY SECURITY" operation, if the "VERIFY SECURITY" flag is not set, F40 is tested to determine whether the key has an off value of 20 or a hook value of 22. If not, the key reject flag (F44,2) is tested, the program proceeding to the "TALK JUMP" operation if the key reject flag is clear. If F40 stores the value of 20, the operation goes to "STANDBY 2" and if the hook value 22 is stored, a "hook" sub-routine is called, the operation then going to "STANDBY 1".

If the "VERIFY SECURITY" flag is set, the operation goes either to a program security operation or to an operation for checking the validity of "KEY VALUE" against the stored security code bytes. After verification of each byte, the security code is shifted for comparison of the validated "T" with the next byte. After verification of three bytes, the system prepares for the talk mode as indicated and then tests the intercom or "ICOM" flag. If the "ICOM" flag is clear, the system calls a "OFHOOK" sub-routine and then goes to "MAIN". Then with the "VFYSEC" flag cleared, the system may respond to a next validated key code input to go to "STDBY2", to call the "HOOK" sub-routine and go to "STDBY1" or, if the key reject flag is clear, to go to "TLKJMP".

TALK JUMP OPERATIONS

In the initial discussion of the operation of the system, a manual dialing example was given, in which it was assumed that the key stored in F40 was equal to zero through #With reference to FIG. 30, if the stored key has a greater number, tests are made to determine the operations to be performed. Thus, if the stored key is an "A" key, the operation goes to a "HOLD" operation at address 1447. If the stored key is a "B" key, a strap is read to determine whether the system is set up for single line or two line operation. If the system is set up for two line operation, the operation goes to a "LINE ADVANCE" operation at address 1504. For single line operation, the corresponding key may be used as a "HELP" key to call the police or another emergency service, for example.

If the key is the intercom key, an "ONHOOK" sub-routine is called, F16,3 is cleared and the operation goes to an "ICOMFH" operation at address 337.

If the key has a "NUMBER" greater than that of the intercom key, (greater than $17_8$), a jump vector is computed by subtracting $17_8$ from the number stored in F40 and the operation goes back to "TLKJMP".

FIGS. 36-42 show details of many of the operations performed after the jump, it being noted that in the operations having lower numbered jump vectors, higher numbers may be stored in F32 to effect jumps to operations having higher vector numbers. The use of the vector jump operation in the "TALK JUMP" and other operations of the system facilitates fast and reliable operation of the system, with minimum memory requirements.

Figure 43:
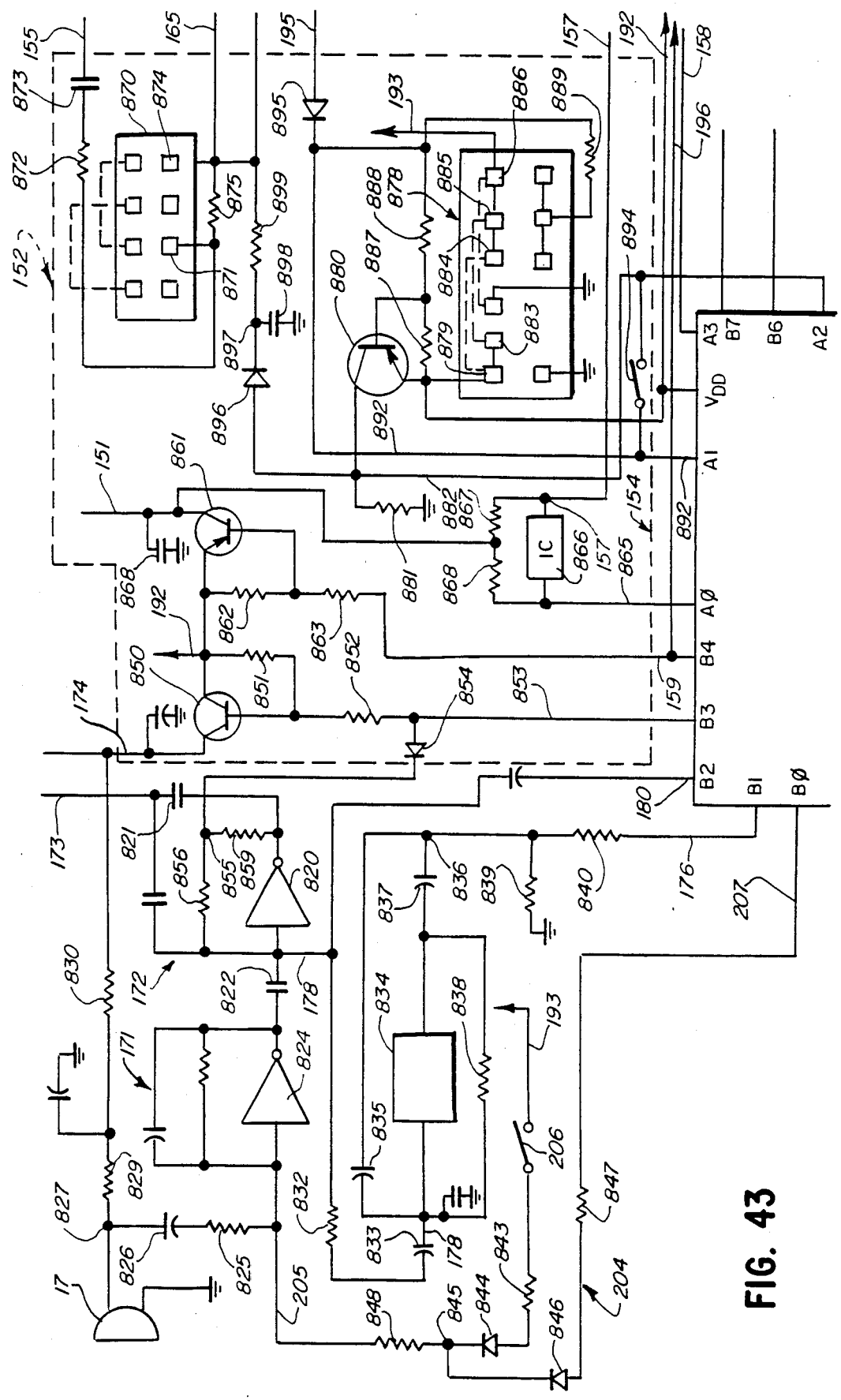
FIG. 43 is a circuit diagram of handset 12.

FIG. 43 is a circuit diagram of the microphone amplifier 171, the summing amplifier 172, the 83 Hz filter 177 and the mute circuit 204 of the handset 12, such circuits being shown in block form in FIG. 6. The summing amplifier 172 comprises an op-amp 820 having an output coupled through a capacitor 821 to the modulation signal input line 173 or the transmitter section 148. The input of the op-amp 820 is connected through a capacitor 822 to the output of an OP amp 824 of the microphone amplifier circuit 171, the input of the amplifier 824 being connected through a resistor 825 and a capacitor 826 to a circuit point 827 which is connected to the microphone 17. Circuit point 827 is also coupled through resistors 829 and 830 to the line 174 which is controlled through the control and switching circuitry 152 as hereinafter described.

The input of the summing amplifier 820 is also connected through a capacitor 831 to the line 180 which is controlled by the processor 154 and, in addition, it is connected through a resistor 832 and a capacitor 833 to the line 178 at the input of an integrated circuit 834 in the 83 Hz filter circuit 177. As shown, the line 178 is connected through a capacitor 835 to a circuit point 836 which is connected through a capacitor 837 to an output terminal of the integrated circuit 834 which is connected through a resistor 838 to the line 178. Circuit point 836 is connected through a resistor 839 to ground and through a resistor 840 to the line 176 which is connected to the processor and which supplies an 83 Hz square wave signal to the 83 Hz filter circuit 177.

The mute circuit 204 comprises a resistor 843 connected in series with a diode 844 between the switch 206 and a circuit point 845 which is connected through a diode 846 and a resistor 847 to the line 207. Circuit point 845 is connected through a resistor 848 to the line 205 which is connected to the input of the OP amp 824 of the microphone amplifier 171. When the line 207 is brought high, or when the switch 206 is closed, the microphone amplifier is disabled.

The control and switching circuitry 152 includes a transistor 850 having a collector connected to the line 174 and having an emitter connected to the +5-volt battery line 192. The base of the transistor 850 is connected through a resistor 851 to the line 192 and through a resistor 852 to a line 853 which is connected to an output terminal of the processor 154. Line 853 is also connected through a diode 854 to a circuit point 855 which is connected through resistors 856 and 857 to the input and output of the OP amp 820 of the summing amplifier. When the line 853 is in a high state, the transistor 850 is non-conductive. When the line 853 is brought low by the processor 854, the transistor 850 is rendered conductive to supply an enabling voltage to the transmitter section 148 and also to supply a current through resistors 830 and 829 to the microphone 17.

The line 151, which supplies operating voltage to the receiver section 150, is connected through a capacitor 860 to ground and is connected to the collector of a transistor 861 having an emitter connected through the line 192 to the positive terminal of the battery 190. The base of the transistor 861 is connected through a resistor 862 to the line 192 and is connected through a resistor 863 to the line 159 which is connected to an output terminal of the processor 154. When the line 159 is brought low by the processor 154, the transistor 861 is rendered conductive to supply operating voltage to the receiver section 150. It is also noted that the voltage on line 151 controls application of an output signal from the 1633 Hz detector 156 to an input of the processor 154, connected to a line 865.

As shown in FIG. 43, an integrated circuit 866 has an input connected through the line 157 to the output of the 1633 Hz detector 156 and has an output connected to the line 865. The input and output of the circuit 866 are respectively connected through resistors 867 and 868 to the line 151, for application of appropriate bias and operating voltages to the circuit 866. The circuit 866 may preferably be part of an integrated circuit which also includes detector and IF amplifier circuitry of the receiver section 150, and is in the form of an operational amplifier. The same is true with respect to integrated circuit 834 of the 83 Hz filter circuit 177.

The control and switching circuitry 152 further includes a volume control of the switch device 870 having a terminal 871 connected through a resistor 872 and a capacitor 873 to the receiver output line 155 and having a terminal 874 connected through the line 165 to the input of the amplifier 166, a resistor 875 being connected between terminals 871 and 874 and being shorted out in the "HI" position of the switch device.

The circuitry 152 further includes a switch device 878 which is operated by the "OFF", "ON", "TALK" control 33. The device 878 includes a contact 879 which is connected through the line 192 to the plus terminal of the battery 190 and which is also connected to the emitter of a transistor 880. The collector of transistor 880 is connected through a resistor 881 to ground and is also connected through a line 882 to an output terminal of the processor 154. The terminal 879 is connected to a terminal 883 of the switch device 878 and they are arranged to be connected through a bridging contact, indicated in dotted lines to terminals 884 and 885 in the "TALK" and "ON" or "STANDBY" positions of the control 33. The terminals 884 and 885 and another terminal 886 are connected to the +5-volt switch line 193. In the "OFF" position, terminal 886 is connected to ground.

The base of transistor 880 is connected through a resistor 887 to the emitter thereof and is connected through resistor 888 and a resistor 889 to a terminal of a switch device 878 which is connected to a grounded terminal in the "TALK" position of the control 33. The transistor 880 is then rendered conductive to apply battery voltage to line 882.

The transistor 880 may also be rendered conductive by moving the level of rhe output line 892 of the processor 154 to a low level, line 892 being connected to the junction between resistors 888 and 889. A "PROGRAM SECURITY" switch 894 is connected between line 892 and the line 882. Switch 894 is operated by the code select pushbutton 52, FIG. 3, which may be depressed by using a ballpoint pen with the plate 51 removed.

It is noted that line 892 is connected through a diode 895 and through the line 195 to the charging terminal 84, transistor 880 being rendered non-conductive when terminals 43 and 44 are engaged with the charging terminals 45 and 46 of the control unit 11. With this arrangement, the handset may be left in the "TALK" position and then when it is placed in the cradled position on the control unit, the handset is effectively placed in its "ON" or "STANDBY" condition. The handset may thus be left in the "TALK" position and used as an ordinary telephone to go off or on hook when removing it from and replacing it on the control unit.

The line 882 is connected through a diode 896 to a circuit point 897 which is connected through a capacitor 898 to ground and through a resistor 899 to the line 165. When transistor 880 is rendered conductive, a positive bias voltage is applied to the input of the amplifier 166.

Figure 44:
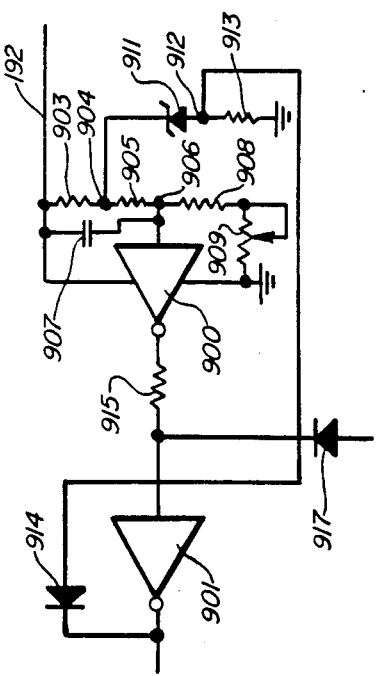
FIG. 44 is a circuit diagram of the low battery detector.

FIG. 44 is a circuit diagram of the battery low detector 144. Two CMOS operational amplifiers 900 and 901 are provided which operate as a switching circuit to be switched from a reset condition to a set condition in response to a battery low condition, the circuit being latched in the set condition until a charging voltage is applied by placing the handset 12 in a cradled position on the control unit 11, to connect the charge terminals or contacts 43 and 44 with the terminals or contacts 45 and 46 of the control unit.

The +5-volt battery line 192 is connected through a resistor 903 to a circuit point 904 which is connected through a resistor 905 to a circuit point 906 which is connected to the input of the amplifier 900. A capacitor 907 is connected between circuit point 906 and the line 192 and a fixed resistor 908 and a variable resistor 909 are connected in series between circuit point 906 and ground. Circuit point 904 is connected through a Zener diode 911 to a circuit point 912 which is connected through a resistor 913 to ground. Circuit point 912 is also connected through a diode 914 to the output of amplifier 901, the input of amplifier 901 being connected through a resistor 915 to the output of amplifier 900.

In operation, the output of the amplifier 901 is normally low, in a reset condition of the circuit, and the diode 914 is conductive, to place the potential of the circuit point 912 close to ground at potential and to develop a certain reference voltage at the circuit point 904, connected to the circuit point 912 through the Zener diode 911. The battery voltage is compared with the reference voltage at circuit point 904 and when the battery voltage drops below a certain level, the circuit is switched to a condition in which the output of amplifier 901 is at a high level. The diode 914 is no longer conductive and the reference voltage at circuit point 904 is raised to a higher level so that the circuit is latched in a condition in which the output is at a high level. When a charging voltage is applied, a reset signal is applied through a diode 917 to the input of amplifier 901.

The processor 154, in the illustrated embodiment, is a "PIC 16C58" microcomputer manufactured by General Instrument Corporation which is similar to that employed in the control unit but which is a CMOS device, having low power dissipation. It also has fewer registers and uses 12-bit instructions, rather than the 13-bit instructions used in the microcomputer of the illustrated embodiment of the control unit. The following condensed summary lists byte-oriented, bit-oriented and lateral and control operations. The designators are the same as in the foregoing condensed summary of operations for the microcomputer of the control unit.

| Instruction-Binary(Octal) | Name | Mnemonic | Operands |
|---|---|---|---|
| BYTE-ORIENTED INSTRUCTIONS | | | |
| 000 000 000 000 (0000) | No Operation | NOP | — |
| 000 000 fff fff (0040) | Move W to f (Note 1) | MOVWF | 1 |
| 000 001 000 000 (0100) | Clear W | CLRW | — |
| 000 001 1ff fff (0140) | Clear f | CLRF | f |
| 000 010 dff fff (0200) | Subtract W from f | SUBWF | f,d |
| 000 011 dff fff (0300) | Decrement f | DECF | f,d |
| 000 100 dff fff (0400) | Inclusive OR W and f | IORWF | f,d |
| 000 101 dff fff (0500) | AND W and f | ANDWF | f,d |
| 000 110 dff fff (0600) | Exclusive OR W and f | XORWF | f,d |
| 000 111 dff fff (0700) | Add W and f | ADDWF | f,d |
| 001 000 dff fff (1000) | Move f | MOVF | f,d |
| 001 001 dff fff (1100) | Complement f | COMF | f,d |
| 001 010 dff fff (1200) | Increment f | INCF | f,d |
| 001 011 dff fff (1300) | Decrement f, Skip if Zero | DECFSZ | f,d |
| 001 100 dff fff (1400) | Rotate Right f | RRF | f,d |
| 001 101 dff fff (1500) | Rotate Left f | RLF | f,d |
| 001 110 dff fff (1600) | Swap halves f | SWAPF | f,d |
| 001 111 dff fff (1700) | Increment f, Skip if Zero | INCFSZ | f,d |
| BIT-ORIENTED INSTRUCTIONS | | | |
| 010 0bb bff fff (2000) | Bit clear f | BCF | f,b |
| 010 1bb bff fff (2400) | Bit set f | BSF | f,b |
| 011 0bb bff fff (3000) | Bit test f, Skip if Clear | BTFSC | f,b |
| 011 1bb bff fff (3400) | Bit Test f, Skip if Set | BTFSS | f,b |
| LITERAL & CONTROL OPERATIONS | | | |
| 000 000 000 101 (0002) | Return | RETURN | — |
| 000 000 0ff fff (0000) | Tristate port f | TRIS | f |
| 100 0kk kkk kkk (4000) | Return and place Literal in W | RETLW | k |
| 100 1kk kkk kkk (4400) | Call subroutine | CALL | k |
| 101 kkk kkk kkk (5000) | Go To address (k is 9 bits) | GOTO | k |
| 110 0kk kkk kkk (6000) | Move Literal to W | MOVLW | k |
| 110 1kk kkk kkk (6400) | Inclusive OR Literal and W | IORLW | k |
| 111 0kk kkk kkk (7000) | AND Literal and W | ANDLW | k |
| 111 1kk kkk kkk (7400) | Exclusive OR Literal and W | XORLW | k |

The microcomputer includes an arithmetic logic unit which contains one temporary working register or accumulator designated as a "W" register. The microcomputer also includes a set of operational registers or files. A f0 register is provided like that of the microcomputer of the control unit, used in conjunction with a file select register, F4. A real-time clock counter register is provided, indicated as F1 and a program counter is provided, designated as F2. A status word register is provided, designated as F3. The "0" bit is a "C" or carry bit; the "1" bit is a "DC" or digit carry bit used in add and subtract instructions and the "2" bit is a "Z" or "0" bit which is set as an arithmetic operation for zero. Bits 3–7 are defined as logic ones. File register F5 is an input register A having operative bits A0–A3, A4–A7 being defined as zeroes. F6 is an input/output register B having 8 bits B0–B7, used for output in the illustrated embodiment.

F7 is an input/output register which is connected to the keyboard 182 in the illustrated embodiment. F10–F37 are general purpose registers.

The use of the various registers is summarized in the following list:

| File No. | | Function |
|---|---|---|
| 0 | | Call of File Select |
| Register (F4) | | |
| 1 | | Real Time Clock Counter |
| 2 | | Program Counter |
| 3 | | Flags |
| 4 | | File Select Register |
| 5 | | Port A (Input only) |
| | Bit  Pin | Function |
| | A0   6 | 163 Detector |
| | A1   7 | Both A1 and A2 Set=Prog. Sec. |
| | A2   8 | A1 Cl. and A2 Set=Talk |
| | A3   9 | Battery Low |

-continued

| 6 | Port B (I/O used for Output only) | | |
|---|---|---|---|
| | Bit | Pin | Function |
| | B0 | 10 | Mute (when set) |
| | B1 | 11 | 83 Hz Pilot Tone |
| | B2 | 12 | 98 Hz Data |
| | B3 | 13 | Tx (off when set) |
| | B4 | 14 | Rx (off when set) |
| | B5 | 15 | not used |
| | B6 | 16 | Ring output |
| | B7 | 17 | Beep Tone |
| 7 | Port C (I/O, used for KB input) | | |
| 10 | Raw keyboard input value | | |
| 11 | Key value to X mit | | |
| 12 | Key value to X mit (back-up) | | |
| 13 | New Key received during X mit | | |
| 14 | Key Que | | |
| 15 | " | | |
| 16 | " | | |
| 17 | " | | |
| 20 | " | | |
| 21 | " | | |
| 22 | Key Que and Sec. Code Temp. | | |
| 23 | Security Code Save | | |
| 24 | Security Code Save | | |
| 25 | Que Pointer | | |
| 26 | Temp. key store during X mit and X mit security key time out | | |
| 27 | Temp. Port "A" store during program security | | |
| 30 | Output Port "B" save | | |
| 31 | Beep counter | | |
| 32 | Loop extend | | |
| 33 | Loop counter | | |
| 34 | Time extend | | |
| 35 | Flags: | Bit | Flags |
| | | 0 | No key |
| | | 1 | X mit end |
| | | 2 | Prog. Sec. |
| | | 3 | Key |
| | | 4 | Battery low |
| | | 5 | Sec. X mit |
| | | 6 | Beep tone |
| | | 7 | Off key X mit |
| 36 | X mit count value | | |
| 37 | Timer file | | |

Figure 45:
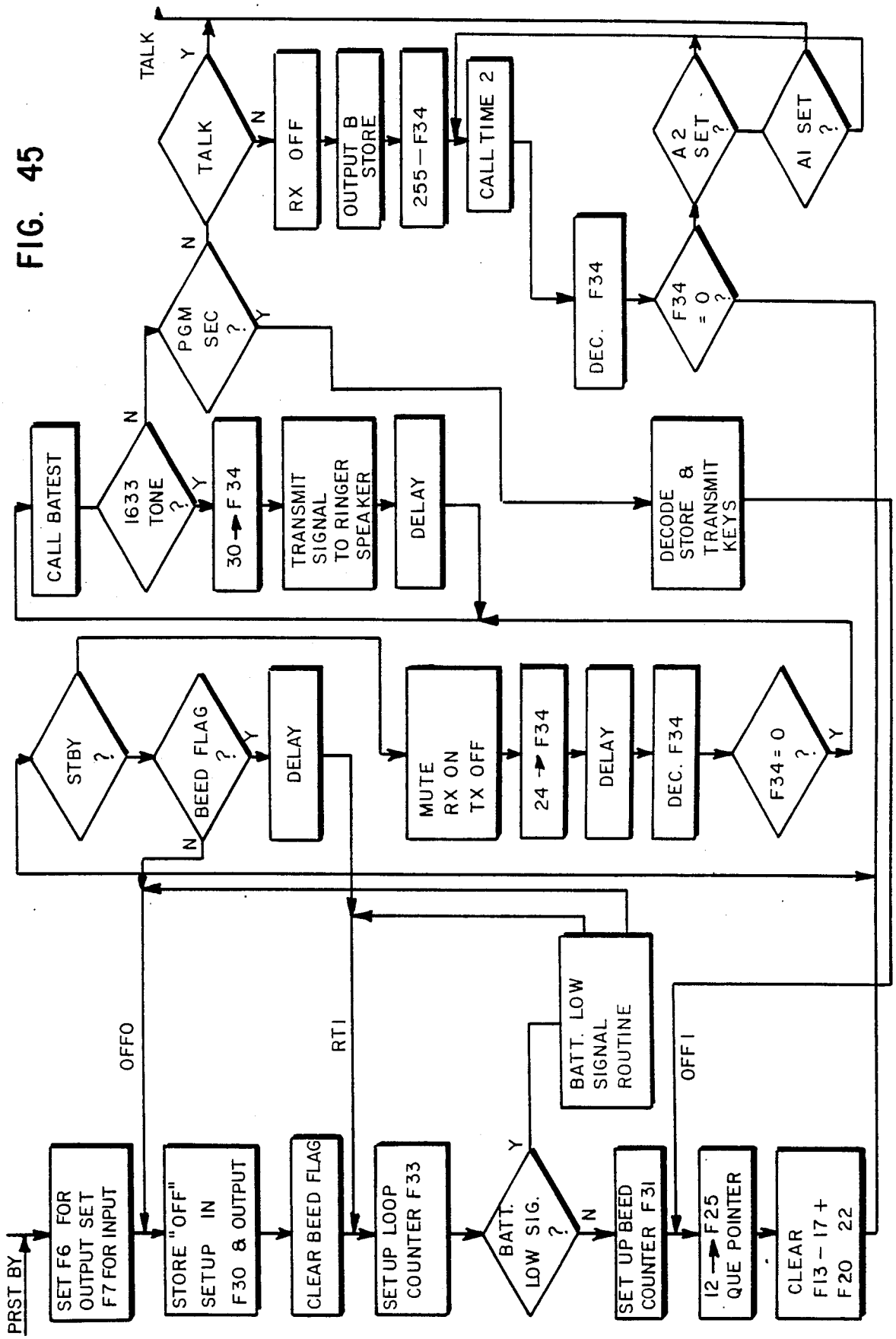

FIG. 45 is a flow chart illustrating the operation of the handset 12. When the control 33 is placed in the "ON" position, a +5-volt switch voltage is applied through line 193 to the power-up circuit 198 (FIG. 6) which through the line 200 applies a trigger signal to a masterclear input of the microcomputer 154, to go to an address stored at address 777 in the ROM of the microcomputer. In the illustrated embodiment, the stored address is 421 at which a pre-standby or "RSTBY" operation is initiated. The file F6, which is a tristate I/O port is set for output, this being the "B" port which is used for output of the 83 Hz pilot tone signal and the 98 Hz data signal, as well as for control of the transmitter and receiver and for other control and output functions. F7, which is the "C" port used for the keyboard, is set for input. The operation then goes to a "OFF" operation at address 425. An "OFF" code is then stored in F30 and is transferred to F6 to place the transmitter and receiver and other outputs in a "OFF" condition. Then a "BEEP" flag is cleared and a loop counter is then set up and then a test is made to determine whether a battery low signal have been developed at F5,3, i.e, A3 which is connected through line 196 to the output of the battery low detector 144. If a battery low signal is developed, an "OFF3" operation is initiated, going to address 733 to test flags and to initiate signaling operations, returning either to the "OFF" position or to address 431 designated as "RT1". This operation is such as to insure that current consumption is at a minimum, to maintain the security code in memory as long as possible.

If no battery low signal is developed, a "BEEP" counter F31 is set up going to an "OFF1" address 437. Then additional initialization or set up operations are performed and the operation goes to "STBY" and address 451. In the "STBY" operation, F5,1 or "A1" is tested to determine whether the system is in the "ON" or "STANDBY" condition.

If the system is in the standby mode, the mute of the microphone amplifier is activated by setting F6,0 or "B0" high, the receiver is turned on by setting F6,4 or "B4" low and the transmitter is turned off by setting F6,3 or "B3" high. Then after a delay, F33 is decremented. If it is decremented to 0, a battery testing sub-routine "BATEST" is called. If not, a test is made to determine whether a 1633 Hz signal has been received from the control unit 11. This test is made by testing F5,0 or "A0" which is connected to line 865 to the aforementioned circuitry which is connected to the output of the 1633 Hz detector 156.

If the 1633 Hz tone is detected, a signal is transmitted to the ringer speaker, using a "HIT" operation from address 474 to 504, a square wave signal of on the order of 770 Hz being developed at F6,6 or "B6" which is connected through line 166 to the input of the amplifier 162 for the ringer speaker 163. The duration of the ring signal is determined by a number initially stored in F34. Then a delay is obtained by four calls of a "TIME2" subroutine after which the test is again made for the input of the 1633 Hz tone.

If no 1633 Hz tone is detected, a test is made to determine whether the program security switch 894 has been closed, by testing the status of F5,1 and F5,2 or "A1" and "A2" connected to the terminals of the switch. If the test indicates that the program security switch 894 is closed, a "KEY" operation at address 533 is initiated. In this operation, a test is made to determine whether a key has been depressed and if so, whether it is a proper key for entry of a digit of the security code, and if so, the key is decoded and is transmitted to the control unit, using "DECKEY" and "XMTKEY" sub-routines. Proper security code keys are stored in F23 and F24.

If the program security switch 894 is not closed, the operation proceeds to a test to determine whether the control 33 is in the "TALK" position. If it is, the operation proceeds to "TALK" at address 622. If not, the receiver is turned off and a delay is obtained, using a count-down loop operation in which the "A2" and "A1" inputs are checked to determine whether the operation should proceed to "TALK". The receiver is turned off and the current consumption is very low during this delay which is on the order of ten times the duration of the time when the receiver is turned on in the standby loop. As a result, battery life is greatly extended. At the end of the delay time, the operation goes back to "STDBY" at address 451.

Figure 46:
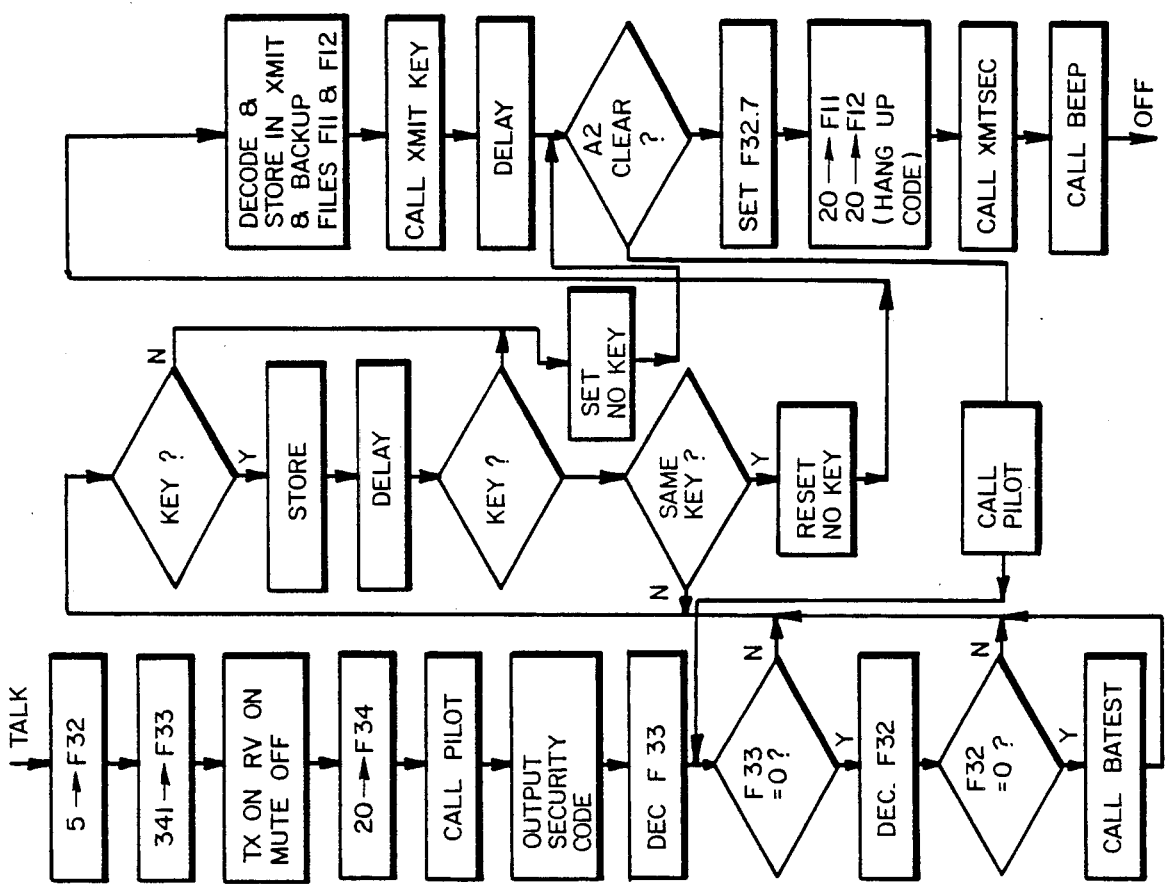
FIG. 45 and 46 are flow charts illustrating the operation of handset 12.

The "TALK" operation is shown in the flow chart of FIG. 46. After setting up F32 and F33 which are used in timing loops, the transmitter and receiver are both turned on and the mute is turned off. Then F33, used as another timer-counter is set up, and then a "PILOT"

sub-routine is called. The "PILOT" sub-routine at address 324 operates to set and clear F6,1 or "B1" for time periods which are such as to generate the 83 Hz pilot tone.

After generating the pilot tone, security code is output using the operation from address 636 to address 654, with three calls of the "XMTSEC" sub-routine. Then a check is made as to whether it is time to test the battery. If so, the "BATEST" sub-routine is called. If not, a keyboard test and key debounce procedure is followed. If no key has been depressed, and if a check of F5,2 or "A2" shows that the system is still in the "TALK" mode, the "PILOT" subroutine is again called, and after determining whether it is time to check the battery, the keyboard test and key debounce procedure is again initiated. Thus, until a key is depressed, or until the control 33 is switched out of the "TALK" position, the system continuously loops through the keyboard test procedure, periodically checking the battery with the pilot tone being generated during intervals between the status condition checks.

Once a key is depressed and debounced, a "NOKEY" flag is reset and then the key is decoded and stored in transmit and back-up files F11 and F12, after which a "XMITKEY" sub-routine is called and a delay thereafter being generated. If the control 33 should be placed in the standby or "ON" position, the F5,2 or "A2" bit is cleared and then a hang-up procedure is followed. This procedure involves the storage of a hang-up code (20) and the calling of "XMTSEC" and "BEEP" sub-routines. The operation then goes to "OFF" at address 425.

The "XMTKEY" sub-routine starts at address 003. This operation functions to generate 16 pulses at a 98 Hz rate, each pulse having a duration corresponding to a number stored in F11 and also in a back-up file F12. The number of pulses transmitted is determined by storing the octal base number 020 in F36. The time interval from the start of each pulse to the start of the next pulse, i.e. the 98 Hz rate, is determined, in part, by storing the octal base number 024 in F22 which operates as a pilot counter in this operation. Each count corresponds to a time interval of 260 microseconds and after an initial delay of 1.5 milliseconds, F22 is decremented to 0, followed by a delay of 1.45 milliseconds and by other delays such as to obtain a total delay of about 10.2 milliseconds for a 98 Hz rate.

After an initial 1.5 millisecond delay, the pilot count counter F22 is decremented and at the same time, F11, which contains the data to be transmitted, is also decremented, a "LOP1" loop operation being performed until the data-containing file F11 is decremented to 0. Then the data output F5,2 or "B2" is set low to define the end of a pulse, "B2" having been set high prior to the 1.5 millisecond delay. After F11 is decremented to 0, it is restored from the backup file F12 and then decrementing of F22 continues until it is decremented to 0, going to a "GOG" operation for this purpose. After F22 is decremented to 0, operations are performed to test the keyboard and to decode and store keys in the key que files. Also, a test is made to determine whether a 1633 Hz handshake signal has been received, using a "SLO" operation beginning at address 170 which test F5,0 or "AO" which is coupled to the output of the 1633 Hz detector 156. When a key has been received, an audio signal is generated using a "BEEP" sub-routine.

The "XMTKEY" operation is also used during the "XMTSEC" operation after setting timers and the security transmit flag F35,5. During transmission of the security code, the system looks for the transmission of the 1633 Hz handshake signal and operates to transmit the null signals, described in connection with the description of the operation of the microcomputer 536 of the control unit 11.

The "BATEST" sub-routine at address 227 operates when a battery low signal is generated to beep every fifteen seconds for a period of about fifteen minutes and to then beep eight times in rapid sequence and to then place the system in a minimum current drain condition.

The following tables I and II are the aforementioned program listings for the microcomputers 536 and 154, respectively used in the control unit 11 and handset 12 in the manner as described. It will be understood that with other types of microprocessors or microcomputers, other equivalent programs may be used and it will be also understood that the functions and operations performed may be performed in whole or in part through the use of electronic circuitry other than a microcomputer or microprocessor. The system as disclosed in detail, however, has important advantages when a microcomputer or the equivalent is used in achieving highly accurate and reliable response to transmitted and received signals and in using the minimum amount of code in memory. Tables I and II are as follows:

TABLE I

```
1.                    TITLE    '4000X4'
2.            ;
3.            ;
4.            ;
5.            ;;
6.            ;
7.            ;:
8.            ;
9.
10.  0000               ORG     0
11.           ;
12.           ;
13.                    TITLE    'INPHI/LO'
14.           ;
15.           ;
16.           ;THIS ROUTINE SAMPLES INPUT DATA PORT
17.           ;SYSTEMATICALLY TO DETERMINE ITS STATUS
18.           ;
19.  0000 6731  INPLO   BTFSC    31,7
```

```
20.  0001 14106            GOTO    ESCAPE
21.  0002  6111            BTFSC   11,1
22.  0003 14010            GOTO    F1
23.  0004  3145            RRCF    45,F
24.  0005  7003            BTFSS   3,0
25.  0006 14000            GOTO    INPLO
26.  0007 13400            RETLW   0
27.  0010  6003   F1       BTFSC   3,0
28.  0011 14000            GOTO    INPLO
29.  0012  3145            RLCF    45,F
30.  0013 14000            GOTO    INPLO
31.  0014  6731   INPHI    BTFSC   31,7
32.  0015 14106            GOTO    ESCAPE
33.  0016  7111            BTFSS   11,1
34.  0017 14024            GOTO    F3
35.  0020  3345            RRCF    45,F
36.  0021  7003            BTFSS   3,0
37.  0022 14014            GOTO    INPHI
38.  0023 13400            RETLW   0
39.  0024  6003   F3       BTFSC   3,0
40.  0025 14014            GOTO    INPHI
41.  0026  3345            RLCF    45,F
42.  0027 14014            GOTO    INPHI
43.                        ;
44.                        ;
45.                        ;
46.                        ;
47.  0030  0120   TIMER1   MOVWF   20
48.  0031  2720   T1       DECFSZ  20
49.  0032 14031            GOTO    T1
50.  0033 13400            RETLW   0
51.                        ;
52.                        TITLE   'KEYSUB'
53.                        ;
54.                        ;
55.                        ;
56.                        ;THIS SECTION PROVIDES ALL SUBROUTINES
57.                        ;CALLED BY KEYTST:CLRI,IEQ0,MOVM,SETUP.
58.                        ;IT IS SAME AS GIVEN IN ORIGONAL LISTING.
59.                        ;
60.                        ;
61.                        ;SETUP MUST BE RUN PRIOR TO INPHI OR INPLO
62.                        ;
63.                        ;
64.                        ;
65.  0034 10140   CLRI     CLRF    40
66.  0035 10141            CLRF    41
67.  0036 10142            CLRF    42
68.  0037 13400            RETLW   0
69.  0040 16044   IEQ0     CALL    MOVM
70.  0041 11340            MOVLW   340
71.  0042  1200             ANDWF   0,W
72.  0043 13400            RETLW   0
73.  0044 11017   MOVM     MOVLW   017
74.  0045  1247             ANDWF   47,W
75.  0046 11440            ADDLW   40
76.  0047  0104            MOVWF   4
77.  0050 13400            RETLW   0
78.  0051  4003   SETUP    BCF     3,0
79.  0052 11074            MOVLW   074
80.  0053  0145            MOVWF   45
81.  0054 13400            RETLW   0
82.  0055  7217   ONHOOK   BTFSS   17,2        ;LOCAL ANS SW?
83.  0056  0003            RETFS
84.  0057  5410            BSF     10,4
85.  0060 11377            MOVLW   377
86.  0061 16030            CALL    TIMER1
87.  0062  5510            BSF     10,5
88.  0063 13400            RETLW   0
89.  0064  4510   OFHOOK   BCF     10,5
90.  0065 11377            MOVLW   377
91.  0066 16030            CALL    TIMER1
92.  0067  4410            BCF     10,4
93.  0070 13400            RETLW   0
94.  0071  4003   SHIFT    BCF     3,0
```

```
 95.  0072 11004         MOVLW   4
 96.  0073 0130          MOVWF   30
 97.  0074 3156   SH1    RRCF    56
 98.  0075 3157          RRCF    57
 99.  0076 2730          DECFSZ  30
100.  0077 14074         GOTO    SH1
101.  0100 13400         RETLW   0
102.              ;
103.              ;
104.              ;
105.  0101 16207  BEEP   CALL    TONEON
106.  0102 11027         MOVLW   27              ;SET TIMER
107.  0103 16406         CALL    TIMER2
108.  0104 16212         CALL    TONEOF
109.  0105 0003          RETFS
110.              ;
111.              ;
112.              ;
113.  0106 4731   ESCAPE BCF     31,7            ;CLR ESCAPE BIT
114.  0107 10023         MOVFW   23              ;PICKUP VECTOR
115.  0110 0102          MOVWF   2
116.              ;
117.  0111 2761   ICOM   DECFSZ  61              ;DONE?
118.  0112 14344         GOTO    ICOMF1
119.  0113 4350          BCF     50,3            ;CLEAR ICOM FLAG
120.  0114 6316          BTFSC   16,3            ;BASERING BIT SET?
121.  0115 14251         GOTO    STDBY1
122.  0116 15404         GOTO    HOOK            ;YES
123.              ;
124.              ;
125.              ;
126.              ;
127.  0117 11005  ERROR  MOVLW   5
128.  0120 0121          MOVWF   21              ;SETUP CNTR
129.  0121 16101  ERROR1 CALL    BEEP
130.  0122 11050         MOVLW   50
131.  0123 16406         CALL    TIMER2
132.  0124 2721          DECFSZ  21
133.  0125 14121         GOTO    ERROR1
134.  0126 0003          RETFS
135.              ;
136.              ;
137.  0127 6631   LOS    BTFSC   31,6            ;VERIFY SEC FLAG?
138.  0130 14227         GOTO    STDBY           ;YES
139.  0131 7431          BTFSS   31,4            ;TALK MODE?
140.  0132 14267         GOTO    MAIN            ;NO
141.  0133 6747          BTFSC   47,7            ;REDUN FLAG SET?
142.  0134 15306         GOTO    HELP
143.  0135 4003          BCF     3,0             ;CLEAR CARRY
144.  0136 7011          BTFSS   11,0            ;SIG PRES?LO=TRUE
145.  0137 14145         GOTO    LOS1            ;YES
146.  0140 5744          BSF     44,7            ;NO,SET LOS BIT
147.  0141 3127          RRCF    27              ;ROLL ACCUM REG
148.  0142 7003          BTFSS   3,0             ;TEST CARRY
149.  0143 14267         GOTO    MAIN            ;NO;SIG NOT LOST
150.  0144 14227         GOTO    STDBY           ;YES;SIG IS LOST
151.  0145 3327   LOS1   RLCF    27
152.  0146 7003          BTFSS   3,0             ;TEST CARRY
153.  0147 14267         GOTO    MAIN            ;NO
154.  0150 3127          RRCF    27              ;YES,RESTRT ACCUM
155.  0151 4744          BCF     44,7            ;CLR LOS BIT,GOOD SIG
156.  0152 4105          BCF     5,1             ;INHIB TIMER INTRUPT
157.  0153 14267         GOTO    MAIN
158.              ;
159.              ;
160.              ;
161.  0154 6316   ICOMA  BTFSC   16,3            ;BAS RNG SET?
162.  0155 14337         GOTO    ICOMFH          ;NO
163.  0156 15417         GOTO    ICOMON          ;H/S CALLED
164.              ;
165.              ;
166.              ;
167.              ;
168.              ;
169.              ;
170.  0157 4105   TOUT   BCF     5,1             ;DISABLE INTERUPT
```

```
171.  0160  6744          BTFSC   44,7            ;TEST LOS BIT
172.  0161  5105          BSF     5,1             ;YES
173.  0162  11015         MOVLW   15
174.  0163  10532         CPFSEQ  32              ;REDIAL2 MODE?
175.  0164  14174         GOTO    TO1             ;NO
176.  0165  11220         MOVLW   220             ;90 BCD DECIMAL
177.  0166  0155          MOVWF   55              ;TO EROM ADD.
178.  0167  4044          BCF     44,0            ;CLR NIBBLE CNTR
179.  0170  4144          BCF     44,1
180.  0171  11011         MOVLW   11
181.  0172  0132          MOVWF   32
182.  0173  14772         GOTO    START
183.  0174  11017   TO1   MOVLW   17              ;REDIL* MODE?
184.  0175  10532         CPFSEQ  32
185.  0176  14201         GOTO    TO2             ;NO
186.  0177  0732          DECF    32              ;YES
187.  0200  15516         GOTO    GETADD
188.  0201  11005   TO2   MOVLW   5               ;STOR MODE
189.  0202  10532         CPFSEQ  32
190.  0203  14414         GOTO    TO3             ;NO,MUST BE LOSOP
191.  0204  16117   GT8   CALL    ERROR
192.  0205  16064         CALL    OFHOOK
193.  0206  14251         GOTO    STDBY1
194.          ;
195.  0207  5710    TONEON BSF    10,7            ;SINGLE TONE
196.  0210  11371         MOVLW   371
197.  0211  14214         GOTO    HEL1            ;OUTPUT TONE
198.          ;
199.          ;
200.  0212  4710    TONEOF BCF    10,7
201.  0213  11336         MOVLW   336
202.  0214  0112    HEL1  MOVWF   12
203.  0215  0003          RETFS
204.          ;
205.          ;
206.  0216  0123    CLRINT MOVWF  23              ;STORE VECT
207.  0217  11143         MOVLW   143
208.  0220  0105          MOVWF   5
*** INFORMATIVE-REGISTER HAS STUCK BITS
209.  0221  5731          BSF     31,7            ;SET ESC BIT
210.  0222  0002          RETFI
211.          ;
212.          ;
                          TITLE   'STDBY'
213.
214.          ;
215.          ;
216.  0223  11377   STDBY2 MOVLW  377
217.  0224  16406         CALL    TIMER2          ;DELAY 100 MILLISEC.
218.  0225  11300         MOVLW   300             ;INITIALIZE ICOM COUNT AND
219.  0226  0150          MOVWF   50              ; INTERCOM FLAG AND COUNT REGISTER
220.  0227  5714    STDBY BSF     14,7            ;TX OFF
221.  0230  16055         CALL    ONHOOK
222.  0231  11231         MOVLW   231             ;GET SEC CODE FR EROM
223.  0232  0155          MOVWF   55
224.  0233  17633         CALL    READ
225.  0234  16212         CALL    TONEOF          ;SET MUX TO READ AND DISABLE GEN
226.  0235  11003         MOVLW   3               ;SET FLAGS AND VERIFICATION
227.  0236  0131          MOVWF   31              ;COUNTER
228.  0237  11376         MOVLW   376
229.  0240  0116          MOVWF   16              ;LIN & HOLD
230.  0241  11020         MOVLW   20              ;LOS ROLL REG
231.  0242  0127          MOVWF   27
232.  0243  10133         CLRF    33              ;STORE FIX?
233.  0244  10144         CLRF    44              ;FLAGS
234.  0245  10151         CLRF    51              ;MAIN JMP VECT
235.  0246  10147         CLRF    47              ;KILL REDUN FLAG
236.  0247  11141         MOVLW   141             ;SERVICE INTERUPT
237.  0250  0105          MOVWF   5               ;FLAGS
*** INFORMATIVE-REGISTER HAS STUCK BITS
238.          ;
239.          ;
240.          ;
241.  0251  11077   STDBY1 MOVLW  77
242.  0252  0122          MOVWF   22
```

```
243.  0253  0160            MOVWF  60
244.  0254  11024           MOVLW  24
245.  0255  0134            MOVWF  34                   ;REDIL EROM ADDRS
246.  0256  11220           MOVLW  220                  ;LOAD EROM ADDR
247.  0257  0155            MOVWF  55                   ;ICOM OUTPUT BIT
248.  0260  5514            BSF    14,5                 ;ICOM LED OFF
249.  0261  5616            BSF    16,6                 ;BASE RING
250.  0262  5316            BSF    16,3
251.  0263  11300           MOVLW  300
252.  0264  1344            ANDWF  44,F
253.  0265  10132           CLRF   32
254.  0266  4231            BCF    31,2
255.                 ;
256.                 ;
257.                 ;
258.  0267  6431    MAIN    BTFSC  31,4                 ;TEST TALK FLAG
259.  0270  15154           GOTO   KEYRED
260.  0271  6731            BTFSC  31,7                 ;ESCAPE BIT?
261.  0272  14106           GOTO   ESCAPE
262.  0273  6631            BTFSC  31,6                 ;VER.SEC FLG?
263.  0274  15154           GOTO   KEYRED
264.  0275  6011            BTFSC  11,0                 ;SIG PRES?
265.  0276  14301           GOTO   MAIN1                ;NO
266.  0277  5631            BSF    31,6                 ;YES,SET VFYSEC FLAG
267.  0300  15154           GOTO   KEYRED
268.  0301  10051   MAIN1   MOVFW  51                   ;GET VECTOR
269.  0302  1702            ADDWF  2,F                  ;JUMP
270.  0303  14306           GOTO   MJMP0
271.  0304  14313           GOTO   MJMP1
272.  0305  14331           GOTO   MJMP2
273.                 ;
274.                 ;
275.                 ;
276.  0306  6217    MJMP0   BTFSC  17,2                 ;LOC ANS?
277.  0307  14267           GOTO   MAIN                 ;NO
278.  0310  2551            INCF   51                   ;YES,INC VECTOR
279.  0311  16064           CALL   OFHOOK
280.  0312  14267           GOTO   MAIN
281.                 ;
282.                 ;
283.  0313  6217    MJMP1   BTFSC  17,2                 ;LOC ANS?
284.  0314  14326           GOTO   MJMPA
285.  0315  4212            BCF    12,2                 ;SET MUX READ
286.  0316  4112            BCF    12,1                 ;ANY KEY DWN?
287.  0317  6311            BTFSC  11,3                 ;HOLD OR LINADV?
288.  0320  14267           GOTO   MAIN                 ;NO
289.  0321  2551            INCF   51                   ;YES
290.  0322  5212            BSF    12,2                 ;ELIMINATE LINADV
291.  0323  7311            BTFSS  11,3                 ;HOLD KEY?
292.  0324  15477           GOTO   HOLD                 ;YES
293.  0325  15504           GOTO   LINADV               ;MUST BE LINADV
294.  0326  10151   MJMPA   CLRF   51                   ;0 VECTOR
295.  0327  16055           CALL   ONHOOK
296.  0330  14267           GOTO   MAIN
297.                 ;
298.                 ;
299.  0331  4212    MJMP2   BCF    12,2                 ;SET MUX READ
300.  0332  4112            BCF    12,1                 ;ANY KEY DWN
301.  0333  7311            BTFSS  11,3                 ;ANY KEY DWN?
302.  0334  14267           GOTO   MAIN                 ;YES
303.  0335  0751            DECF   51                   ;NO,EXIT DEBOUNCE
304.  0336  14267           GOTO   MAIN
305.                 ;
306.                 ;
307.                 ;
308.  0337  11010   ICOMFH  MOVLW  10                   ;FLASH CNTR
309.  0340  0161            MOVWF  61                   ;STOR
310.  0341  5350            BSF    50,3                 ;SET ICOM FLG
311.  0342  11143           MOVLW  143                  ;ENABL BOTH INTUPS
312.  0343  0105            MOVWF  5
*** INFORMATIVE-REGISTER HAS STUCK BITS
313.  0344  11100   ICOMF1  MOVLW  100
314.  0345  1516            XORWF  16,F                 ;TOGGLE ICOM LED
315.  0346  7316            BTFSS  16,3                 ;BASRNG SET?
316.  0347  15603           GOTO   BASRNG               ;YES
317.  0350  16212           CALL   TONEOF               ;NO
```

```
318.  0351  7616           BTFSS   16,6            ;ICOM LED
319.  0352  16207          CALL    TONEON          ;YES,RNG H/S
320.  0353  14267          GOTO    MAIN            ;NO
321.                ;
322.                ;
323.                ;
324.                ; JUMP TABLE:KEY TO DTMF
325.                ;
326.                ;
327.  0354  0777   DTMF    DECF    77              ;ADJUST KEY FOR TABLE
328.  0355  10077          MOVFW   77              ;PICKUP KEY
329.  0356  1702           ADDWF   2,F
330.  0357  13575          RETLW   175
331.  0360  13675          RETLW   275
332.  0361  13735          RETLW   335
333.  0362  13573          RETLW   173
334.  0363  13673          RETLW   273
335.  0364  13733          RETLW   333
336.  0365  13567          RETLW   167
337.  0366  13667          RETLW   267
338.  0367  13727          RETLW   327
339.  0370  13657          RETLW   257
340.  0371  13557          RETLW   157
341.  0372  13717          RETLW   317
342.                ;
343.  0373  0134   TIMER3  MOVWF   34
344.  0374  11143          MOVLW   143             ;START TIMER
345.  0375  0105           MOVWF   5
*** INFORMATIVE-REGISTER HAS STUCK BITS
346.  0376  14267          GOTO    MAIN
347.                ;
348.                ;
349.  0377  0134   TIMER4  MOVWF   34
350.  0400  11014          MOVLW   14
351.  0401  0143           MOVWF   43
352.  0402  11143          MOVLW   143
353.  0403  0105           MOVWF   5
*** INFORMATIVE-REGISTER HAS STUCK BITS
354.  0404  16435          CALL    SVCRDI          ;SERVICE REDIAL
355.  0405  14267          GOTO    MAIN
356.                ;
357.                ;
358.                ; LONG TIMER
359.                ;
360.  0406  0124   TIMER2  MOVWF   24
361.  0407  11337  T2      MOVLW   337             ;FOR 1.5MS CYCLES
362.  0410  16030          CALL    TIMER1
363.  0411  2724           DECFSZ  24
364.  0412  14407          GOTO    T2
365.  0413  0003           RETFS
366.                ;
367.  0414  7231   TO3     BTFSS   31,2            ;DIAL FLG SET?
368.  0415  14127          GOTO    LOS             ;MUSTBE LOS TIMR
369.  0416  10043          MOVFW   43              ;WAS DILXIT
370.  0417  1702           ADDWF   2,F
371.  0420  14607          GOTO    DIL5            ;SECOND HALF DTMF
372.  0421  11337          MOVLW   337
373.  0422  14567          GOTO    DIL3            ;20PPS
374.  0423  11270          MOVLW   270
375.  0424  14567          GOTO    DIL3            ;10 PPS
376.  0425  0000           NOP                     ;NECESSARY NOP
377.  0426  14553          GOTO    DIL2            ;20 PPS NOT DONE
378.  0427  14553          GOTO    DIL2            ;10 PPS NOT DONE
379.  0430  11002          MOVLW   2
380.  0431  14377          GOTO    TIMER4          ;20 PPS DONE
381.  0432  11005          MOVLW   5
382.  0433  14377          GOTO    TIMER4          ;10 PPS DONE
383.  0434  15546          GOTO    DISET
384.                ;
385.  0435  10732  SVCRDI  TESTF   32              ;FLKJMP=0?
386.  0436  7203           BTFSS   3,2
387.  0437  0003           RETFS                   ;NO
388.  0440  11231          MOVLW   231             ;YES
389.  0441  10455          CPFSLT  55              ;REDIL MEM FULL?
390.  0442  0003           RETFS
391.  0443  17633          CALL    READ            ;NO,GET CURRENT
```

```
392.  0444  11003              MOVLW  3              ;MASK
393.  0445  1244               ANDWF  44,W           ;PICKUP 2 BITS
394.  0446  1702               ADDWF  2,F            ;JUMP TABLE
395.  0447  14471              GOTO   NIBL1
396.  0450  14474              GOTO   NIBL2
397.  0451  11230              MOVLW  230            ;EROM ADD=98BCD
398.  0452  10555              CPFSEQ 55
399.  0453  14440              GOTO   SVCR1          ;NO,NOT FULL
400.  0454  10156              CLRF   56             ;YES,LOAD NULLS
401.  0455  17707              CALL   WRITE
402.  0456  16504              CALL   ADDBCD         ;INC ADDR
403.  0457  0003               RETFS
404.  0460  10037   SVCR1      MOVFW  37             ;NIBL3,GET KEY
405.  0461  0156               MOVWF  56             ;DROP KEY
406.  0462  17707              CALL   WRITE
407.  0463  10157              CLRF   57
408.  0464  11374              MOVLW  374
409.  0465  1344               ANDWF  44,F           ;CLR NIBL CNTR
410.  0466  16504              CALL   ADDBCD
411.  0467  17707              CALL   WRITE          ;NULL TO EROM
412.  0470  0003               RETFS
413.  0471  10037   NIBL1      MOVFW  37             ;GET KEY
414.  0472  0157               MOVWF  57             ;DROP KEY
415.  0473  14477              GOTO   NIBLX
416.  0474  3437    NIBL2      SWAPF  37,W
417.  0475  1157               IORWF  57             ;DROP NIBL
418.  0476  10156              CLRF   56             ;LOAD NULLS
419.  0477  17707   NIBLX      CALL   WRITE
420.  0500  2544               INCF   44
421.  0501  0003               RETFS
422.                   ;
424.  0502  11007   ADBCD1     MOVLW  7              ;PREP ADD 8
425.  0503  1755               ADDWF  55
426.  0504  2455    ADDBCD     INCF   55,W           ;INCR BCD
427.  0505  0004               DAW
428.  0506  0155               MOVWF  55
429.  0507  0003               RETFS
430.                   ;
431.                   ;
432.                   ;
433.                   ;
434.            ;MAIN TALK MODE JUMP TABLE
435.                   ;
436.                   ;
437.  0510  10032   TLKJMP     MOVFW  32
438.  0511  1702               ADDWF  2,F
439.  0512  15430              GOTO   TALK           ;0
440.  0513  14223              GOTO   STDBY2         ;1
441.  0514  15536              GOTO   AUTOD2         ;2
442.  0515  15404              GOTO   HOOK           ;3
443.  0516  15507              GOTO   STOR1          ;4
444.  0517  15514              GOTO   STOR2          ;5
445.  0520  14621              GOTO   STOR3          ;6
446.  0521  14660              GOTO   STOR4          ;7
447.  0522  14251              GOTO   STDBY1         ;10
448.  0523  14750              GOTO   CONT           ;11
449.  0524  14251              GOTO   STDBY1         ;12
450.  0525  14736              GOTO   RAMDIL         ;13
451.  0526  14750              GOTO   CONT           ;14
452.  0527  14757              GOTO   AUTDI3         ;15
453.  0530  14770              GOTO   SPREMB         ;16
454.  0531  15110              GOTO   AUTDI4         ;17
455.  0532  15124              GOTO   SPRMAN         ;20
456.  0533  15133              GOTO   CTNMAN         ;21
457.  0534  15143              GOTO   STRSTK         ;22
458.  0535  14750              GOTO   CONT           ;23
459.  0536  15145              GOTO   INTCOM         ;24
460.                   ;
461.                   ;
462.  0537  11076   MANDIL     MOVLW  076
463.  0540  0112               MOVWF  12             ;SET MUX FOR DIAL DETECT
464.  0541  6311               BTFSC  11,3           ;DTMF ?
465.  0542  14577              GOTO   DIL1           ;YES, DIAL DTMF
466.  0543  4610               BCF    10,6           ;MUTE TX AUDIO DURING PULSE !
467.  0544  5550               BSF    50,5
```

```
468.  0545  5712           BSF     12,7
469.  0546  7311           BTFSS   11,3
470.  0547  4550           BCF     50,5
471.  0550  11013          MOVLW   013
472.  0551  10477          CPFSLT  77              ;KEY LT *?
473.  0552  14617          GOTO    DIL7            ;NO, CALL ERROR
474.  0553  5410   DIL2    BSF     10,4            ;HOOKSW OPEN
475.  0554  11001          MOVLW   1
476.  0555  0143           MOVWF   43              ;SET JUMP = 1
477.  0556  11304          MOVLW   304             ;VALUE FOR OPEN AT 20PPS
478.  0557  6550           BTFSC   50,5            ;IS IT 20PPS
479.  0560  14564          GOTO    D1              ;YES
480.  0561  2543           INCF    43              ;NO
481.  0562  2543           INCF    43              ;ADD 2 TO JUMP
482.  0563  11224  D5      MOVLW   224             ;VALUE FOR OPEN AT 10PPS
483.  0564  0107   D1      MOVWF   7               ;STORAGE
484.  0565  11001          MOVLW   1
485.  0566  14373          GOTO    TIMER3          ;OPEN TIME
486.  0567  0107   DIL3    MOVWF   7               ;STORAGE
487.  0570  4410           BCF     10,4            ;CLOSE HOOKSWITCH
488.  0571  11007          MOVLW   7               ;VALUE FOR JUMP IF KEY DONE
489.  0572  2777           DECFSZ  77              ;PULSE DONE
490.  0573  11004          MOVLW   4               ;VALUE FOR JUMP IF NOT DONE
491.  0574  1743           ADDWF   43              ;MODIFY JUMP
492.  0575  11001          MOVLW   1
493.  0576  14373          GOTO    TIMER3          ;CLOSED TIME
494.  0577  16354  DIL1    CALL    DTMF
495.  0600  0112           MOVWF   12              ;OUTPUT TONES
496.  0601  11000          MOVLW   0
497.  0602  0143           MOVWF   43
498.  0603  11200          MOVLW   200
499.  0604  0107           MOVWF   7
500.  0605  11001          MOVLW   1
501.  0606  14373          GOTO    TIMER3
502.  0607  11336  DIL5    MOVLW   336             ;TONES OFF, SET MUX
503.  0610  0112           MOVWF   12
504.  0611  11014          MOVLW   14
505.  0612  0143           MOVWF   43
506.  0613  11235          MOVLW   235
507.  0614  0107           MOVWF   7
508.  0615  11001          MOVLW   1               ;INTER-DIGITAL TM
509.  0616  14377          GOTO    TIMER4
510.  0617  16117  DIL7    CALL    ERROR
511.  0620  15546          GOTO    DISET
512.                       ;
513.                       ;
514.                       ;
515.                       ;
516.                       ;
517.                       ;
518.  0621  2532   STOR3   INCF    32
519.  0622  10177          CLRF    77
520.  0623  14267          GOTO    MAIN
521.                       ;
522.                       ;
523.  0624  11020  GT99    MOVLW   20              ;LIMIT OF SPRINT ADDR
524.  0625  10455          CPFSLT  55
525.  0626  14645          GOTO    GT98
526.  0627  11061          MOVLW   61
527.  0630  10622  GT97    CPFSGT  22
528.  0631  14654          GOTO    CALLER          ;YES
529.  0632  11015          MOVLW   15              ;MASK
530.  0633  10440          CPFSLT  40              ;VALID KEY FOR STORE ?
531.  0634  14654          GOTO    CALLER          ;NO
532.  0635  10022          MOVFW   22              ;PICKUP Q POINTER
533.  0636  0104           MOVWF   4               ;PUT IT IN FSR
534.  0637  16731          CALL    LOAD            ;COMPRESS 2 KEYS TO ONE BYTE
535.  0640  6033           BTFSC   33,0            ;TEST SWAP BIT
536.  0641  16647          CALL    GT100           ;DECREMENT Q PTR ON ALT. KEYS
537.  0642  11001          MOVLW   1
538.  0643  1533           XORWF   33,F            ;TOGGLE SWAP BIT
539.  0644  14267          GOTO    MAIN
540.  0645  11064  GT98    MOVLW   64              ;LIMIT FOR KEYS STORD
541.  0646  14630          GOTO    GT97            ;IN AUTODIL,1-9,A
542.  0647  0722   GT100   DECF    22              ;Q POINTER
543.  0650  10022          MOVFW   22
544.  0651  0104           MOVWF   4               ;LOAD Q POINTER
```

| | | | | | |
|---|---|---|---|---|---|
| 545. | 0652 | 10100 | | CLRF | 0 | ;PRELOAD NULLS |
| 546. | 0653 | 0003 | | RETFS | | |
| 547. | 0654 | 16117 | CALLER | CALL | ERROR | |
| 548. | 0655 | 10140 | | CLRF | 40 | ;LOADS NULL VALUE |
| 549. | 0656 | 16731 | | CALL | LOAD | ;WHEN OPERATOR TERMINATES |
| 550. | 0657 | 14267 | | GOTO | MAIN | ;LOADING PROCESS. |
| 551. | | | ; | | | |
| 552. | | | ; | | | |
| 553. | | | ; | | | |
| 554. | 0660 | 11023 | STOR4 | MOVLW | 23 | ;STOR KEY? |
| 555. | 0661 | 10540 | | CPFSEQ | 40 | |
| 556. | 0662 | 14624 | | GOTO | GT99 | ;NO |
| 557. | 0663 | 10140 | | CLRF | 40 | ;LOADS NULL VALUE |
| 558. | 0664 | 16731 | | CALL | LOAD | ;AS LAST KEY TO TERMINATE |
| 559. | 0665 | 11077 | | MOVLW | 77 | ;SET UP Q PTR. |
| 560. | 0666 | 0104 | | MOVWF | 4 | ;TO FSR |
| 561. | 0667 | 10133 | | CLRF | 33 | |
| 562. | 0670 | 0160 | | MOVWF | 60 | |
| 563. | 0671 | 6133 | TER1 | BTFSC | 33,1 | ;TEST ODD/EVEN BYTE |
| 564. | 0672 | 14715 | | GOTO | EVEN | ;EVEN |
| 565. | 0673 | 10000 | | MOVFW | 0 | ;PICKUP TWO NIBBLES |
| 566. | 0674 | 0157 | | MOVWF | 57 | ;PUT IN FILE 57 |
| 567. | 0675 | 0704 | | DECF | 4 | ;DECREMENT Q PTR. |
| 568. | 0676 | 0760 | | DECF | 60 | |
| 569. | 0677 | 11017 | | MOVLW | 17 | ;MASK |
| 570. | 0700 | 1200 | | ANDWF | 0,W | ;PICKUP LS NIBBLE |
| 571. | 0701 | 0156 | TER2 | MOVWF | 56 | ;PUT IN FILE 56 |
| 572. | 0702 | 17707 | | CALL | WRITE | ;WRITE TO EROM |
| 573. | 0703 | 16504 | | CALL | ADDBCD | ;INC |
| 574. | 0704 | 11002 | | MOVLW | 2 | ;TOGGLE ODD/EV |
| 575. | 0705 | 1533 | | XORWF | 33 | |
| 576. | 0706 | 10060 | | MOVFW | 60 | ;RESTOR FSR |
| 577. | 0707 | 0104 | | MOVWF | 4 | |
| 578. | 0710 | 10622 | | CPFSGT | 22 | ;DONE ? |
| 579. | 0711 | 14671 | | GOTO | TER1 | |
| 580. | 0712 | 16064 | | CALL | OFHOOK | |
| 581. | 0713 | 2532 | | INCF | 32,F | ;YES |
| 582. | 0714 | 14510 | | GOTO | TLKJMP | |
| 583. | 0715 | 3400 | EVEN | SWAPF | 0,W | ;SWAP |
| 584. | 0716 | 12417 | | ANDLW | 17 | ;MASK |
| 585. | 0717 | 0157 | | MOVWF | 57 | ;PUT IN FILE 57 |
| 586. | 0720 | 0704 | | DECF | 4 | ;DECREMENT Q PTR. |
| 587. | 0721 | 0760 | | DECF | 60 | |
| 588. | 0722 | 3400 | | SWAPF | 0,W | ;SWAP AND PICKUP NEXT BYTE |
| 589. | 0723 | 12760 | | ANDLW | 360 | ;MASK |
| 590. | 0724 | 1157 | | IORWF | 57,F | ;PUT IN FILE 57 |
| 591. | 0725 | 3400 | | SWAPF | 0,W | ;SWAP AND PICKUP NIBBLE |
| 592. | 0726 | 12417 | | ANDLW | 17 | ;MASK |
| 593. | 0727 | 0760 | | DECF | 60 | |
| 594. | 0730 | 14701 | | GOTO | TER2 | |
| 595. | 0731 | 6033 | LOAD | BTFSC | 33,0 | ;TEST SWAP FLAG |
| 596. | 0732 | 3540 | | SWAPF | 40,F | ;EXCHANGE BITS |
| 597. | 0733 | 10040 | | MOVFW | 40 | |
| 598. | 0734 | 1100 | | IORWF | 0,F | |
| 599. | 0735 | 0003 | | RETFS | | |
| 600. | | | ; | | | |
| 601. | | | ; | | | |
| 602. | | | ; | | | |
| 603. | | | ; | | | |
| 604. | 0736 | 10067 | RAMDIL | MOVFW | 67 | |
| 605. | 0737 | 0157 | | MOVWF | 57 | |
| 606. | 0740 | 10066 | | MOVFW | 66 | |
| 607. | 0741 | 0156 | | MOVWF | 56 | |
| 608. | 0742 | 10065 | | MOVFW | 65 | |
| 609. | 0743 | 0155 | | MOVWF | 55 | |
| 610. | 0744 | 10070 | | MOVFW | 70 | |
| 611. | 0745 | 0135 | | MOVWF | 35 | |
| 612. | 0746 | 11011 | | MOVLW | 011 | ;SET TALK POINTER |
| 613. | 0747 | 0132 | | MOVWF | 32 | |
| 614. | 0750 | 5244 | CONT | BSF | 44,2 | ;SET KEY REJECT FLAG |
| 615. | 0751 | 2735 | | DECFSZ | 35 | ;3 KEYS DONE? |
| 616. | 0752 | 14755 | | GOTO | GT2 | |
| 617. | 0753 | 16504 | | CALL | ADDBCD | ;YES,INC EROM ADDR |
| 618. | 0754 | 14772 | | GOTO | START | ;GET 3 MORE |
| 619. | 0755 | 16071 | GT2 | CALL | SHIFT | ;SHIFT RIGHT |
| 620. | 0756 | 14775 | | GOTO | GET1 | ;DIL PROCESS |

```
621.                    ;
622.                    ;
623.                    ;
624.                    ;
625.                    ;
626.  0757  4105  AUTDI3  BCF    5,1              ;INHIB TMR
627.  0760  11013         MOVLW  13
628.  0761  10540         CPFSEQ 40               ;KEY=*?
629.  0762  14766         GOTO   A1
630.  0763  11017         MOVLW  17               ;YES
631.  0764  0132          MOVWF  32
632.  0765  15540         GOTO   STRTR1
633.  0766  2532   A1     INCF   32
634.  0767  15516         GOTO   GETADD
635.                    ;
636.                    ;
637.  0770  11011  SPREMB MOVLW  9H
638.  0771  0132          MOVWF  32
639.                    ;
640.                    ;
641.  0772  17633  START  CALL   READ
642.  0773  11003         MOVLW  3                ;SET KEY COUNTER
643.  0774  0135          MOVWF  35
644.  0775  11017  GET1   MOVLW  17               ;MASK
645.  0776  1257          ANDWF  57,W             ;PICKUP KEY
646.  0777  0121          MOVWF  21               ;DROP TO INSP
647.  1000  11014         MOVLW  14               ;VAL=#
648.  1001  10521         CPFSEQ 21               ;KEY=#?
649.  1002  15012         GOTO   GT4
650.                    ;
651.                    ;
652.                    ;
653.                    ;PAUSE
654.                    ;
655.                    ;
656.  1003  11015         MOVLW  15               ;LOAD TIMER
657.  1004  0121          MOVWF  21
658.  1005  11170  P1     MOVLW  170
659.  1006  16406         CALL   TIMER2
660.  1007  2721          DECFSZ 21
661.  1010  15005         GOTO   P1
662.  1011  14510         GOTO   TLKJMP
663.  1012  11013  GT4    MOVLW  13               ;VAL=*
664.  1013  10521         CPFSEQ 21               ;KEY=*?
665.  1014  15036         GOTO   GT5
666.  1015  10057         MOVFW  57               ;COPY
667.  1016  0167          MOVWF  67
668.  1017  10056         MOVFW  56
669.  1020  0166          MOVWF  66
670.  1021  10055         MOVFW  55
671.  1022  0165          MOVWF  65
672.  1023  10035         MOVFW  35
673.  1024  0170          MOVWF  70
674.  1025  7331          BTFSS  31,3             ;Q BIT SET?
675.  1026  15057         GOTO   INSRT1
676.  1027  4231          BCF    31,2             ;CLR DIAL FLG
677.  1030  4331          BCF    31,3             ;CLR "Q" BIT
678.  1031  16101         CALL   BEEP
679.  1032  4244          BCF    44,2             ;CLEAR KEY REJECT FLAG
680.  1033  11020         MOVLW  20
681.  1034  0132          MOVWF  32
682.  1035  14267         GOTO   MAIN
683.  1036  10721  GT5    TESTF  21               ;KEY=NULL(0)?
684.  1037  6203          BTFSC  3,2
685.  1040  15050         GOTO   GT11
686.  1041  11017         MOVLW  17               ;MASK
687.  1042  1257          ANDWF  57,W
688.  1043  0177          MOVWF  77               ;KEY TO OUTPUT
689.  1044  5231          BSF    31,2             ;SET DIAL FLG
690.  1045  14537         GOTO   MANDIL           ;NO
691.  1046  0732   GT10   DECF   32
692.  1047  14510         GOTO   TLKJMP
693.  1050  11023  GT11   MOVLW  23
694.  1051  10532         CPFSEQ 32
695.  1052  15046         GOTO   GT10
696.  1053  11010         MOVLW  010
```

| | | | | | | |
|---|---|---|---|---|---|---|
|697.|1054|0132| |MOVWF|32| |
|698.|1055|16117| |CALL|ERROR| |
|699.|1056|14510| |GOTO|TLKJMP| |
|700.| | |;| | | |
|701.| | |;| | | |
|702.| | |;| | | |
|703.|1057|11014|INSRT1|MOVLW|14|;SET F=C|
|704.|1060|0132| |MOVWF|32| |
|705.|1061|10052| |MOVFW|52|;GET STORD KEY|
|706.|1062|0140| |MOVWF|40|;DROP IT|
|707.|1063|10752| |TESTF|52| |
|708.|1064|6203| |BTFSC|3,2| |
|709.|1065|14204| |GOTO|GT8|;CALL ERROR,MAIN|
|710.|1066|11012| |MOVLW|12| |
|711.|1067|10440| |CPFSLT|40|;KEY=1 TO 9?|
|712.|1070|15073| |GOTO|INSRT2|;NO|
|713.|1071|17102| |CALL|NUMADD|;YES,GET AD|
|714.|1072|15100| |GOTO|INSRT4|;A|
|715.|1073|11015|INSRT2|MOVLW|15| |
|716.|1074|10540| |CPFSEQ|40|;KEY=ABC?|
|717.|1075|14204| |GOTO|GT8|;CALL ERROR,MAIN|
|718.|1076|11202| |MOVLW|202| |
|719.|1077|0155| |MOVWF|55| |
|720.|1100|10152|INSRT4|CLRF|52| |
|721.|1101|14772| |GOTO|START| |
|722.| | |;| | | |
|723.| | |;| | | |
|724.| | |;| | | |
|725.|1102|11002|NUMADD|MOVLW|2| |
|726.|1103|0155| |MOVWF|55| |
|727.|1104|16502|GT6|CALL|ADBCD1| |
|728.|1105|2740| |DECFSZ|40,F| |
|729.|1106|15104| |GOTO|GT6| |
|730.|1107|0003| |RETFS| | |
|731.| | |;| | | |
|732.| | |;| | | |
|733.| | |;| | | |
|734.| | |;| | | |
|735.| | |;| | | |
|736.| | |;| | | |
|737.| | |;| | | |
|738.| | |;| | | |
|739.| | |;| | | |
|740.|1110|4105|AUTDI4|BCF|5,1|;INHIB TMR|
|741.|1111|11012| |MOVLW|12| |
|742.|1112|10540| |CPFSEQ|40|;KEY=0? (A)|
|743.|1113|15117| |GOTO|A2| |
|744.|1114|5331| |BSF|31,3|;YES|
|745.|1115|0732| |DECF|32| |
|746.|1116|15534| |GOTO|GT9| |
|747.|1117|10040|A2|MOVFW|40| |
|748.|1120|0152| |MOVWF|52| |
|749.|1121|11022| |MOVLW|22| |
|750.|1122|0132| |MOVWF|32| |
|751.|1123|15534| |GOTO|GT9| |
|752.| | |;| | | |
|753.| | |;| | | |
|754.| | |;| | | |
|755.| | |;| | | |
|756.|1124|11021|SPRMAN|MOVLW|21| |
|757.|1125|10540| |CPFSEQ|40|;KEY=AUTODIAL?|
|758.|1126|15445| |GOTO|TLK1|;NO|
|759.|1127|5544| |BSF|44,5|;REDIAL FLAG SET|
|760.|1130|7231| |BTFSS|31,2|;DIAL FLAG SET ?|
|761.|1131|15137| |GOTO|CTMAN|;NO|
|762.|1132|14267| |GOTO|MAIN|;YES|
|763.| | |;| | | |
|764.| | |;| | | |
|765.|1133|11020|CTNMAN|MOVLW|10H| |
|766.|1134|0132| |MOVWF|32| |
|767.|1135|7544| |BTFSS|44,5|;REDIAL FLAG SET ?|
|768.|1136|14267| |GOTO|MAIN|;NO|
|769.|1137|4544|CTMAN|BCF|44,5|;YES CLEAR IT|
|770.|1140|11013| |MOVLW|13| |
|771.|1141|0132| |MOVWF|32|;TAKE THE "B" PATH|
|772.|1142|14510| |GOTO|TLKJMP|;EXIT TO RAMDIL|

```
773.                  ;
774.                  ;
775.   1143  2532   STRSTK  INCF    32
776.   1144  14772          GOTO    START
777.                  ;
778.                  ;
779.                  ;
780.   1145  11017   INTCOM  MOVLW   17              ;VAL=INTCOM KEY
781.   1146  10540           CPFSEQ  40              ;INTCOM KEY?
782.   1147  15152           GOTO    INTCO1
783.   1150  16064           CALL    OFHOOK
784.   1151  14251           GOTO    STDBY1          ;YES,ABORT ICOM MODE
785.   1152  16117   INTCO1  CALL    ERROR
786.   1153  14267           GOTO    MAIN
787.                  ;
788.                  ;
789.                  ;
790.                  ;
791.                  ;
792.                          TITLE   'KEYREAD'
793.                  ;
794.                  ;
795.                  ;THIS ROUTINE DECODES PDM SIGNALS
796.                  ;
797.                  ;
798.   1154  16051   KEYRED  CALL    SETUP
799.   1155  16000           CALL    INPLO
800.   1156  16051           CALL    SETUP
801.   1157  16014           CALL    INPHI
802.   1160  10125           CLRF    25
803.                  ;SET TIMER TO MID SECOND SYNC PERIOD
804.   1161  11001           MOVLW   1
805.   1162  16406           CALL    TIMER2
806.   1163   7111           BTFSS   11,1            ;TEST INPUT HI
807.   1164  14267           GOTO    MAIN
808.                  ;YES SET TIMER TO 1 BIT TIME
809.   1165  11043   K4      MOVLW   043
810.   1166  16030           CALL    TIMER1
811.   1167   7111           BTFSS   11,1            ;TEST INPUT LO
812.   1170  15176           GOTO    K3              ; YES
813.   1171   2525           INCF    25
814.   1172  11023           MOVLW   23
815.   1173  10625           CPFSGT  25
816.   1174  15165           GOTO    K4
817.   1175  14267           GOTO    MAIN
818.                  ;
819.                  ;
820.                  ;
821.                  ;KEYTST
822.                  ;
823.                  ;
824.   1176   6747   K3      BTFSC   47,7
825.   1177  15274           GOTO    REDUN
826.   1200  10725           TESTF   25              ;NULL KEY REJECT
827.   1201   6203           BTFSC   3,2
828.   1202  14267           GOTO    MAIN
829.   1203  11360           MOVLW   360
830.   1204   1347           ANDWF   47,F
831.   1205  16040   U       CALL    IEQ0
832.   1206   7203           BTFSS   3,2
833.   1207  15213           GOTO    X
834.   1210   6547           BTFSC   47,5
835.   1211  15230           GOTO    Z
836.   1212  15316           GOTO    T
837.   1213  16044   X       CALL    MOVM
838.   1214  11037           MOVLW   037
839.   1215   1200           ANDWF   0,W
840.   1216   1425           XORWF   25,W
841.   1217   7203           BTFSS   3,2
842.   1220  15230           GOTO    Z
843.   1221  16044           CALL    MOVM
844.   1222  11040           MOVLW   040
845.   1223   1700           ADDWF   0,F
846.   1224   6547           BTFSC   47,5
847.   1225  15260           GOTO    Q
848.   1226   5647           BSF     47,6
849.   1227  15236           GOTO    Y
```

```
850.  1230  2547   Z       INCF    47,F
851.  1231  11007          MOVLW   7
852.  1232  1247           ANDWF   47,W
853.  1233  13003          XORLW   3
854.  1234  7203           BTFSS   3,2
855.  1235  15205          GOTO    U
856.  1236  2546   Y       INCF    46
857.  1237  11004          MOVLW   4
858.  1240  0446           SUBWF   46,W
859.  1241  7203           BTFSS   3,2
860.  1242  14267          GOTO    MAIN
861.  1243  10146          CLRF    46
862.  1244  7547           BTFSS   47,5
863.  1245  15251          GOTO    S
864.  1246  16034          CALL    CLRI
865.  1247  4547           BCF     47,5
866.  1250  14267          GOTO    MAIN
867.  1251  6647   S       BTFSC   47,6
868.  1252  15255          GOTO    S+4
869.  1253  16034          CALL    CLRI
870.  1254  14267          GOTO    MAIN
871.  1255  4647           BCF     47,6
872.  1256  5547           BSF     47,5
873.  1257  14267          GOTO    MAIN
874.  1260  16044          CALL    MOVM
875.  1261  11340          MOVLW   340
876.  1262  1200           ANDWF   0,W
877.  1263  13300          XORLW   300
878.  1264  7203           BTFSS   3,2
879.  1265  15236          GOTO    Y
880.  1266  5747           BSF     47,7
881.  1267  10025          MOVFW   25
882.  1270  0140           MOVWF   40
883.  1271  10141          CLRF    41
884.  1272  16207          CALL    TONEON
885.  1273  14267          GOTO    MAIN
886.  1274  10725  REDUN   TESTF   25
887.  1275  6203           BTFSC   3,2
888.  1276  15303          GOTO    L
889.  1277  10741          TESTF   41
890.  1300  7203           BTFSS   3,2
891.  1301  0741           DECF    41
892.  1302  14267          GOTO    MAIN
893.  1303  2541   L       INCF    41,F
894.  1304  7341           BTFSS   41,3
895.  1305  14267          GOTO    MAIN
896.  1306  10146  HELP    CLRF    46
897.  1307  10147          CLRF    47
898.  1310  16212          CALL    TONEOF
899.  1311  10740          TESTF   40
900.  1312  6203           BTFSC   3,2            ;KEY VALUE=NULL?
901.  1313  14267          GOTO    MAIN           ;YES
902.  1314  10141          CLRF    41
903.  1315  15326          GOTO    VFYSEC
904.  1316  10041  T       MOVFW   41
905.  1317  0142           MOVWF   42
906.  1320  10040          MOVFW   40
907.  1321  0141           MOVWF   41
908.  1322  10025          MOVFW   25
909.  1323  0140           MOVWF   40
910.  1324  5540           BSF     40,5
911.  1325  15236          GOTO    Y
912.                       ;
913.                       ;
914.                       ;
915.                       ;NOTE:SEC CODE VERIFY
916.                       ;
917.                       ;
918.  1326  7631   VFYSEC  BTFSS   31,6           ;VERIF.SEC. FLAG?
919.  1327  15375          GOTO    SV3
920.  1330  7311           BTFSS   11,3           ;PROG.SEC.SW ?
921.  1331  15364          GOTO    SV1            ;YES
922.  1332  11020          MOVLW   20             ;SELOFF VALUE
923.  1333  10540          CPFSEQ  40             ;EQUAL ?
924.  1334  15336          GOTO    SV6            ;NO
925.  1335  14227          GOTO    STDBY          ;YES
```

```
926.  1336 11017  SV6     MOVLW  017           ;MASK TO PICK UP
927.  1337  1257          ANDWF  57,W          ;SEC CODE BYTE
928.  1340  1440          XORWF  40,W          ;COMPARE
929.  1341  7203          BTFSS  3,2           ;SAME?
930.  1342  5344          BSF    44,3          ;VER. SEC. ERR FLG
931.  1343  6131          BTFSC  31,1
932.  1344 15361          GOTO   SV2           ;NOT DONE
933.  1345  6344          BTFSC  44,3          ;TST SEC ERR FLG
934.  1346 14227          GOTO   STDBY
935.  1347  4714          BCF    14,7          ;TX ON
936.  1350 16101          CALL   BEEP
937.  1351  5431          BSF    31,4          ;TALK FLAG
938.  1352  4631          BCF    31,6          ;CLR VFY FLG
939.  1353 11141          MOVLW  141           ;DISABLE RTC1
940.  1354  0105          MOVWF  5             ;ENABLE XI
*** INFORMATIVE-REGISTER HAS STUCK BITS
941.  1355  6350          BTFSC  50,3          ;ICOM FLG SET?
942.  1356 15417          GOTO   ICOMON        ;YES
943.  1357 16064          CALL   OFHOOK
944.  1360 14267          GOTO   MAIN
945.  1361 16071  SV2     CALL   SHIFT
946.  1362  0731          DECF   31
947.  1363 14267          GOTO   MAIN
948.                   ;
949.                   ;PROGRAM SECURITY
950.                   ;
951.  1364 17633  SV1     CALL   READ
952.  1365 16071          CALL   SHIFT
953.  1366 10040          MOVFW  40
954.  1367  0156          MOVWF  56
955.  1370 11231          MOVLW  231
956.  1371  0155          MOVWF  55
957.  1372 17707          CALL   WRITE
958.  1373 17633          CALL   READ
959.  1374 14267          GOTO   MAIN
960.                   ;
961.                   ;3 KEY TESTS BEFORE GOING TO TALK MODE
962.                   ;
963.  1375 11020  SV3     MOVLW  20            ;SELECT OFF
964.  1376 10540          CPFSEQ 40            ;OFF ?
965.  1377 15401          GOTO   SV4           ;NO
966.  1400 14223          GOTO   STDBY2        ;YES
967.  1401 11022  SV4     MOVLW  22            ;HOOK VALUE
968.  1402 10540          CPFSEQ 40            ;HOOK ?
969.  1403 15414          GOTO   SV5           ;NO
970.  1404 16055  HOOK    CALL   ONHOOK
971.  1405 11377          MOVLW  377
972.  1406 16406          CALL   TIMER2
973.  1407 11377          MOVLW  377
974.  1410 16406          CALL   TIMER2
975.  1411 16064          CALL   OFHOOK
976.  1412 10132          CLRF   32
977.  1413 14251          GOTO   STDBY1
978.  1414  6244  SV5     BTFSC  44,2          ;KEY REJECT FLAG ?
979.  1415 14267          GOTO   MAIN          ;YES, IGNORE KEY
980.  1416 14510          GOTO   TLKJMP        ;NO, DO KEY ACTION
981.                   ;
982.  1417  4514  ICOMON  BCF    14,5          ;OUTPUT ICOM
983.  1420 16212          CALL   TONEOF
984.  1421  4105          BCF    5,1           ;STOP INT-TIMER
985.  1422  4616          BCF    16,6          ;ICOM LED ON
986.  1423 11024          MOVLW  24
987.  1424  0132          MOVWF  32
988.  1425  5316          BSF    16,3          ;BASERING BIT
989.  1426  4350          BCF    50,3
990.  1427 14267          GOTO   MAIN
991.                   ;
992.                   ;
993.                   ;
994.                   ;
995.                   ;
996.                   ;
997.                   ;
998.                   ;
999.                   ;
1000.                   ;TITLE 'TALK'
```

```
1001.        ;
1002.        ;
1003.        ;  THIS CODE,TOGATHER WITH
1004.        ;SUBROUTINES GIVEN IN TALKSUBS,
1005.        ;PRODUCE ALL TALK MODE FUNCTIONS.
1006.        ;
1007.        ;
1008. 1430 11014  TALK    MOVLW   14
1009. 1431 10640          CPFSGT  40              ;KEY=1-#?
1010. 1432 15445          GOTO    TLK1            ;YES
1011. 1433 11016          MOVLW   16              ;NO
1012. 1434 10640          CPFSGT  40              ;KEY=A,B
1013. 1435 15464          GOTO    TLK2            ;YES
1014. 1436 11017          MOVLW   17              ;VALUE FOR INCOM KEY
1015. 1437 10640          CPFSGT  40              ;KEY=INCOM?
1016. 1440 15461          GOTO    TLK3            ;YES
1017. 1441 11017          MOVLW   017             ;NO,COMPUTE TALK FLAG
1018. 1442 0440           SUBWF   40,W
1019. 1443 0132           MOVWF   32
1020. 1444 14510          GOTO    TLKJMP          ;KEY ACTION JUMP TABLE
1021. 1445 10022  TLK1    MOVFW   22              ;Q NEW KEY
1022. 1446 0104           MOVWF   4
1023. 1447 10040          MOVFW   40
1024. 1450 0100           MOVWF   0
1025. 1451 11061          MOVLW   61              ;Q OVERFLOW REJECT
1026. 1452 10522          CPFSEQ  22
1027. 1453 0722           DECF    22
1028. 1454 6231           BTFSC   31,2
1029. 1455 14267          GOTO    MAIN
1030. 1456 5231           BSF     31,2            ;NO
1031. 1457 10040          MOVFW   40              ;PICKUP KEY
1032. 1460 15601          GOTO    DI2
1033. 1461 16055  TLK3    CALL    ONHOOK
1034. 1462 4316           BCF     16,3            ;BASRNG BIT
1035. 1463 14337          GOTO    ICOMFH
1036.        ;
1037.        ;
1038.        ;DIAL A,B
1039.        ;
1040.        ;
1041.        ;
1042.        ;
1043.        ;
1044. 1464 6140   TLK2    BTFSC   40,1            ;KEY=A(15)
1045. 1465 15477          GOTO    HOLD            ;NO,MUST BE 'B'
1046. 1466 11356          MOVLW   356             ;SET MUX
1047. 1467 0112           MOVWF   12              ;READ STRAP
1048. 1470 7311           BTFSS   11,3            ;SYSREM=4500?
1049. 1471 15504          GOTO    LINADV          ;NO
1050. 1472 11011          MOVLW   9H              ;SETUP TLKJUP
1051. 1473 0132           MOVWF   32              ;AUTODIL
1052. 1474 11202          MOVLW   202             ;EROM ADD FOR A
1053. 1475 0155           MOVWF   55
1054. 1476 14772          GOTO    START
1055.        ;
1056.        ;
1057.        ;
1058. 1477 3416   HOLD    SWAPF   16,W
1059. 1500 2201           COMPF   1,W
1060. 1501 12460          ANDLW   60
1061. 1502 1516           XORWF   16,F
1062. 1503 14267          GOTO    MAIN
1063.        ;
1064.        ;
1065.        ;
1066. 1504 11003  LINADV  MOVLW   3
1067. 1505 1516           XORWF   16,F
1068. 1506 14267          GOTO    MAIN
1069.        ;
1070.        ;
1071.        ;
1072.        ;
1073.        ;
1074.        ;
1075.        ;
1076.        ;
```

```
1077.                 ;
1078.                 ;
1079.   1507  2532  STOR1   INCF    32                ;STORE KEY
1080.   1510 11047          MOVLW   47
1081.   1511  0134          MOVWF   34                ;EXTRA TIMEOUT
1082.   1512 16055          CALL    ONHOOK
1083.   1513 15542          GOTO    STRTMR
1084.                 ;
1085.                 ;
1086.   1514  2532  STOR2   INCF    32,F
1087.   1515  4105          BCF     5,1               ;INHIB TMR
1088.                 ;
1089.                 ;
1090.                 ;
1091.   1516 11012  GETADD  MOVLW   12
1092.   1517 10440          CPFSLT  40                ;KEY LT 0?
1093.   1520 15523          GOTO    GT1               ;NO
1094.   1521 17102          CALL    NUMADD
1095.   1522 14510          GOTO    TLKJMP
1096.   1523 11015  GT1     MOVLW   15                ;FOR KEY=A
1097.   1524 10540          CPFSEQ  40
1098.   1525 15531          GOTO    GTA10
1099.   1526 11202          MOVLW   202
1100.   1527  0155          MOVWF   55
1101.   1530 14510          GOTO    TLKJMP
1102.   1531 11013  GTA10   MOVLW   13                ;FOR KEY=*
1103.   1532 10540          CPFSEQ  40
1104.   1533 14204          GOTO    GT8               ;NO,ERROR
1105.   1534 10155  GT9     CLRF    55                ;KEY=*
1106.   1535 14510          GOTO    TLKJMP
1107.                 ;
1108.                 ;
1109.   1536 11015  AUTOD2  MOVLW   015
1110.   1537  0132          MOVWF   32
1111.   1540 11024  STRTR1  MOVLW   24
1112.   1541  0134          MOVWF   34
1113.   1542 10106  STRTMR  CLRF    6                 ;START CNTR
1114.   1543 10107          CLRF    7
1115.   1544  5105          BSF     5,1
1116.   1545 14267          GOTO    MAIN
1117.                 ;
1118.                 ;
1119.   1546  5610  DISET   BSF     10,6              ;UNMUTE TX AUDIO
1120.   1547 11020          MOVLW   20
1121.   1550 10532          CPFSEQ  32
1122.   1551 15553          GOTO    DI3
1123.   1552 15556          GOTO    DI4
1124.   1553 10732  DI3     TESTF   32                ;TLKJMP=0?
1125.   1554  7203          BTFSS   3,2
1126.   1555 14510          GOTO    TLKJMP            ;NO
1127.   1556  7231  DI4     BTFSS   31,2              ;YES,DIAL FLG?
1128.   1557 15567          GOTO    DI5               ;NO
1129.   1560  2422          INCF    22,W              ;YES
1130.   1561 10560          CPFSEQ  60                ;PTRS 1 APART?
1131.   1562 15574          GOTO    DI1               ;NO
1132.   1563 11077          MOVLW   77                ;YES,RESET ALL
1133.   1564  0122          MOVWF   22
1134.   1565  0160          MOVWF   60
1135.   1566  4231          BCF     31,2              ;DIAL FLG
1136.   1567 11020  DI5     MOVLW   20
1137.   1570 10532          CPFSEQ  32
1138.   1571 14267          GOTO    MAIN
1139.   1572  2532          INCF    32                ;INCREMENT PNTR.
1140.   1573 14510          GOTO    TLKJMP
1141.   1574  0760  DI1     DECF    60
1142.   1575 10060          MOVFW   60
1143.   1576  0104          MOVWF   4                 ;LOAD FSR
1144.   1577 10000          MOVFW   0                 ;PICKUP KEY
1145.   1600  0177          MOVWF   77                ;DROP KEY
1146.   1601  0137  DI2     MOVWF   37                ;STORE KEY TEMP
1147.   1602 14537          GOTO    MANDIL
1148.                 ;
1149.                 ;
1150.                 ;
1151.   1603 11030  BASRNG  MOVLW   30
1152.   1604  0130          MOVWF   30
1153.   1605 11004  BSR1    MOVLW   4                 ;OFF TIME
```

```
1154.  1606 16406            CALL    TIMER2
1155.  1607 16101            CALL    BEEP
1156.  1610  6731            BTFSC   31,7              ;ESCAPE BIT?
1157.  1611 14106            GOTO    ESCAPE            ;YES
1158.  1612  2730            DECFSZ  30
1159.  1613 15605            GOTO    BSR1
1160.  1614 14267            GOTO    MAIN
1161.                    ;
1162.                    ;
1163.                    ;
1164.                    ;
1165.                            TITLE   'PIC1670-ER1400
1166.                    ;
1167.  0015            RC      EQU     15                ;I/O PORT B.
1168.  0055            ADREG   EQU     55                ;ADDRESS REG FOR ER1400
1169.  0044            FLAG    EQU     44
1170.  0054            BCNTR   EQU     54
1171.  0057            DATAL   EQU     57                ;LOW HALF OF DATA
1172.  0056            DATAH   EQU     56                ;HIGH HALF OF DATA
1173.                    ;*****************************
1174.                    ;                             *
1175.                    ; I/O BIT ASSIGNMENT FOR RC   *
1176.                    ;                             *
1177.                    ;*****************************
1178.  0000            DATA    EQU     0
1179.  0001            C3      EQU     1
1180.  0002            C2      EQU     2
1181.  0003            C1      EQU     3
1182.  0004            CLOCK   EQU     4
1183.                    ;
1184.                    ;*************************************************
1185.                    ;*                                               *
1186.                    ;*           ADDRESS ROUTINE                     *
1187.                    ;*                                               *
1188.                    ;*                                               *
1189.                    ;* ADDRESS TWP BCD DIGITS IN ADREG ON ENTRY      *
1190.                    ;*                                               *
1191.                    ;*************************************************
1192.  1615 10055    ADRESS   MOVFW   55                ;PICKUP EROM ADDR
1193.  1616  0153             MOVWF   53                ;STORE TEMP
1194.  1617 10154             CLRF    BCNTR             ;CLEAR COUNT
1195.  1620 10015             MOVFW   RC                ;PUT ER1400 IN STAND BY MODE
1196.  1621 12017             IORLW   17                ;WITHOUT CORRUPTING OTHER PINS
1197.  1622  0115             MOVWF   RC
1198.  1623 11371             MOVLW   371               ;TX ADDRESS TO EAROM
1199.  1624 17646             CALL    TXADR
1200.  1625  3555             SWAPF   ADREG,F           ;MSB ADDRESS
1201.  1626 17727             CALL    CLOCK1            ;MAINTAIN CLOCK
1202.  1627 17646             CALL    TXADR
1203.  1630 10155             CLRF    ADREG             ;SET SO TXDATA ROUTINE
1204.  1631  2355             COMPF   ADREG             ;WILL NOT SEND ADDRESS
1205.  1632  0003             RETFS
1206.                    ;*****************************
1207.                    ;*                           *
1208.                    ;*  END OF ADDRESS ROUTINE   *
1209.                    ;*                           *
1210.                    ;*****************************
1211.                    ;*************************************************
1212.                    ;*                                               *
1213.                    ;*              READ ROUTINE                     *
1214.                    ;*                                               *
1215.                    ;*    READ 14 BITS FROM ER1400 TO TWO            *
1216.                    ;* PIC RAM LOCATIONS. PIC RAM LOCATIONS          *
1217.                    ;* SPECIFIED BY DATEL AND DATAH. LAST 8 BITS     *
1218.                    ;* TRANSMITTED ARE STORED IN DATAL. FIRST 6      *
1219.                    ;* BITS TRANSMITTED ARE STORED IN DATAH, BIT 0-5 *
1220.                    ;* ADREG SET TO 377 TO INSURE NO ADDRESS         *
1221.                    ;* COMPARISON.                                   *
1222.                    ;*                                               *
1223.                    ;*************************************************
1224.  1633 17615    READ     CALL    ADRESS
1225.  1634 17727             CALL    CLOCK1
1226.  1635 11367             MOVLW   367               ;READ ENABLE TO EAROM
1227.  1636 17647             CALL    TXRD              ;READ + 2 CLOCKS TO EAROM
1228.  1637 17727             CALL    CLOCK1            ;MAINTAIN CLOCK
```

```
1229.   1640  11365           MOVLW    365             ;READ DATA FROM ER1400
1230.   1641  17645           CALL     TXDATA          ;TX DATA ROUTINE
1231.   1642  10053           MOVFW    53              ;PICKUP TEMP
1232.   1643   0155           MOVWF    55              ;RESTORE EROM ADDR
1233.   1644   0003           RETFS
1234.                  ;************************
1235.                  ;*                      *
1236.                  ;* END OF READ ROUTINE  *
1237.                  ;*                      *
1238.                  ;************************
1239.                  ;********************************************
1240.                  ;*                                          *
1241.                  ;*    TRANSFER DATA/ADDRESS ROUTINE         *
1242.                  ;*                                          *
1243.                  ;*                                          *
1244.                  ;*    BCNTR = 0 ON ENTRY                    *
1245.                  ;*                                          *
1246.                  ;********************************************
1247.   1645   5254    TXDATA   BSF     BCNTR,2         ;ENTRY FOR DATA COUNT = 14
1248.   1646   5354    TXADR    BSF     BCNTR,3         ;ADDRESS ENTRY COUNT = 12
1249.   1647   5154    TXRD     BSF     BCNTR,1         ;READ/WRITE ENTRY COUNT = 2
1250.   1650   1315    WEDEL    ANDWF   RC,F            ;OUTPUT MODE CONTROL CODE
1251.                  ;
1252.                  ; WEDEL WRITE ERASE ENTRY COUNT = 256
1253.                  ;
1254.   1651   2455    TXD1     INCF    ADREG,W         ;ADDRESS TO W
1255.   1652  17732             CALL    DELAY
1256.   1653   5415             BSF     RC,CLOCK        ;SET CLOCK
1257.   1654  12417             ANDLW   17              ;LSD IN RANGE 1-10
1258.   1655   5015             BSF     RC,DATA         ;SET I/O DATA
1259.   1656   1454             XORWF   BCNTR,W         ;SET Z IF ADREG = BCNTR
1260.   1657   6444             BTFSC   FLAG,4          ;TEST IF TX READ OR ADDRESS
1261.                  ;FLAG,2 IS SET IF WRITING DATA TO EAROM.
1262.   1660   6556             BTFSC   DATAH,5         ;YES, TX WRITE - - TEST WRITE DAT/
1263.                  ;WRITING DATA INTO THE EAROM
1264.                  ;ELSE, IS THIS THE CORRECT ADDRESS BIT POSITION
1265.   1661   6203             BTFSC   3,2             ;TEST Z -- ADDRESS TX
1266.   1662   4015             BCF     RC,DATA         ;YES, DATA = 0
1267.   1663   3015             RRCF    RC,W            ;READ DATA TO CARRY
1268.   1664  17732             CALL    DELAY
1269.   1665   4415    TXD2     BCF     RC,CLOCK        ;CLEAR CLOCK
1270.   1666   7315             BTFSS   RC,C1           ;TEST IF DATA TX
1271.   1667   3357             RLCF    DATAL,F         ;ROTATE IF TX DATA, READ
1272.   1670   7315             BTFSS   RC,C1           ;OR WRITE
1273.   1671   3356             RLCF    DATAH,F
1274.   1672   2754             DECFSZ  BCNTR,F         ;DECF AND TEST COUNT
1275.   1673  15651             GOTO    TXD1            ;TX NOT COMPLETE
1276.                  ;
1277.                  ;TX COMPLETE
1278.                  ;
1279.   1674  17732             CALL    DELAY
1280.   1675  10015             MOVFW   RC              ;PUT ER1400 IN STAND BY MODE
1281.   1676  12017             IORLW   17              ;WITHOUT AFFECTING OTHER PINS
1282.   1677   5415             BSF     RC,CLOCK        ;SET CLOCK HIGH
1283.   1700   6315             BTFSC   RC,C1           ;ARE WE READING OR WRITING ?
1284.   1701   0003             RETFS                   ;NO, WE ARE ADDRESSING
1285.   1702   5154             BSF     BCNTR,1         ;YES, DO TWO CLOCK CYCLES
1286.   1703   5401             BSF     1,4             ;SET CLOCK BIT
1287.   1704   0115             MOVWF   RC              ;PUT ER1400 IN STAND BY MODE
1288.   1705   4015             BCF     RC,DATA
1289.   1706  15665             GOTO    TXD2
1290.                  ;******************************
1291.                  ;*                            *
1292.                  ;* DATA TRANSMIT COMPLETE     *
1293.                  ;*                            *
1294.                  ;* END OF DATA TX ROUTINE     *
1295.                  ;*                            *
1296.                  ;******************************
1297.   1707  17615    WRITE    CALL    ADRESS
1298.   1710  17727             CALL    CLOCK1
1299.   1711   5444             BSF     FLAG,4          ;SET TX WRITE DATA
1300.   1712  11361             MOVLW   361
1301.   1713  17645             CALL    TXDATA          ;TX DATA
1302.   1714   4444             BCF     FLAG,4
1303.   1715  17727             CALL    CLOCK1          ;MAINTAIN CLOCK TO ER1400
1304.   1716  11373             MOVLW   373
```

```
1305.  1717 17726            CALL   WRITE1           ;ERASE
1306.  1720 17727            CALL   CLOCK1           ;MAINTAIN CLOCK
1307.  1721 11363            MOVLW  363              ;ER1400 WRITE
1308.  1722 17726            CALL   WRITE1
1309.  1723 10053            MOVFW  53               ;PICKUP TEMP
1310.  1724 0155             MOVWF  55               ;RESTORE EROM ADDR.
1311.  1725 0003             RETFS
1312.  1726 15650   WRITE1   GOTO   WEDEL            ;WRITE
1313.                        ;MAINTAIN CLOCKS TO ER1400
1314.  1727 0115    CLOCK1   MOVWF  RC               ;CLEAR CLOCK
1315.  1730 17732            CALL   DELAY
1316.  1731 13771            RETLW  371              ;ADDRESS TX TO W
1317.  1732 15733   DELAY    GOTO   DEY
1318.  1733 0003    DEY      RETFS
1319.                        ;*******************************
1320.                        ;*                             *
1321.                        ;*
1323.                        ;*  END OF PIC 1650-ER1400 INTERFACE  *
1324.                        ;*                             *
1325.                        ;*******************************
1326.                        ;
1327.                        ;
1328.                        ;
1329.                        ;
1330.                        ;
1331.                        ;
1332.                        ;
1333.                        ;
1334.                        ;
1335.                        ;
1336.  1734 7350    INT8     BTFSS  50,3             ;ICOM FLG SET?
1337.  1735 15745            GOTO   INT7             ;NO
1338.  1736 11111            MOVLW  ICOM             ;YES
1339.  1737 14216            GOTO   CLRINT
1340.                        ;
1341.  1740                  ORG    1740             ;REAL TIME INTERUPT
1342.                        ;
1343.                        ;
1344.  1740 2734             DECFSZ 34
1345.  1741 15754            GOTO   INT4
1346.  1742 11024            MOVLW  24
1347.  1743 0134             MOVWF  34               ;RESET EXTRA TMR
1348.  1744 15734            GOTO   INT8
1349.  1745 6431    INT7     BTFSC  31,4             ;TALK MODE?
1350.  1746 15752            GOTO   INT3
1351.  1747 4631             BCF    31,6             ;CLEAR VERIF FLAG
1352.  1750 11267            MOVLW  MAIN             ;LOAD VECTOR
*** INFORMATIVE-INCONSISTENT USE OF SYMBOL
1353.  1751 14216            GOTO   CLRINT
1354.  1752 11157   INT3     MOVLW  TOUT             ;LOAD VECTOR
1355.  1753 14216            GOTO   CLRINT
1356.  1754 10106   INT4     CLRF   6
1357.  1755 10107            CLRF   7
1358.  1756 5105             BSF    5,1
1359.  1757 0002             RETFI
1360.                        ;
1361.                        ;
1362.                        ;
1363.                        ;
1364.  1760                  ORG    1760             ;EXTERNAL INTERUPT
1365.                        ;
1366.                        ;
1367.  1760 16212            CALL   TONEOF
1368.  1761 7211             BTFSS  11,2             ;RNG DETOR ?
1369.  1762 16207            CALL   TONEON           ;YES
1370.  1763 11127            MOVLW  LOS
*** INFORMATIVE-INCONSISTENT USE OF SYMBOL
1371.  1764 6717             BTFSC  17,7             ;ICOM SW DWN?
1372.  1765 14216            GOTO   CLRINT           ;NO
1373.  1766 7514             BTFSS  14,5             ;ICOM MODE?
1374.  1767 15773            GOTO   INT1             ;YES
1375.  1770 16207            CALL   TONEON
1376.  1771 11154            MOVLW  ICOMA
1377.  1772 14216            GOTO   CLRINT
1378.  1773 16064   INT1     CALL   OFHOOK
```

```
1379.   1774 11251              MOVLW   STDBY1
*** INFORMATIVE-INCONSISTENT USE OF SYMBOL
1380.   1775 14216              GOTO    CLRINT
1381.   1776 0000               NOP
1382.                  ;
1383.                  ;
1384.   1777                    ORG     1777
1385.                  ;
1386.                  ;
1387.   1777 14223              GOTO    STDBY2
1388.                  ;
1389.                  ;
1390.                  ;
1391.                  ;
1392.                  ;
1393.                           END
```

```
           CROSS REFERENCE TABLE
   SYMBOL-VALUE    REFERENCES
   A1       0766    -633 629
   A2       1117    -747 743
   ADBCD1   0502    -424 727
   ADDBCD   0504    -426 402 410 573 617
   ADREG    0055    -1168 1200 1203 1204 1254
   ADRESS   1615    -1192 1224 1297
   AUTDI3   0757    -626 452
   AUTDI4   1110    -740 454
   AUTOD2   1536    -1109 441
   BASRNG   1603    -1151 316
   BCNTR    0054    -1170 1194 1247 1248 1249 1259 1274 1285
   BEEP     0101    -105 129 678 936 1155
   BSR1     1605    -1153 1159
   C1       0153    -1181 1270 1272 1283
   C2       0002    -1180
   C3       0001    -1179
   CALLER   0654    -547 528 531
   CLOCK    0154    -1182 1256 1269 1282
   CLOCK1   1727    -1314 1201 1225 1228 1298 1303 1306
   CLRI     0034    -65 864 869
   CLRINT   0216    -206 1339 1353 1355 1372 1377 1380
   CONT     0750    -614 448 451 458
   CTMAN    1137    -769 761
   CTNMAN   1133    -765 456
   D1       0564    -483 479
   D5       0563    -482
   DATA     0150    -1178 1258 1266 1288
   DATAH    0056    -1172 1262 1273
   DATAL    0057    -1171 1271
   DELAY    1732    -1317 1255 1268 1279 1315
   DEY      1733    -1318 1317
   DI1      1574    -1141 1131
   DI2      1601    -1146 1032
   DI3      1553    -1124 1122
   DI4      1556    -1127 1123
   DI5      1567    -1136 1128
   DIL1     0577    -494 465
   DIL2     0553    -474 377 378
   DIL3     0567    -486 373 375
   DIL5     0607    -502 371
   DIL7     0617    -510 473
   DISET    1546    -1119 383 511
   DTMF     0354    -327 494
   ERROR    0117    -127 191 510 547 698 785
   ERROR1   0121    -129 133
   ESCAPE   0106    -113 20  32 261 1157
   EVEN     0715    -583 564
   F1       0010    -27 22
   F3       0024    -39 34
   FLAG     0044    -1169 1260 1299 1302
   GET1     0775    -644 620
   GETADD   1516    -1091 187 634
   GT1      1523    -1096 1093
   GT10     1046    -691 695
   GT100    0647    -542 536
   GT11     1050    -693 685
```

```
GT2      0755   -619  616
GT4      1012   -663  649
GT5      1036   -683  665
GT6      1104   -727  729
GT8      0204   -191  709 7171104
GT9      1534   -1105 746  751
GT97     0630   -527  541
GT98     0645   -540  525
GT99     0624   -523  556
GTA10    1531   -11021098
HEL1     0214   -202  197
HELP     1306   -896  142
HOLD     1477   -1058 2921045
HOOK     1404   -970  122  442
ICOM     0111   -1171338
ICOMA    0154   -1611376
ICOMF1   0344   -313  118
ICOMFH   0337   -308  1621035
ICOMON   1417   -982  163  942
IEQ0     0040   -69   831
INPHI    0014   -31   37   40   42  801
INPLO    0000   -19   25   28   30  799
INSRT1   1057   -703  675
INSRT2   1073   -715  712
INSRT4   1100   -720  714
INT1     1773   -13781374
INT3     1752   -13541350
INT4     1754   -13561345
INT7     1745   -13491337
INT8     1734   -13361348
INTC01   1152   -785  782
INTCOM   1145   -780  459
K3       1176   -824  812
K4       1165   -809  816
KEYRED   1154   -798  259  263  267
L        1303   -893  888
LINADV   1504   -1066 2931049
LOAD     0731   -595  534  549  558
LOS      0127   -137  3681370
LOS1     0145   -151  145
MAIN     0267   -258  140  149  153  157  277  280  288  296  302  304  320  346  355  520  539  550
92  895  901  944  947  959  979  99010291062106811161138116013S2
MAIN1    0301   -268  265
MANDIL   0537   -462  6901147
MJMP0    0306   -276  270
MJMP1    0313   -283  271
MJMP2    0331   -299  272
MJMPA    0326   -294  284
MOVM     0044   -73   69  837  843  874
NIBL1    0471   -413  395
NIBL2    0474   -416  396
NIBLX    0477   -419  415
NUMADD   1102   -725  7131094
OFHOOK   0064   -89   192  279  580  783  943  9751378
ONHOOK   0055   -82   221  295  97010331082
P1       1005   -658  661
Q        1260   -874  847
RAMDIL   0736   -604  450
RC       0015   -11671195119712501256125812661267126912701272128012821283128712881314
READ     1633   -1224 224  391  641  951  958
REDUN    1274   -886  825
S        1251   -867  863  868
SETUP    0051   -78   798  800
SH1      0074   -97   100
SHIFT    0071   -94   619  945  952
SPREMB   0770   -637  453
SPRMAN   1124   -756  455
START    0772   -641  182  618  721  7761054
STDBY    0227   -220  138  150  925  934
STDBY1   0251   -241  121  193  447  449  784  9771379
STDBY2   0223   -216  440  9661387
STOR1    1507   -1079 443
STOR2    1514   -1086 444
STOR3    0621   -518  445
STOR4    0660   -554  446
STRSTK   1143   -775  457
```

```
STRTMR   1542  -1113 1083
STRTR1   1540  -1111  632
SV1      1364   -951  921
SV2      1361   -945  932
SV3      1375   -963  919
SV4      1401   -967  965
SV5      1414   -978  969
SV6      1336   -926  924
SVCR1    0460   -404  399
SVCRDI   0435   -385  354
T        1316   -904  836
T1       0031    -48   49
T2       0407   -361  364
TALK     1430  -1008  439
TER1     0671   -563  579
TER2     0701   -571  594
TIMER1   0030    -47   86   91  362  810
TIMER2   0406   -360  107  131  217  659  805  972  974 1154
TIMER3   0373   -343  485  493  501
TIMER4   0377   -349  380  382  509
TLK1     1445  -1021  758 1010
TLK2     1464  -1044 1013
TLK3     1461  -1033 1016
TLKJMP   0510   -437  582  662  692  699  772  980 1020 1095 1101 1110 1126 1140
TO1      0174   -183  175
TO2      0201   -188  185
TO3      0414   -367  190
TONEOF   0212   -200  108  225  317  898  983 1367
TONEON   0207   -195  105  319   88 413 691 375
TOUT     0157   -170 1354
TXADR    1646  -1248 1199 1202
TXD1     1651  -1254 1275
TXD2     1665  -1269 1289
TXDATA   1645  -1247 1230 1301
TXRD     1647  -1249 1227
U        1205   -831  855
VFYSEC   1326   -918  903
WEDEL    1650  -1250 1312
WRITE    1707  -1297  401  406  411  419  572  957
WRITE1   1726  -1312 1305 1308
X        1213   -837  833
Y        1236   -856  849  879  911
Z        1230   -850  835  842
 174 SYMBOLS
```

TABLE II

```
LINE  ADDR  INSTR         '4000X

1.                  ;
  2.
  3.                  ;
  4.                  ;
  5.                  ;
  6.                  ;
  7.                  ;
  8.                  ;
  9.                  ;
 10.                       LIST    P=2655,E,G,X
 11.                  ;
 12.                  ;
 13.  0000                 ORG     000
 14.                  ;
 15.                  ;THIS MULTIPLE ENTRY SUBROUTINE WILL
 16.                  ;OUTPUT DATA (KEYS) FROM PORT B, BIT 2.
 17.                  ;
 18.                  ;
 19.  0000  6005  XMTSEC   MOVLW   005          ;VALUE FOR TEMP TIMER
 20.  0001  0066  HUT      MOVWF   26           ;TEMP XMITSEC LIMIT TIMER
 21.  0002  2675           BSF     35,5         ;SET SEC. XMIT FLAG
 22.  0003  6020  XMTKEY   MOVLW   020
 23.  0004  0076           MOVWF   36,F
 24.  0005  2430           BSF     30,0         ;SET MUTEBIT
 25.  0006  1030           MOVF    30,W         ;PICKUP "B"
```

| | | | | | | |
|---|---|---|---|---|---|---|
| 26. | 0007 | 0046 | | MOVWF | 6,F | ;ADD MUTE TO OUTPUT "B" |
| 27. | 0010 | 6024 | XMIT | MOVLW | 024 | |
| 28. | 0011 | 0062 | | MOVWF | 22,F | ;INITIALIZE PILOT COUNT |
| 29. | 0012 | 2530 | | BSF | 30,2 | ;SET DATA HI |
| 30. | 0013 | 1030 | | MOVF | 30,W | ;PICKUP "B" |
| 31. | 0014 | 0046 | | MOVWF | 6,F | ;OUTPUT DATA HI |
| 32. | 0015 | 6205 | | MOVLW | 205 | |
| 33. | 0016 | 4720 | | CALL | TIME1 | ;1.5 MILLISEC. DELAY |
| 34. | 0017 | 2470 | | BSF | 30,1 | ;SET PILOT BIT |
| 35. | 0020 | 1030 | | MOVF | 30,W | ;PICKUP "B" |
| 36. | 0021 | 0046 | | MOVWF | 6 | |
| 37. | 0022 | 6000 | | MOVLW | 000 | ;MASK FOR ZERO KEY |
| 38. | 0023 | 0611 | | XORWF | 11,W | ;COMPARE FOR ZERO |
| 39. | 0024 | 3103 | | BTFSC | 3,2 | ;WAS IT ZERO ? |
| 40. | 0025 | 5033 | | GOTO | LOP2 | ;YES |
| 41. | 0026 | 6023 | LOP1 | MOVLW | 023 | ;260 USEC. |
| 42. | 0027 | 4720 | | CALL | TIME1 | ;DELAY |
| 43. | 0030 | 0362 | | DECF | 22 | |
| 44. | 0031 | 1351 | | DECFSZ | 11,F | ;DONE HI ? |
| 45. | 0032 | 5026 | | GOTO | LOP1 | ;NO |
| 46. | 0033 | 1012 | LOP2 | MOVF | 12,W | ;PICKUP BACKUP |
| 47. | 0034 | 0051 | | MOVWF | 11,F | ;RESTORE XMIT FILE |
| 48. | 0035 | 2130 | | BCF | 30,2 | ;SET DATA BIT LOW |
| 49. | 0036 | 1030 | | MOVF | 30,W | ;PICKUP "B" |
| 50. | 0037 | 0046 | | MOVWF | 6,F | ;OUTPUT LOW |
| 51. | 0040 | 1362 | TST | DECFSZ | 22 | |
| 52. | 0041 | 5224 | | GOTO | GOG | |
| 53. | 0042 | 2070 | | BCF | 30,1 | ;SET PILOT BIT LOW |
| 54. | 0043 | 1030 | | MOVF | 30,W | ;PICKUP "B" |
| 55. | 0044 | 0046 | | MOVWF | 6 | |
| 56. | 0045 | 6230 | | MOVLW | 230 | |
| 57. | 0046 | 4720 | | CALL | TIME1 | ;DELAY FOR WHILE |
| 58. | 0047 | 6377 | | MOVLW | 377 | ;MASK |
| 59. | 0050 | 0607 | | XORWF | 7,W | ;INPUT KEYBOARD |
| 60. | 0051 | 3503 | | BTFSS | 3,2 | ;KEY ? |
| 61. | 0052 | 5060 | | GOTO | WHAT | ;YES |
| 62. | 0053 | 2435 | | BSF | 35,0 | ;SET NOKEY FLAG |
| 63. | 0054 | 2175 | | BCF | 35,3 | ;KEY FLAG |
| 64. | 0055 | 6010 | | MOVLW | 010 | ;90 USEC. |
| 65. | 0056 | 4720 | | CALL | TIME1 | ;DELAY |
| 66. | 0057 | 5117 | | GOTO | DON | ;JUMP TO DELAY |
| 67. | 0060 | 3575 | WHAT | BTFSS | 35,3 | ;TEST KEYFLAG SET ? |
| 68. | 0061 | 5102 | | GOTO | FX1 | ;NO |
| 69. | 0062 | 0610 | | XORWF | 10,W | ;SAME KEY ? |
| 70. | 0063 | 3503 | | BTFSS | 3,2 | ; |
| 71. | 0064 | 5117 | | GOTO | DON | ;NO |
| 72. | 0065 | 4736 | | CALL | DECKEY | ;DECODE KEY |
| 73. | 0066 | 7377 | | ANDLW | 377 | ;MASK |
| 74. | 0067 | 3103 | | BTFSC | 3,2 | ;ZERO VALUE ? |
| 75. | 0070 | 5117 | | GOTO | DON | ;YES |
| 76. | 0071 | 3135 | | BTFSC | 35,2 | ;TEST PROG. FLAG |
| 77. | 0072 | 7017 | | ANDLW | 017 | ;MASK FOR PROG. |
| 78. | 0073 | 3035 | | BTFSC | 35,0 | ;NOKEY FLAG SET ? |
| 79. | 0074 | 5105 | | GOTO | SKY | ;YES, IS NEW KEY |
| 80. | 0075 | 0612 | | XORWF | 12,W | ;COMPARE KEY |
| 81. | 0076 | 3503 | | BTFSS | 3,2 | ;SAME KEY AS XMIT ? |
| 82. | 0077 | 5117 | | GOTO | DON | ;NO |
| 83. | 0100 | 1276 | | INCF | 36,F | ;RESTORE XMIT COUNT |
| 84. | 0101 | 5117 | | GOTO | DON | ;JUMP TO REST OF DELAY |
| 85. | 0102 | 0050 | FX1 | MOVWF | 10,F | ;STORE RAW KEY |
| 86. | 0103 | 2575 | | BSF | 35,3 | ;SET KEY FLAG |
| 87. | 0104 | 5117 | | GOTO | DON | ;JUMP TO DELAY |
| 88. | 0105 | 2035 | SKY | BCF | 35,0 | ;RESET NOKEY FLAG |
| 89. | 0106 | 0066 | | MOVWF | 26,F | ;TEMP STORE NEW KEY |
| 90. | 0107 | 6021 | | MOVLW | 021 | ;MASK FOR WALL |
| 91. | 0110 | 0225 | | SUBWF | 25,W | ;BLOCK ? |
| 92. | 0111 | 3403 | | BTFSS | 3,0 | ; |
| 93. | 0112 | 1265 | | INCF | 25,F | ;INCREMENT QUE POINTER |
| 94. | 0113 | 1025 | | MOVF | 25,W | ;PICKUP QUE POINTER |
| 95. | 0114 | 0044 | | MOVWF | 4,F | ;STORE IN FSR |
| 96. | 0115 | 1026 | | MOVF | 26,W | ;PICKUP KEY |
| 97. | 0116 | 0040 | | MOVWF | 0,F | ;STORE IN QUE FILE |
| 98. | 0117 | 3735 | DON | BTFSS | 35,6 | ;DO BEEP ? |
| 99. | 0120 | 5170 | | GOTO | SLO | ;YES |
| 100. | 0121 | 6170 | DON1 | MOVLW | 170 | ;1.45 MILLISEC |
| 101. | 0122 | 4720 | | CALL | TIME1 | ;DELAY |

| | | | | | | |
|---|---|---|---|---|---|---|
|102.|0123|3275| |BTFSC|35,5|;IS IT SEC XMIT ?|
|103.|0124|5212| |GOTO|WIT|;YES|
|104.|0125|1376| |DECFSZ|36,F|;DONE XMIT ?|
|105.|0126|5010| |GOTO|XMIT|;NO, REPEAT|
|106.|0127|3075| |BTFSC|35,1|;WAS ZERO XMITED ?|
|107.|0130|5135| |GOTO|LOP3|;YES|
|108.|0131|0151| |CLRF|11,F|;SET UP ZERO OUTPUT|
|109.|0132|0152| |CLRF|12,F| |
|110.|0133|2475| |BSF|35,1|;XMIT ZERO VALUE|
|111.|0134|5003| |GOTO|XMTKEY|;OUTPUT ZERO 16 TIMES|
|112.|0135|2075|LOP3|BCF|35,1|;CLEAR ZERO FLAG|
|113.|0136|2335| |BCF|35,6|;CLEAR DONE BEEP FLAG|
|114.|0137|0365| |DECF|25,F|;DECREMENT QUE POINTER|
|115.|0140|6013| |MOVLW|013|;|
|116.|0141|0044| |MOVWF|4|;FILE SELECT REG.|
|117.|0142|1000|LOP4|MOVF|0,W| |
|118.|0143|0344| |DECF|4,F|;DECREMENT FSR|
|119.|0144|0040| |MOVWF|0,F| |
|120.|0145|6002| |MOVLW|2| |
|121.|0146|0744| |ADDWF|4,F| |
|122.|0147|6361| |MOVLW|361| |
|123.|0150|0604| |XORWF|4,W| |
|124.|0151|3503| |BTFSS|3,2| |
|125.|0152|5142| |GOTO|LOP4| |
|126.|0153|0161| |CLRF|21| |
|127.|0154|6377| |MOVLW|377|;MASK|
|128.|0155|0512| |ANDWF|12,W|;PICKUP NEW KEY|
|129.|0156|3103| |BTFSC|3,2|;KEY ?|
|130.|0157|5164| |GOTO|UNMTE|;NO, UNMUTE|
|131.|0160|1012| |MOVF|12,W|;PICKUP KEY|
|132.|0161|0051| |MOVWF|11,F|;LOAD XMIT FILE|
|133.|0162|4715| |CALL|TIME2|;3MILLISEC. DELAY|
|134.|0163|5003| |GOTO|XMTKEY|;NEW KEY XMIT|
|135.|0164|2030|UNMTE|BCF|30,0|;MASK FOR TX MUTE OFF|
|136.|0165|1030| |MOVF|30,W|;RESTORE "B"|
|137.|0166|0046| |MOVWF|6,F|;OUTPUT NO MUTE|
|138.|0167|4000| |RETLW|000|;NO NEW KEY, SO DONE|
|139.|0170|6001|SLO|MOVLW|001|;MASK FOR CALL|
|140.|0171|0505| |ANDWF|5,W|;INPUT PORT "A"|
|141.|0172|3503| |BTFSS|3,2|;BEEP ?|
|142.|0173|5121| |GOTO|DON1|;NO|
|143.|0174|3275| |BTFSC|35,5|;IS IT SEC XMIT ?|
|144.|0175|5201| |GOTO|SETTX|;YES|
|145.|0176|4673| |CALL|BEEP|;YES|
|146.|0177|2735|RT3|BSF|35,6|;SET DONE BEEP FLAG|
|147.|0200|5121| |GOTO|DON1|;|
|148.|0201|6001|SETTX|MOVLW|001| |
|149.|0202|0536| |ANDWF|36,W| |
|150.|0203|3503| |BTFSS|3,2|;TIME TO TEST FOR BEEP?|
|151.|0204|5121| |GOTO|DON1|;NO|
|152.|0205|6001| |MOVLW|001| |
|153.|0206|0076| |MOVWF|36,F| |
|154.|0207|2275| |BCF|35,5|;CLEAR SEC. XMIT. FLAG|
|155.|0210|2375| |BCF|35,7|;CLEAR OFF XMIT FLAG|
|156.|0211|5177| |GOTO|RT3| |
|157.|0212|3105|WIT|BTFSC|5,2|;TALK MODE ?|
|158.|0213|5216| |GOTO|HLP|;YES|
|159.|0214|3775| |BTFSS|35,7|;IS IT OFF XMIT ?|
|160.|0215|5451| |GOTO|STBY|;NO|
|161.|0216|1376|HLP|DECFSZ|36,F|;NO|
|162.|0217|5010| |GOTO|XMIT|;YES|
|163.|0220|1366| |DECFSZ|26,F|;SEC LIMIT ?|
|164.|0221|5010| |GOTO|XMIT|;NO|
|165.|0222|2735| |BSF|35,6|;YES|
|166.|0223|5425| |GOTO|OFF| |
|167.|0224|6023|GOG|MOVLW|23| |
|168.|0225|4720| |CALL|TIME1| |
|169.|0226|5040| |GOTO|TST| |
|170.| | | |PAGE| | |
|171.| | |;| | | |
|172.| | |;THIS ROUTINE WILL TEST THE| | | |
|173.| | |;BATTERY LOW SIGNAL,AND IF| | | |
|174.| | |;SIGNAL IS HIGH, WILL GENERATE| | | |
|175.| | |;A "BEEP" SIGNAL TO THE AUDIO| | | |
|176.| | |;AMP IN THE HANDSET.| | | |
|177.| | |;| | | |

```
178.          ;
179.  0227  3545  BATEST  BTFSS   5,3              ;BATTERY LOW ?
180.  0230  5256          GOTO    SET              ;SET LOOP COUNT
181.  0231  4673          CALL    BEEP             ;DO A BEEP
182.  0232  6040          MOVLW   40
183.  0233  0074          MOVWF   34
184.  0234  4715  MIT     CALL    TIME2
185.  0235  1374          DECFSZ  34
186.  0236  5234          GOTO    MIT
187.  0237  4673          CALL    BEEP
188.  0240  1371          DECFSZ  31,F             ;DONE BEEPING ?
189.  0241  5256          GOTO    SET              ;NO SET LOOP COUNT
190.  0242  2635          BSF     35,4             ;YES; SET BATTERY DEAD FLAG
191.  0243  6010          MOVLW   010              ;BEEP COUNT
192.  0244  0071          MOVWF   31,F             ;BEEP COUNTER
193.  0245  6377  T6      MOVLW   377              ;DELAY VALUE
194.  0246  0074          MOVWF   34,F             ;TIMER EXTEND
195.  0247  4715  T9      CALL    TIME2            ;3 MILLISEC DELAY
196.  0250  1374          DECFSZ  34,F             ;DONE DELAY ?
197.  0251  5247          GOTO    T9               ;NO
198.  0252  4673          CALL    BEEP             ;YES,DO A BEEP
199.  0253  1371          DECFSZ  31,F             ;DONE BEEPING ?
200.  0254  5245          GOTO    T6               ;NO
201.  0255  5723          GOTO    HANG
202.  0256  3105  SET     BTFSC   5,2              ;TALK MODE ?
203.  0257  5265          GOTO    TLKSET           ;YES
204.  0260  6033          MOVLW   033              ;LOOP VALUE
205.  0261  0073          MOVWF   33,F             ;LOOP COUNTER
206.  0262  0172          CLRF    32               ;COUNTER EXTEND
207.  0263  2235          BCF     35,4             ;CLEAR BATTERY DEAD FLAG
208.  0264  4000          RETLW   000              ;RETURN
209.  0265  6005  TLKSET  MOVLW   005              ;LOOP VALUE
210.  0266  0072          MOVWF   32,F
211.  0267  6341          MOVLW   341
212.  0270  0073          MOVWF   33,F
213.  0271  2235          BCF     35,4             ;CLEAR BATTERY DEAD FLAG
214.  0272  4000          RETLW   000              ;RETURN
215.          ;
216.          ;
217.          ;THIS ROUTINE WILL GENERATE
218.          ;THE BEEP TO THE AUDIO CHIP
219.          ;
220.          ;
221.  0273  6020  BEEP    MOVLW   020              ;16 CYCLES
222.  0274  0074          MOVWF   34,F             ;CYCLE STORE
223.  0275  1030  RLT     MOVF    30,W             ;PICKUP "B"
224.  0276  6640          IORLW   240              ;MASK FOR BEEP HI
225.  0277  0046          MOVWF   6,F              ;OUTPUT BEEP
226.  0300  6055          MOVLW   055              ;DELAY VALUE
227.  0301  0077          MOVWF   37,F             ;650 USEC. DELAY
228.  0302  1377  T7      DECFSZ  37,F             ;DONE
229.  0303  5302          GOTO    T7               ;NO
230.  0304  1030          MOVF    30,W             ;PICKUP "B"
231.  0305  0046          MOVWF   6,F              ;OUTPUT BEEP LOW
232.  0306  6055          MOVLW   055              ;650 USEC.
233.  0307  0077          MOVWF   37,F             ;DELAY
234.  0310  1377  T8      DECFSZ  37,F             ;DONE ?
235.  0311  5310          GOTO    T8               ;NO
236.  0312  1374          DECFSZ  34,F             ;DONE BEEPING ?
237.  0313  5275          GOTO    RLT              ;NO, CONTINUE
238.  0314  4000          RETLW   000              ;YES
239.          ;
240.          ;
241.          ;THIS MULTIPLE ENTRY SUBROUTINE
242.          ;WILL GENERATE VARIOUS TIME DELAYS.
243.          ;
244.          ;
245.  0315  6370  TIME2   MOVLW   370              ;3 MILLISEC.
246.  0316  5320          GOTO    TIME1            ;JUMP TO REST
247.  0317  6055  TIME    MOVLW   055              ;650 USEC.
248.  0320  0077  TIME1   MOVWF   37,F             ;STORE
249.  0321  1377  T2      DECFSZ  37,F             ;DONE ?
250.  0322  5321          GOTO    T2               ;NO
251.  0323  4000          RETLW   000              ;YES
252.  0324  1030  PILOT   MOVF    30,W             ;PICKUP "B" OUTPUT
253.  0325  6402          IORLW   002              ;MASK FOR BIT 1
```

```
254.  0326  0046            MOVWF   6,F              ;OUTPUT B
255.  0327  4715            CALL    TIME2            ;DELAY 3 MILLISEC.
256.  0330  4715            CALL    TIME2            ;
257.  0331  1030            MOVF    30,W             ;PICKUP "B"
258.  0332  0046            MOVWF   6,F              ;OUTPUT "B" LO
259.  0333  4715            CALL    TIME2            ;
260.  0334  4715            CALL    TIME2            ;
261.  0335  4000            RETLW   0
262.                        PAGE
263.                ;THIS SINGLE ENTRY SUBROUTINE
264.                ;TAKES THE RAW KEY DATA AND
265.                ;CONVERTS THE KEY TO DATA READY
266.                ;TO TRANSMIT TO THE BASE UNIT.
267.                ;THE PROPER KEY VALUE
268.                ;IS PLACED IN THE "W"
269.                ;REGISTER UPON RETURN
270.                ;FROM SUBROUTINE.
271.                ;
272.                ;
273.  0336  3350  DECKEY     BTFSC   10,7             ;C7=1 ?
274.  0337  5355             GOTO    A8X              ;YES
275.  0340  3310             BTFSC   10,6             ;C6=1 ?
276.  0341  5366             GOTO    A4X              ;YES
277.  0342  3250             BTFSC   10,5             ;C5=1 ?
278.  0343  5377             GOTO    A2X              ;YES
279.  0344  3210             BTFSC   10,4             ;C4=1 ?
280.  0345  5410             GOTO    A1X              ;YES
281.  0346  3410             BTFSS   10,0             ;C4=0, C0=1 ?
282.  0347  4000             RETLW   000              ;NO, BAD KEY
283.  0350  3110             BTFSC   10,2             ;IS IT "A" KEY ?
284.  0351  4015             RETLW   015              ;YES, "A" KEY
285.  0352  3550             BTFSS   10,3             ;IS IT "F" KEY (STORE)?
286.  0353  4000             RETLW   000              ;NO, BAD KEY
287.  0354  4023             RETLW   023              ;YES, "F" KEY
288.  0355  3150  A8X        BTFSC   10,3             ;IS IT "C" KEY ?
289.  0356  4017             RETLW   017              ;YES, "C" KEY
290.  0357  3110             BTFSC   10,2             ;IS IT # KEY ?
291.  0360  4014             RETLW   014              ;YES # KEY
292.  0361  3050             BTFSC   10,1             ;IS IT 0 KEY ?
293.  0362  4012             RETLW   012              ;YES, 0 KEY
294.  0363  3410             BTFSS   10,0             ;IS IT * KEY ?
295.  0364  4000             RETLW   000              ;NO, BAD KEY
296.  0365  4013             RETLW   013              ;YES, * KEY
297.  0366  3150  A4X        BTFSC   10,3             ;IS IT "B" KEY ?
298.  0367  4016             RETLW   016              ;YES, "B" KEY
299.  0370  3110             BTFSC   10,2             ;IS IT 9 KEY ?
300.  0371  4011             RETLW   011              ;YES, 9 KEY
301.  0372  3050             BTFSC   10,1             ;IS IT 8 KEY ?
302.  0373  4010             RETLW   010              ;YES, 8 KEY
303.  0374  3010             BTFSC   10,0             ;IS IT 7 KEY ?
304.  0375  4007             RETLW   007              ;YES, 7 KEY
305.  0376  4000             RETLW   000              ;NO, BAD KEY
306.  0377  3150  A2X        BTFSC   10,3             ;IS IT "D" KEY (HOOK)?
307.  0400  4022             RETLW   022              ;YES, HOOK KEY
308.  0401  3110             BTFSC   10,2             ;IS IT 6 KEY ?
309.  0402  4006             RETLW   006              ;YES 6 KEY
310.  0403  3050             BTFSC   10,1             ;IS IT 5 KEY ?
311.  0404  4005             RETLW   005              ;YES, 5 KEY
312.  0405  3410             BTFSS   10,0             ;IS IT 4 KEY ?
313.  0406  4000             RETLW   000              ;NO, BAD KEY
314.  0407  4004             RETLW   004              ;YES, 4 KEY
315.  0410  3150  A1X        BTFSC   10,3             ;IS IT "E" KEY?
316.  0411  4021             RETLW   021              ;YES, "REDIAL "KEY
317.  0412  3110             BTFSC   10,2             ;IS IT 3 KEY ?
318.  0413  4003             RETLW   003              ;YES, 3 KEY
319.  0414  3050             BTFSC   10,1             ;IS IT 2 KEY ?
320.  0415  4002             RETLW   002              ;YES, 2 KEY
321.  0416  3410             BTFSS   10,0             ;IS IT 1 KEY ?
322.  0417  4000             RETLW   000              ;NO, BAD KEY
323.  0420  4001             RETLW   001              ;YES, 1 KEY
324.                  ;
325.                  ;
326.                  ;
327.                  ;
328.                  ;
329.                  ;THE AREA IS ENTERED WHEN
```

```
330.                        ;THE OFF/ON/TALK SWITCH
331.                        ;IS MOVED FROM OFF TO ON.
332.                        ;
333.                        ;
334.   0421  6000   PRSTBY  MOVLW   000
335.   0422  0006           DATA    0006            ;REPLACES TRIS 6
336.   0423  6377           MOVLW   377
337.   0424  0007           DATA    0007            ;REPLACES TRIS 7
338.                        ;OFF MODE
339.   0425  6031   OFF     MOVLW   031             ;MASK FOR OFF
340.   0426  0070           MOVWF   30              ;STORE IN "B"
341.   0427  0046           MOVWF   6,F             ;OUTPUT PORT "B"
342.   0430  2335           BCF     35,6            ;CLEAR BEEP FLAG
343.   0431  6033   RT1     MOVLW   033             ;LOOP VALUE
344.   0432  0073           MOVWF   33,F            ;LOOP COUNTER
345.   0433  3145           BTFSC   5,3
346.   0434  5734           GOTO    OFF3
347.   0435  6075           MOVLW   075             ;BEEP VALUE
348.   0436  0071           MOVWF   31,F            ;BEEP COUNTER
349.   0437  6012   OFF1    MOVLW   012             ;QUE POINTER VALUE
350.   0440  0065           MOVWF   25,F            ;QUE POINTER STORE
351.   0441  0153           CLRF    13
352.   0442  0154           CLRF    14
353.   0443  0155           CLRF    15
354.   0444  0156           CLRF    16
355.   0445  0157           CLRF    17
356.   0446  0160           CLRF    20
357.   0447  0161           CLRF    21
358.   0450  0162           CLRF    22
359.                        ;
360.                        ;
361.                        ;STANDBY MODE,
362.                        ;WE WILL BE IN THIS AREA
363.                        ;OF THE PROGRAM WHEN THE
364.                        ;OFF/ON/TALK SWITCH IS
365.                        ;IN THE "ON" POSITION.
366.                        ;
367.                        ;
368.   0451  3445   STBY    BTFSS   5,1             ;STANDBY MODE?
369.   0452  5770           GOTO    OFF4            ;NO
370.   0453  6011           MOVLW   011             ;AUDIO LO,RX ON,TX MUTE ON
371.   0454  0046           MOVWF   6,F             ;OUTPUT PORT B
372.   0455  0070           MOVWF   30,F            ;STORE "B"
373.   0456  6024           MOVLW   024             ;SETUP DELAY
374.   0457  0074           MOVWF   34,F            ;TIMER EXTEND
375.   0460  4715   T1      CALL    TIME2           ;3 MILLISEC. DELAY
376.   0461  1374           DECFSZ  34,F            ;DELAY DONE ?
377.   0462  5460           GOTO    T1              ;NO
378.   0463  1373           DECFSZ  33,F            ;TIME TO BATTERY?
379.   0464  5466           GOTO    LOOP
380.   0465  4627           CALL    BATEST          ;YES,BATTERY LOW TESTING
381.   0466  6001   LOOP    MOVLW   001             ;MASK FOR SP&CALL
382.   0467  0505           ANDWF   5,W             ;INPUT PORT "A"
383.   0470  3503           BTFSS   3,2             ;WAS IT SP&CALL
384.   0471  5512           GOTO    PGM             ;NO
385.   0472  6030           MOVLW   30
386.   0473  0074           MOVWF   34
387.   0474  1030   HIT     MOVF    30,W
388.   0475  6540           IORLW   140
389.   0476  0046           MOVWF   6
390.   0477  4717           CALL    TIME
391.   0500  1030           MOVF    30,W
392.   0501  0046           MOVWF   6
393.   0502  4717           CALL    TIME
394.   0503  1374           DECFSZ  34
395.   0504  5474           GOTO    HIT
396.   0505  4715           CALL    TIME2
397.   0506  4715           CALL    TIME2           ;3 MILLISEC. DELAY
398.   0507  4715           CALL    TIME2           ;
399.   0510  4715           CALL    TIME2           ;
400.   0511  5466           GOTO    LOOP            ;BACK TO TEST
401.   0512  6006   PGM     MOVLW   006             ;MASK
402.   0513  0505           ANDWF   5,W             ;INPUT PORT "A"
403.   0514  7406           XORLW   006             ;IS IT EQUAL
404.   0515  3103           BTFSC   3,2             ;WAS IT SECURITY?
405.   0516  5533           GOTO    KEY             ;YES
```

| | | | | | |
|---|---|---|---|---|---|
| 406. | 0517 | 2135 | TTEST | BCF | 35,2 | ;CLEAR PROG. FLAG
| 407. | 0520 | 3105 | | BTFSC | 5,2 | ;TALK MODE ?
| 408. | 0521 | 5622 | | GOTO | TALK | ;YES
| 409. | 0522 | 6031 | | MOVLW | 031 | ;RX OFF
| 410. | 0523 | 0046 | | MOVWF | 6,F | ;OUTPUT PORT "B"
| 411. | 0524 | 0070 | | MOVWF | 30,F | ;STORE "B"
| 412. | 0525 | 6255 | | MOVLW | 255 | ;255 TIMES
| 413. | 0526 | 0074 | | MOVWF | 34,F | ;TIMER EXTEND
| 414. | 0527 | 4715 | L0 | CALL | TIME2 | ;3 MILLISEC. DELAY
| 415. | 0530 | 1374 | | DECFSZ | 34,F | ;DONE ?
| 416. | 0531 | 5615 | | GOTO | T11 | ;NO
| 417. | 0532 | 5451 | | GOTO | STBY | ;YES, RETURN TO STANDBY
| 418. | 0533 | 6041 | KEY | MOVLW | 041 | ;TX ON, RX ON, AUDIO LOW,
| 419. | | | ; | | | TX MUTE ON, PILOT ON
| 420. | 0534 | 0046 | | MOVWF | 6,F | ;OUTPUT PORT "B"
| 421. | 0535 | 0070 | | MOVWF | 30,F | ;STORE "B"
| 422. | 0536 | 2535 | | BSF | 35,2 | ;SET PROG. FLAG
| 423. | 0537 | 4724 | KEY1 | CALL | PILOT | ;RUN PILOT
| 424. | 0540 | 6377 | | MOVLW | 377 | ;MASK FOR KEYBOARD
| 425. | 0541 | 0607 | | XORWF | 7,W | ;INPUT PORT "C"
| 426. | 0542 | 3103 | | BTFSC | 3,2 | ;KEY ?
| 427. | 0543 | 5576 | | GOTO | NKEY | ;NO
| 428. | 0544 | 0050 | | MOVWF | 10,F | ;YES, STORE RAW KEY
| 429. | 0545 | 4715 | | CALL | TIME2 | ;3MILLISEC. DELAY
| 430. | 0546 | 4715 | | CALL | TIME2 | ;3 MILLISEC. DELAY
| 431. | 0547 | 6377 | | MOVLW | 377 | ;MASK FOR KEYBOARD
| 432. | 0550 | 0607 | | XORWF | 7,W | ;INPUT PORT "C"
| 433. | 0551 | 3103 | | BTFSC | 3,2 | ;KEY?
| 434. | 0552 | 5576 | | GOTO | NKEY | ;NO
| 435. | 0553 | 0610 | | XORWF | 10,W | ;YES, COMPARE KEY
| 436. | 0554 | 3503 | | BTFSS | 3,2 | ;SAME KEY ?
| 437. | 0555 | 5537 | | GOTO | KEY1 | ;NO
| 438. | 0556 | 2035 | | BCF | 35,0 | ;YES RESET NOKEY FLAG
| 439. | 0557 | 4736 | | CALL | DECKEY | ;DECODE KEY
| 440. | 0560 | 7017 | | ANDLW | 017 | ;LIMIT VALUE TO<15 KEYS>
| 441. | 0561 | 0062 | | MOVWF | 22,F | ;STORE IN TEMP
| 442. | 0562 | 6004 | | MOVLW | 004 | ;SET ROLL VALUE
| 443. | 0563 | 0074 | | MOVWF | 34,F | ;STORE ROLL VALUE
| 444. | 0564 | 2003 | | BCF | 3,0 | ;CLEAR CARRY
| 445. | 0565 | 1463 | LOOOP | RRF | 23,F | ;SHIFT CODE IN
| 446. | 0566 | 1464 | | RRF | 24,F | ;SECURITY REGISTERS
| 447. | 0567 | 1374 | | DECFSZ | 34,F | ;DONE ?
| 448. | 0570 | 5565 | | GOTO | LOOOP | ;NO
| 449. | 0571 | 1022 | | MOVF | 22,W | ;PICKUP KEY VALUE
| 450. | 0572 | 0063 | | MOVWF | 23,F | ;STORE IN SECURITY
| 451. | 0573 | 0051 | | MOVWF | 11,F | ;STORE XMIT FILE
| 452. | 0574 | 0052 | | MOVWF | 12,F | ;STORE BACKUP FILE
| 453. | 0575 | 4403 | | CALL | XMTKEY | ;OUTPUT NEW KEY
| 454. | 0576 | 2435 | NKEY | BSF | 35,0 | ;SET NOKEY FLAG
| 455. | 0577 | 6006 | | MOVLW | 006 | ;MASK
| 456. | 0600 | 0505 | | ANDWF | 5,W | ;INPUT PORT "A"
| 457. | 0601 | 7406 | | XORLW | 006 | ;IS IT EQUAL
| 458. | 0602 | 3103 | | BTFSC | 3,2 | ;PROGRAM SECURITY ?
| 459. | 0603 | 5537 | | GOTO | KEY1 | ;YES
| 460. | 0604 | 6030 | | MOVLW | 30 | ;24 TIMES
| 461. | 0605 | 0074 | | MOVWF | 34,F | ;TIMER EXTEND
| 462. | 0606 | 4715 | T3 | CALL | TIME2 | ;3 MILLISEC. DELAY
| 463. | 0607 | 1374 | | DECFSZ | 34,F | ;DONE ?
| 464. | 0610 | 5606 | | GOTO | T3 | ;NO
| 465. | 0611 | 6031 | | MOVLW | 031 | ;TX OFF
| 466. | 0612 | 0046 | | MOVWF | 6,F | ;OUTPUT "B"
| 467. | 0613 | 0070 | | MOVWF | 30,F | ;STORE B
| 468. | 0614 | 5437 | | GOTO | OFF1 | ;TEST TALK MODE
| 469. | 0615 | 3505 | T11 | BTFSS | 5,2 | ;TALK?
| 470. | 0616 | 5527 | | GOTO | L0 | ;NO
| 471. | 0617 | 3445 | | BTFSS | 5,1 | ;PROGRAM?
| 472. | 0620 | 5622 | | GOTO | TALK |
| 473. | 0621 | 5527 | | GOTO | L0 |
| 474. | | | | PAGE | |
| 475. | | | ; | | |
| 476. | | | ;TALK MODE | | |
| 477. | | | ;THIS AREA OF THE PROGRAM | | |
| 478. | | | ;WILL BE USED WHEN THE | | |
| 479. | | | ;OFF/ON/TALK SWITCH IS IN | | |
| 480. | | | ;THE TALK POSITION. | | |
| 481. | | | ; | | |
| 482. | | | ; | | |

```
483.  0622  6005  TALK    MOVLW   005             ;LOOP VALUE
484.  0623  0072          MOVWF   32,F            ;LOOP EXTEND FILE
485.  0624  6341          MOVLW   341
486.  0625  0073          MOVWF   33,F            ;LOOP COUNTER
487.  0626  6000          MOVLW   000             ;TX ON, RX ON, TX MUTE OFF
488.  0627  0046          MOVWF   6,F             ;OUTPUT PORT "B"
489.  0630  0070          MOVWF   30,F            ;STORE "B"
490.  0631  6020          MOVLW   020             ;16 TIMES
491.  0632  0074          MOVWF   34,F            ;TIMER EXTEND
492.  0633  4724  T4      CALL    PILOT           ;PILOT TONE
493.  0634  1374          DECFSZ  34,F            ;DELAY DONE ?
494.  0635  5633          GOTO    T4              ;NO
495.                ;                   OUTPUT SECURITY CODE
496.  0636  6017          MOVLW   017             ;MASK
497.  0637  0524          ANDWF   24,W            ;PICKUP CODE 1
498.  0640  0051          MOVWF   11,F            ;STORE XMIT FILE
499.  0641  0052          MOVWF   12,F            ;STORE BACKUP FILE
500.  0642  4400          CALL    XMTSEC          ;OUTPUT CODE 16 TIMES
501.  0643  1624          SWAPF   24,W            ;PICKUP SECURITY CODE 2
502.  0644  7017          ANDLW   017             ;MASK
503.  0645  0051          MOVWF   11,F            ;STORE XMIT FILE
504.  0646  0052          MOVWF   12,F            ;STORE BACKUP FILE
505.  0647  4400          CALL    XMTSEC          ;OUTPUT CODE 2
506.  0650  6017          MOVLW   017             ;MASK
507.  0651  0523          ANDWF   23,W            ;PICKUP SECURITY CODE 3
508.  0652  0051          MOVWF   11,F            ;STORE XMIT FILE
509.  0653  0052          MOVWF   12,F            ;STORE BACKUP FILE
510.  0654  4400          CALL    XMTSEC          ;OUTPUT CODE 3
511.  0655  1373  BTLO    DECFSZ  33,F            ;ZERO ?
512.  0656  5662          GOTO    T10             ;NO
513.  0657  1372          DECFSZ  32,F            ;TIME ?
514.  0660  5662          GOTO    T10             ;NO
515.  0661  4627          CALL    BATEST          ;BATTERY LOW TESTING
516.  0662  6012  T10     MOVLW   012
517.  0663  0065          MOVWF   25              ;RESET KEY QUE POINTER
518.  0664  6001          MOVLW   001             ;MASK FOR CALL
519.  0665  0505          ANDWF   5,W             ;INPUT PORT "A"
520.  0666  3103          BTFSC   3,2             ;CALL ?
521.  0667  4673          CALL    BEEP            ;ECHOBACK KEYS
522.  0670  6377  KBTST   MOVLW   377             ;MASK
523.  0671  0607          XORWF   7,W             ;INPUT KEYBOARD
524.  0672  3103          BTFSC   3,2             ;KEY ?
525.  0673  5720          GOTO    NOKEY           ;NO
526.  0674  0050          MOVWF   10,F            ;YES, STORE RAW KEY
527.  0675  4715          CALL    TIME2           ;3 MILLISEC. DEBOUNCE
528.  0676  6377          MOVLW   377             ;MASK
529.  0677  0607          XORWF   7,W             ;INPUT KEYBOARD
530.  0700  3103          BTFSC   3,2             ;KEY ?
531.  0701  5720          GOTO    NOKEY           ;NO
532.  0702  0610          XORWF   10,W            ;YES, COMPARE KEY
533.  0703  3503          BTFSS   3,2             ;SAME KEY ?
534.  0704  5670          GOTO    KBTST           ;NO
535.  0705  2035          BCF     35,0            ;RESET NOKEY FLAG
536.  0706  4736          CALL    DECKEY          ;DECODE KEY
537.  0707  7377          ANDLW   377             ;MASK
538.  0710  3103          BTFSC   3,2             ;ZERO VALUE?
539.  0711  5720          GOTO    NOKEY           ;YES
540.  0712  0051          MOVWF   11,F            ;STORE XMIT FILE
541.  0713  0052          MOVWF   12,F            ;STORE BACKUP FILE
542.  0714  4403          CALL    XMTKEY          ;OUTPUT KEY DATA 9 TIMES
543.  0715  4715          CALL    TIME2
544.  0716  4715          CALL    TIME2
545.  0717  5721          GOTO    TKT             ;GO TO TALK TEST
546.  0720  2435  NOKEY   BSF     35,0            ;SET NOKEY FLAG
547.  0721  3105  TKT     BTFSC   5,2             ;WAS IT TALK ?
548.  0722  5732          GOTO    PIT             ;YES
549.  0723  2775  HANG    BSF     35,7            ;SET OFF XMIT FLAG
550.  0724  6020          MOVLW   020             ;NO, LOAD "HANG UP"
551.  0725  0051          MOVWF   11,F            ;STORE XMIT FILE
552.  0726  0052          MOVWF   12,F            ;STORE BACKUP FILE
553.  0727  4400          CALL    XMTSEC          ;OUTPUT DATA 16 TIMES
554.  0730  4673          CALL    BEEP
555.  0731  5425          GOTO    OFF             ;BACK TO OFF
556.  0732  4724  PIT     CALL    PILOT
557.  0733  5655          GOTO    BTLO
558.                ;
```

```
559.                    ;
560.                    ;
561.  0734  4715  OFF3  CALL    TIME2
562.  0735  4715        CALL    TIME2
563.  0736  3105        BTFSC   5,2
564.  0737  5744        GOTO    RT2
565.  0740  4715        CALL    TIME2
566.  0741  4715        CALL    TIME2
567.  0742  3445        BTFSS   5,1
568.  0743  5425        GOTO    OFF
569.  0744  3335  RT2   BTFSC   35,6
570.  0745  5431        GOTO    RT1
571.  0746  6003        MOVLW   003
572.  0747  0071        MOVWF   31
573.  0750  6300  T12   MOVLW   300
574.  0751  0074        MOVWF   34
575.  0752  4715  T13   CALL    TIME2
576.  0753  1374        DECFSZ  34
577.  0754  5752        GOTO    T13
578.  0755  4673        CALL    BEEP
579.  0756  6040        MOVLW   40
580.  0757  0074        MOVWF   34
581.  0760  4715  T14   CALL    TIME2
582.  0761  1374        DECFSZ  34
583.  0762  5760        GOTO    T14
584.  0763  4673        CALL    BEEP
585.  0764  1371        DECFSZ  31
586.  0765  5750        GOTO    T12
587.  0766  2735        BSF     35,6
588.  0767  5431        GOTO    RT1
589.                    ;
590.                    ;
591.                    ;
592.  0770  3735  OFF4  BTFSS   35,6
593.  0771  5425        GOTO    OFF
594.  0772  4715        CALL    TIME2
595.  0773  4715        CALL    TIME2
596.  0774  5431        GOTO    RT1
597.                    ;
598.                    ;
599.  0777              ORG     777
600.                    ;
601.                    ;
602.  0777  5421        GOTO    PRSTBY
603.                    ;
604.                    ;
605.                    END

CROSS REFERENCE TABLE
SYMBOL-VALUE    REFERENCES
A1X     0410    -315 280
A2X     0377    -306 278
A4X     0366    -297 276
A8X     0355    -288 274
BATEST  0227    -179 380 515
BEEP    0273    -221 145 181 187 198 521 554 578 584
BTLO    0655    -511 557
DECKEY  0336    -273  72 439 536
DON     0117    -98   66  71  75  82  84  87
DON1    0121    -100 142 147 151
FX1     0102    -85   68
GOG     0224    -167  52
HANG    0723    -549 201
HIT     0474    -387 395
HLP     0216    -161 158
HUT     0001    -20
KBTST   0670    -522 534
KEY     0533    -418 405
KEY1    0537    -423 437 459
LO      0527    -414 470 473
LOOOP   0565    -445 448
LOOP    0466    -381 379 400
LOP1    0026    -41   45
LOP2    0033    -46   40
LOP3    0135    -112 107
LOP4    0142    -117 125
MIT     0234    -184 186
NKEY    0576    -454 427 434
```

```
NOKEY    0720   -546 525 531 539
OFF      0425   -339 166 555 568 593
OFF1     0437   -349 468
OFF3     0734   -561 346
OFF4     0770   -592 369
PGM      0512   -401 384
PILOT    0324   -252 423 492 556
PIT      0732   -556 548
PRSTBY   0421   -334 602
RLT      0275   -223 237
RT1      0431   -343 570 588 596
RT2      0744   -569 564
RT3      0177   -146 156
SET      0256   -202 180 189
SETTX    0201   -148 144
SKY      0105   -88 79
SLO      0170   -139 99
STBY     0451   -368 160 417
T1       0460   -375 377
T10      0662   -516 512 514
T11      0615   -469 416
T12      0750   -573 586
T13      0752   -575 577
T14      0760   -581 583
T2       0321   -249 250
T3       0606   -462 464
T4       0633   -492 494
T6       0245   -193 200
T7       0302   -228 229
T8       0310   -234 235
T9       0247   -195 197
TALK     0622   -483 408 472
TIME     0317   -247 390 393
TIME1    0320   -248  33  42  57  65 101 168 246
TIME2    0315   -245 133 184 195 255 256 259 260 375 396 397 398 399 414 429 430 462
TKT      0721   -547 545
TLKSET   0265   -209 203
TST      0040   -51 169
TTEST    0517   -406
UNMTE    0164   -135 130
WHAT     0060   -67 61
WIT      0212   -157 103
XMIT     0010   -27 105 162 164
XMTKEY   0003   -22 111 134 453 542
XMTSEC   0000   -19 500 505 510 553
 73 SYMBOLS
```

It will be understood that modifications and variations may be effected without departing from the spirit and scope of the novel concepts of this invention.

We claim:

1. In a cordless telephone system including a handset unit and a control unit each including transmitter means and receiver means for wireless communication between said units, each transmitter means having an audio signal input and each receiver means having an audio signal output, a line circuit in said control unit for connection to at least one outside line and including an input for receiving audio signals to be transmitted to the outside line and an output for transmission of signals received from the outside line, a speaker amplifier in said control unit having an input and an output, a speaker in said control unit connected to said speaker amplifier output, a microphone amplifier in said control unit having an input and an output, a microphone in said control unit connected to said microphone amplifier input, control means in said control unit for operation thereof in a plurality of modes including a "normal" mode and a "local answer" mode, said control means in said "normal" mode being arranged to connect said audio signal output of said control unit receiver means to said input of said line circuit and to connect said output of said line circuit to said audio signal input of said control unit transmitter means while inhibiting transmission of audio signals to and from said speaker amplifier input and said microphone amplifier output, said control means in said "local answer" mode being arranged to connect said line circuit output to said speaker amplifier input and to connect said microphone amplifier output to said line circuit input while inhibiting transmission of audio signals from said audio signal output of said control unit receiver means to said input of said line circuit, voice-operated switching means in said control unit associated with said microphone amplifier and operable in said "local answer" mode, said voice-operated switching means being responsive to microphone-generated audio signals of above a certain threshold value and being then operable to inhibit transmission of audio signals through said speaker amplifier to said speaker.

2. In a cordless telephone system as defined in claim 1, said control means having an additional "3-way" mode of operation like said "local answer" mode of operation except in being operable to transmit audio signals from said audio signal output of said receiver means of said control unit to said line circuit input and to said speaker amplifier input and to transmit audio signals from said line circuit output and said microphone amplifier output to said input of said control unit transmitter means, said voice-operated control means being operable in said "3-way" mode.

3. In a cordless telephone system as defined in claim 2, said control means having an additional "intercom" mode of operation, said control means in said "intercom" mode being operable to connect said audio signal output of said receiver means of said control unit to said speaker amplifier input and being operable to connect said output of said microphone amplifier to said audio signal input of said control unit transmitter means of said control unit, said voice-operated control means being operable in said "intercom" mode.

4. In a cordless telephone system as defined in claim 3, switch means in said control unit for selectively obtaining said "normal", "local answer", "3-way" and "intercom" modes of operation.

5. In a cordless telephone system as defined in claim 3, said handset unit including means for transmitting control signals to said control unit which include an intercom call signal, and means in said control unit for receiving said intercom call signal and activating intercom call signaling means at said control unit.

6. In a cordless telephone system as defined in claim 3, means for transmitting control signals from said control unit to said handset unit including intercom call signals, and intercom call signaling means in said handset for operation in response to said intercom call signals from said control unit.

7. In a cordless telephone system as defined in claim 3, said control unit including hold means for maintaining a connection to an outside line, said control means being operable in said "intercom" mode while said hold means is operable.

8. In a cordless telephone system as defined in claim 7, a manually operable control at said control unit for controlling said hold means.

9. In a cordless telephone system as defined in claim 8 means for transmitting control signals from said handset to said control unit including a "hold" signal, and means in said control unit for receiving said "hold" signal and activating said hold means.

10. In a cordless telephone system including a handset unit and a control unit each including transmitter means and receiver means for wireless communication between said units, each transmitter means having audio and control signal input means and each receiver means having audio and control signal output means, a line circuit in said control unit for connection to at least one outside line and including an input for receiving audio signals to be transmitted to the outside line and an output for transmission of signals received from the outside line, a ring detect circuit in said control unit connected to the outside line for detecting a ring condition of the outside line, speaker and microphone means connectable to said input and output means of said transmitter and receiver means of said control unit for intercom communication with said handset, manually operable intercom switch means on said control unit, control means coupled to said input and output of said line circuit, said input and output means of said transmitter and receiver means of said control unit and said speaker and microphone means of said control unit, said control means including a microprocessor and an interrupt circuit coupled to said microprocessor, to said output means of said receiver means of said control unit, to said ring detect circuit and to said intercom switch means, said interrupt circuit being arranged to apply an interrupt signal to said microprocesor in response to any one of a number of initiating signals including a control signal from said handset unit, a ring detect signal from said ring detect circuit and a signal from said intercom switch means and said microprocessor means being arranged to respond to said interrupt signal to perform control operations in accordance with the status of said control unit and the identity of the signal which initiated said interrupt signal.

11. In a cordless telephone system as defined in claim 10, said control means being arranged for transmitting a ring signal to said input means of said transmitter means of said control unit for transmission of said handset, said ring signla being transmitted in response to an interrupt generated from said ring detect circuit.

* * * * *

UNITED STATES PATENT AND TRADEMARK OFFICE
CERTIFICATE OF CORRECTION

PATENT NO. : 4,706,274
DATED : NOVEMBER 10, 1987                      Page 1 of 2
INVENTOR(S) : WILLIAM BAKER, MICHAEL K. PEDIGO, NOEL ATKINSON, and
              HENRY PHILLIP SHELTON It is certified that error appears in the above-identified patent and that said Letters Patent is hereby corrected as shown below:

```
Column 1, line 48, "multiline" should be "multi-line".
Column 2, line 19, "froma" should be "from a".
Column 3, line 48, "32," should be "32" (delete comma).

Column 11, line 45, "48" should be "148".

Column 18, line 1, "The" is omitted.

Column 19, line 28, "applicable" should be "applied".
Column 19, same line "signal" should be "signals".
Column 22, line 4, "When" should be a new paragraph.

Column 22, lines 21 and 22, "resistro" should be "resistor".
Column 22, line 23, "tot eh" should be "to the".
Column 23 line 19, "36" should be "436".

Column 25, line 10, "5-volt" should be +5-volt".
Column 44, line 32, After #, insert a period (.).
Column 49, line 53, "RSTBY' SHOULD BE "PRSTBY".
```

UNITED STATES PATENT AND TRADEMARK OFFICE
CERTIFICATE OF CORRECTION

PATENT NO. : 4,706,274
DATED : November 10, 1987
INVENTOR(S) : William Baker, et al It is certified that error appears in the above-identified patent and that said Letters Patent is hereby corrected as shown below:

Column 114, Claim 11, line 5, "signla" should be "signal".

Signed and Sealed this

Thirtieth Day of August, 1988

Attest:

*Attesting Officer*

DONALD J. QUIGG

*Commissioner of Patents and Trademarks*